US009659154B2

(12) United States Patent
Takemoto et al.

(10) Patent No.: US 9,659,154 B2
(45) Date of Patent: May 23, 2017

(54) INFORMATION PROCESSING SYSTEM, INFORMATION PROCESSING APPARATUS, METHOD OF ADMINISTRATING LICENSE, AND PROGRAM

(71) Applicants: Ryo Takemoto, Kanagawa (JP); Hiroyuki Matsushima, Kanagawa (JP)

(72) Inventors: Ryo Takemoto, Kanagawa (JP); Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 240 days.

(21) Appl. No.: 14/565,587

(22) Filed: Dec. 10, 2014

(65) Prior Publication Data
US 2015/0169849 A1    Jun. 18, 2015

(30) Foreign Application Priority Data

Dec. 12, 2013  (JP) .................................. 2013-257094

(51) Int. Cl.
*G06F 21/10*        (2013.01)
(52) U.S. Cl.
CPC .................. *G06F 21/105* (2013.01)
(58) Field of Classification Search
CPC ..................................................... G06F 21/105
USPC .......................................................... 726/27
See application file for complete search history.

(56) References Cited

U.S. PATENT DOCUMENTS

| 6,810,389 B1* | 10/2004 | Meyer ................... G06Q 30/06 705/51 |
| 2004/0039916 A1* | 2/2004 | Aldis ...................... G06F 21/10 713/177 |
| 2005/0114266 A1* | 5/2005 | Satkunanathan ...... G06Q 30/06 705/59 |
| 2009/0241107 A1* | 9/2009 | Kobayashi .............. G06F 21/10 717/178 |
| 2014/0223570 A1 | 8/2014 | Matsushima et al. |

FOREIGN PATENT DOCUMENTS

| JP | 2006-018770 | 1/2006 |
| JP | 4882597 | 2/2012 |
| JP | 2014-170522 | 9/2014 |

* cited by examiner

*Primary Examiner* — Hadi Armouche
*Assistant Examiner* — Angela Holmes
(74) *Attorney, Agent, or Firm* — IPUSA, PLLC

(57) ABSTRACT

An information processing system that includes a service providing unit providing a service to an apparatus associated with a license; and a license administration unit administrating a provisionally registered license or a registered license, wherein the service providing unit includes a second memory storing a copy of license information, and an activation unit that receives a request to activate the license from the apparatus, activates the provisionally registered license or associates the registered license with the identification information of the apparatus, and requests a change of the license information stored in the second memory unit to be reflected on the license information stored in the first memory unit, wherein the activation unit adjusts a quantity of the identification information of the apparatus associated with the registered license based on the quantity of the apparatus by which a service included in the license information is made usable.

10 Claims, 44 Drawing Sheets

FIG.10

| ORGANIZATION ID |
| --- |
| ORGANIZATION NAME |
| DISPLAY LANGUAGE |
| TIME ZONE |
| STATE |
| COUNTRY |

FIG.11

| ORGANIZATION ID |
| --- |
| USER ID |
| PASSWORD |
| USER NAME |
| DISPLAY LANGUAGE |
| TIME ZONE |
| STATE |

FIG.12

| |
|---|
| SERVICE TYPE |
| LICENSE ID |
| SALES REGION |
| COUNTRY |
| TIME ZONE |
| COMMODITY CODE |
| QUANTITY (NUMBER OF APPARATUSES) |
| USE START DATE |
| BILLING START DATE |
| USE END DATE |
| SCHEDULED CANCELLATION DATE |
| STATE |
| PARENT SERVICE TYPE |
| PARENT LICENSE ID |
| REGISTRATION CODE |
| MACHINE TYPE AND MACHINE NUMBER |
| NEXT LICENSE TYPE |
| NEXT LICENSE ID |
| LICENSE TYPE |
| LICENSE MODE |
| QUANTITY (NUMBER OF USERS) |
| NUMBER OF APPARATUSES IN USE |
| NUMBER OF USERS IN USE |

FIG.13

| SERVICE ID |
|---|
| DEVICE(ORGANIZATION ID, MACHINE TYPE AND MACHINE NUMBER) |
| ACTIVATED DATE |

FIG.14

| ORGANIZATION ID |
|---|
| DEVICE AUTHENTICATION INFORMATION |
| BUSINESS OFFICE INFORMATION |
| CAPABILITY |

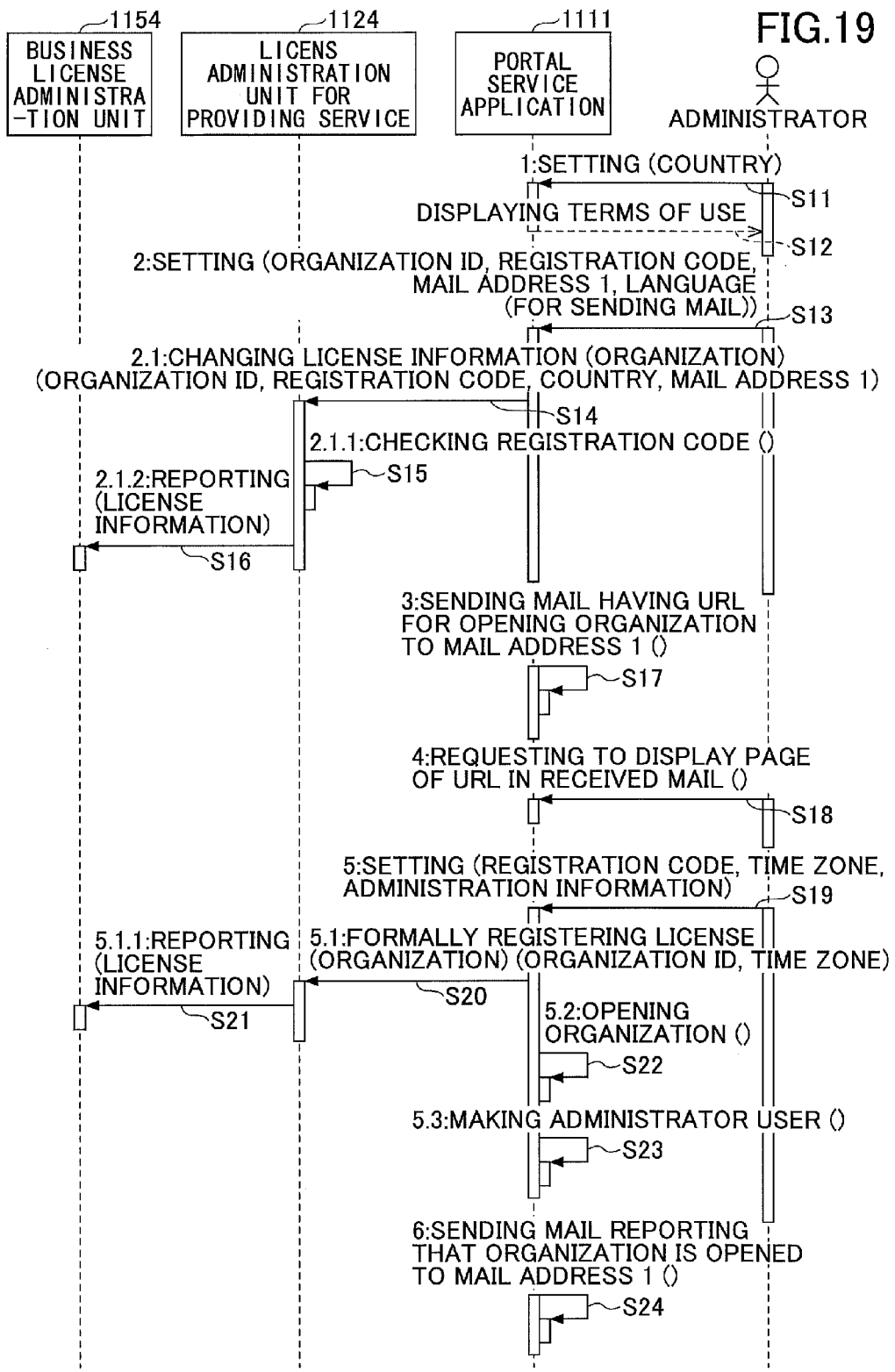

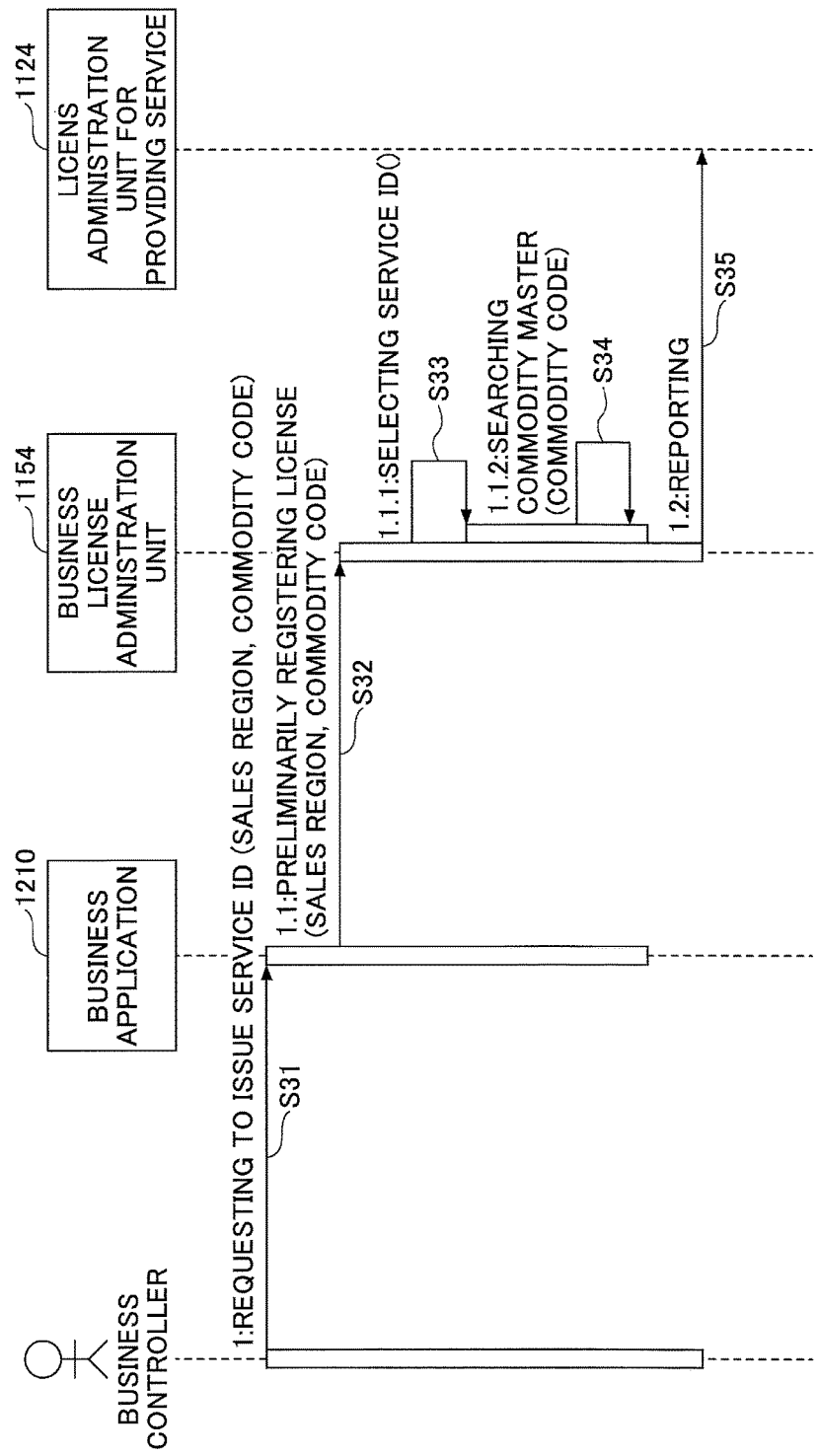

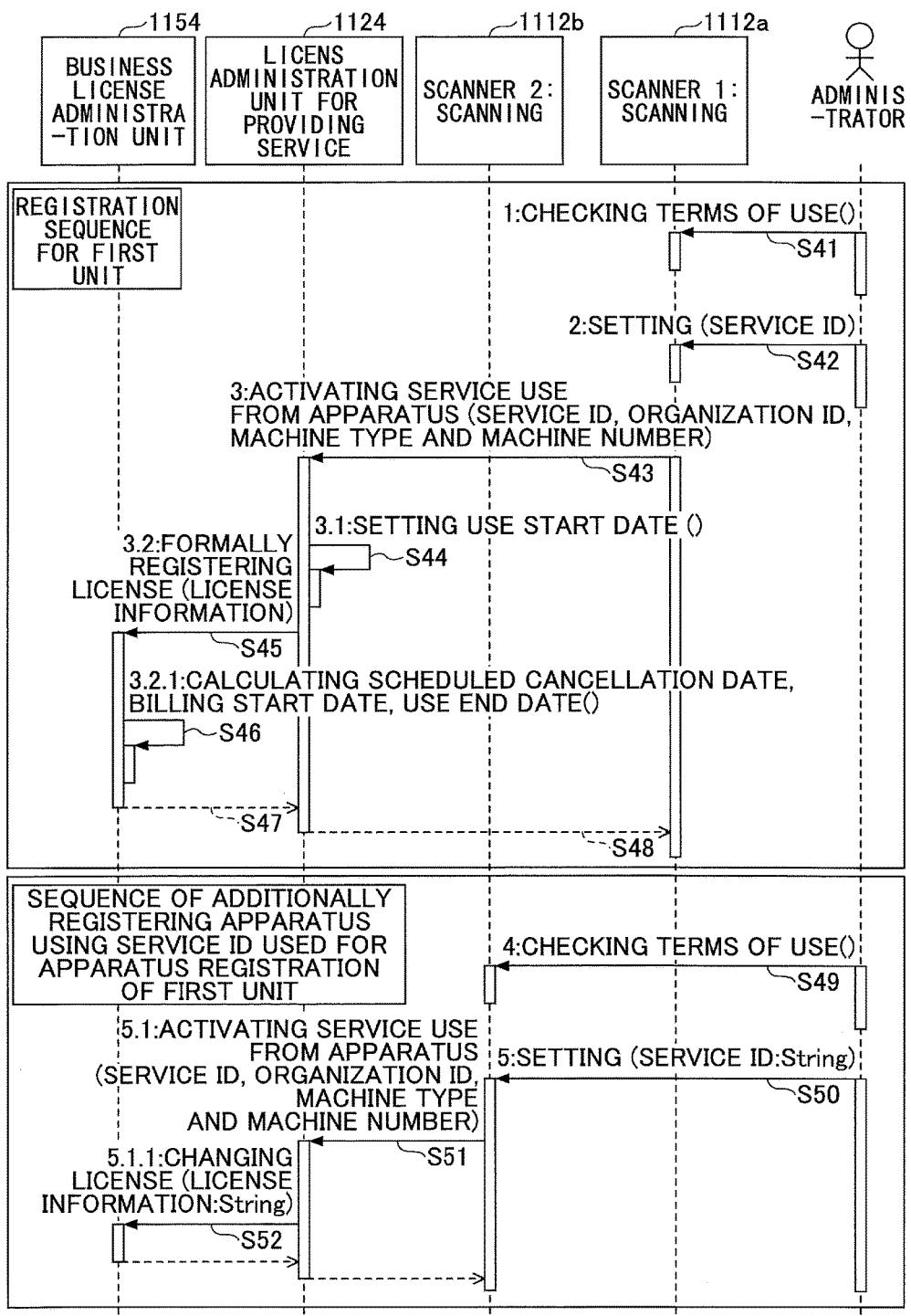

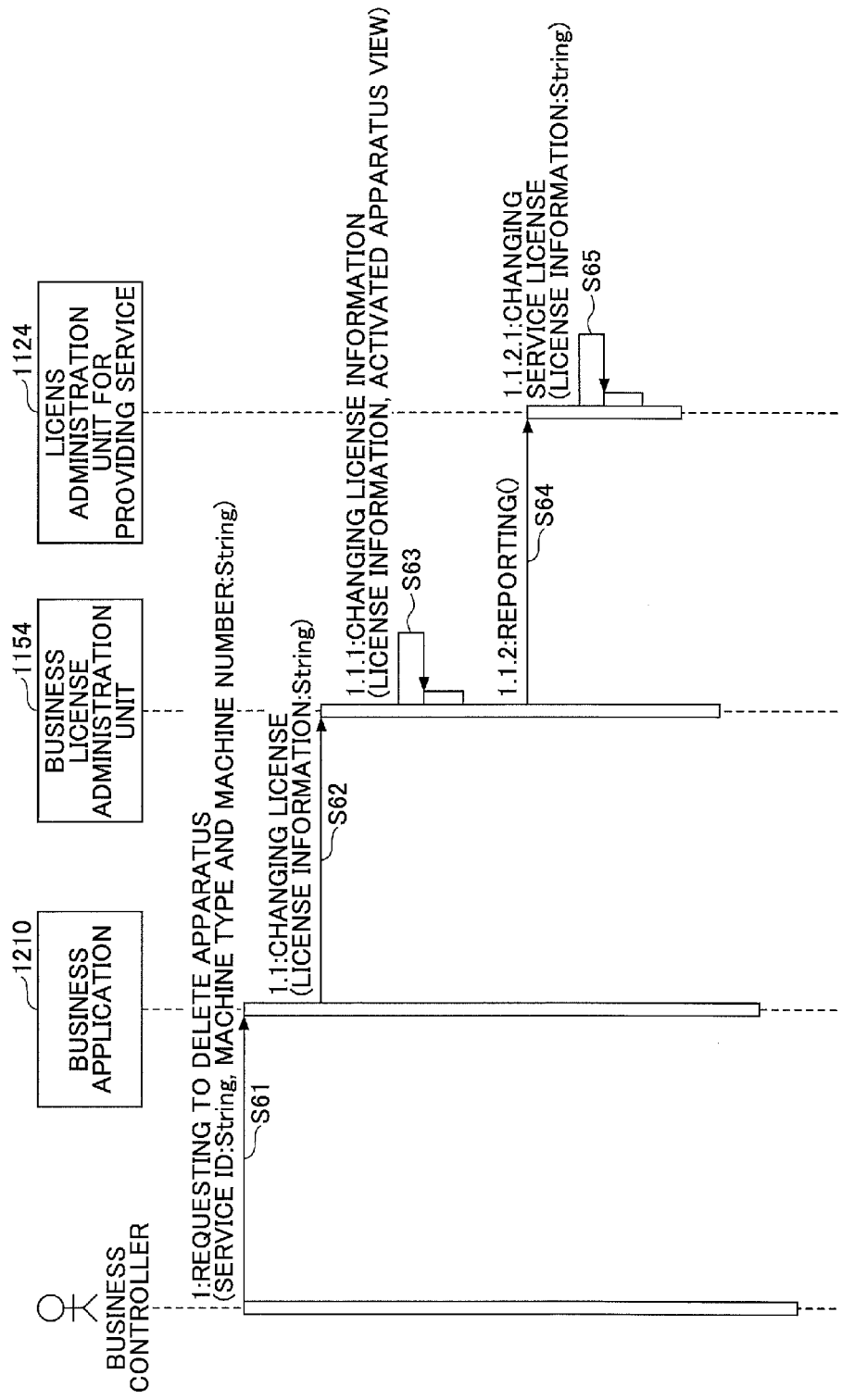

FIG.23

□ start.○○○    ×        — □ ×

← → C ⌂ [      ] ☆

CHANGE OF SERVICE ID

■ start. ○○○ ADMINISTRATION > SEARCH OF SERVICE ID    NAME: ×× 太郎   LOGIN DATE:27/Jul (7)/2011 12:00:00   LOGOUT   HELP

ERROR MESSAGE IS DISPLAYED HERE.
■ SERVICE MESSAGE

| サービスID | 0000000001234 | | 組織ID | 11111111222 |
|---|---|---|---|---|
| 商品コード | ABCDEF | | | |
| 商品名 | ○○○ Scan CX 1年契約 | | | |
| 販売地域 | 欧州 | | 販売国 | スウェーデン |
| 販社 | ○○○スウェーデン | | 販売店 | |
| 利用国 | スウェーデン | | 課金区分 | 課金あり |
| 利用お客様名 | 株式会社○○ 総務部 経理課 | | | |
| タイムゾーン | | | 稼働区分 | 稼働 |
| 販売担当メールアドレス | jiro.○○○@○○○.com | | | |
| 利用開始日 | 23/Jul(7)/2012 | | 利用終了日 | 31∨/Jul(7)∨/2013∨ |
| サービス停止予定日 | 31∨/Aug(8)∨/2013∨ | | サービス停止日 | |
| 発行日(GMT) | 23/Jun(6)/2012 12:00:21 | | 発行者 | ○○○ 北海道営業本部 ××太郎 |
| 最終更新日(GMT) | 03/Aug(8)/2012 08:45:30 | | 最終更新者 | ○○○スウェーデン ××× |

□ VIEW OF MACHINE TYPE AND MACHINE NUMBER

TOTAL NUMBER: 10, PAGE 1/2 [TOP][PREVIOUS] 1 2 [NEXT][BOTTOM]   ITEM NUMBER ON ONE PAGE 5∨

| DELETION OBJECT | No. | APPARATUS STATUS | MACHINE TYPE AND MACHINE NUMBER | INSTALLATION DESTINATION |
|---|---|---|---|---|
| □ | 1 | 引き上げ | 34VA-N3920EE86 | 北海道札幌市西区○○×× |
| □ | 2 | 引き上げ | 34VA-N3920EE87 | 新潟市中央区新光町○○×× |
| □ | 3 | 稼働 | 34VA-N3920EE68 | 石川県金沢市鞍月○○×× |
| □ | 4 | 稼働 | 34VA-N3920EE69 | 沖縄県那覇市泉崎○○×× |
| □ | 5 | 稼働 | 34VA-N3920EE70 | 東京都新宿区西新宿○○×× |

CHECK     RETURN

```
□ start. OOO                    ×
← → C  ⌂                        ☆
┌─────────────────────────────────────┐
│ OOO start. OOO    &̲ ̲O̲O̲O̲△△△ ⇥| LOGOUT  ? FAQ/INQUIRY │
│ APPLICATION │ OOO Scan CX │ SERVICE ADMINISTRATION │ USER ADMINISTRATION │ SETUP │
│ DETAILED LICENSE INFORMATION                                             │
│ DETAILED LICENSE INFORMATION IS AS FOLLOWS:                              │
│ ▌DETAILED LICENSE INFORMATION                                            │
│                                                                          │
│   SERVICE NAME:        OOO Scan CX                                       │
│   SERVICE ID:          703838861001                                      │
│   NUMBER OF USES:      3                                                 │
│   UPPER LIMIT NUMBER:  100                                               │
│   USE START DATE :     2013/09/06                                        │
│   USE END DATE :       2014/09/05                                        │
│   STATE:               NOW BEING USED                                    │
│ ▌REGISTERED APPARATUS VIEW                                               │
│       ┌────────────────────┐                                             │
│       │ V9600000000        │                                             │
│       │ 3A80-071084        │                                             │
│  1-50 │ W540B000029        │                                             │
│       │                    │                                             │
│       └────────────────────┘                                             │
│                                                                          │
│   [  OK  ]                                                               │
└──────────────────────────────────────┘
```

FIG.35

| ← → C ☆ | ☐ start. ○○○ × | | | |
|---|---|---|---|---|

○○○ start. ○○○      ஃ ○○○△△△ ➡| LOGOUT  ? FAQ/INQUIRY

| APPLICATION | ○○○ Scan CX | SERVICE ADMINISTRATION | USER ADMINISTRATION | SETUP |
|---|---|---|---|---|

LICENSE RENEWAL

SELECT LICENSE TO BE RENEWED AND PUSH "RENEWAL".
SERVICE NAME: ○○○ Scan CX
SERVICE ID: 464946494649

NUMBER OF DISPLAYED ITEMS: 20 ▽     ▼ ▲ 1/11 ▼ ▲

| | SERVICE NAME | SERVICE ID | MACHINE NUMBER | USE START DATE ▶ | USE END DATE | STATE |
|---|---|---|---|---|---|---|
| ○ | ☐ ○○○ Scan CX | 4110000000006 | DEVICE-7066 | 2016/03/01 | 2017/03/01 | DURING USE (NOT RENEWED) |

| SERVICE TYPE | LICENSE ID | ORGANIZATION ID | MACHINE TYPE AND MACHINE NUMBER |
|---|---|---|---|
| SCAN | 100000000001 | Tenant1 | – |
| SCAN | 100000000001 | Tenant1 | DEVICE-0001 |
| SCAN | 100000000001 | Tenant1 | DEVICE-0002 |
| PRINT | 100000000002 | Tenant1 | – |
| PRINT | 100000000002 | Tenant1 | DEVICE-0001 |
| SCAN | 100000000003 | Tenant2 | – |
| SCAN | 100000000003 | Tenant2 | DEVICE-0003 |

INFORMATION PROCESSING SYSTEM, INFORMATION PROCESSING APPARATUS, METHOD OF ADMINISTRATING LICENSE, AND PROGRAM

BACKGROUND OF THE INVENTION

1. Field of the Invention

The present invention generally relates to an information processing system, an information processing apparatus, a method of administrating license, and a program.

2. Description of the Related Art

For example, there is known a license administration system featured to respond to a use request for using a software program with a license as a method of controlling the license in, for example, an information processing apparatus. This license administration system has a function of administrating an application and information of a device performing the application. This license administration system performs a license administration activating an application in a device to which an execution is permitted (see, for example, Patent Document 1).

Patent Document 1: Japanese Laid-Open Patent Publication No. 2006-18770

In recent years, there is increasing a new mode of providing a service where only a necessary function can be used when a user needs it. In a case where the service can be used by the above new mode of providing the service, the user purchases, for example, a license from a sales company (a distributor) of the service.

A service distributor administrates the license issued to the user by, for example, a business system. The service providing system judges whether the service is provided based on the license issued by the business system. However, in a case where multiple business systems are provided such that individual business systems are provided for each distributor, it is not easy to administrate the license issued by each business system.

SUMMARY OF THE INVENTION

It is an object of at least one embodiment of the present invention to provide an information processing system, an information processing apparatus, a method of administrating a license, and a program that substantially obviates one or more problems caused by the limitations and disadvantages of the related art.

One aspect of the embodiments of the present invention may be to provide an information processing system including at least one information processing apparatus, the information processing system including at least one service providing unit that provides a service to at least one apparatus associated with a license; and a license administration unit that administrates a provisionally registered license or a registered license, wherein each of the at least one service providing unit includes a second memory unit that stores a copy of the license information of the license stored by a first memory unit and administered by the license administration unit, and an activation unit that receives a request to activate the license from the apparatus, activates the provisionally registered license in association with identification information of the apparatus or associates the registered license with the identification information of the apparatus by adding the identification information of the apparatus to the registered license, and requests a change of the license information of the license stored in the second memory unit to be reflected on the license information of the license stored in the first memory unit, wherein the activation unit adjust a quantity of the identification information of the at least one apparatus associated with the registered license based on the quantity of the at least one apparatus by which a service included in the license information is made usable.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 10 is a structural view of exemplary organization information;

FIG. 11 is a structural view of exemplary user information.

FIG. 12 is a structural view of exemplary license information.

FIG. 13 is a structural view of exemplary activated apparatus view information;

FIG. 14 is a structural view of exemplary apparatus information.

FIG. 19 is a sequence chart of an exemplary process of opening an organization.

FIG. 20 is a sequence chart of an exemplary process of issuing a service ID.

FIG. 21 is a sequence chart of an exemplary process of registering the service ID.

FIG. 22 is a sequence chart illustrating an exemplary process of deleting an apparatus associated with a volume license.

FIG. 23 is an image chart of an exemplary service ID change screen.

FIG. 25 is an image chart of an exemplary service administration screen after registering a service.

FIG. 26 is an image chart of an exemplary detailed license screen.

FIG. 35 is an image chart of an exemplary service selection screen at a time of renewing the license.

FIG. 37 is an image chart of an exemplary service administration screen for the service continuing by the renewed license.

FIG. 40 is a structural view of a service permission table.

DETAILED DESCRIPTION OF THE PREFERRED EMBODIMENTS

Figure 1:
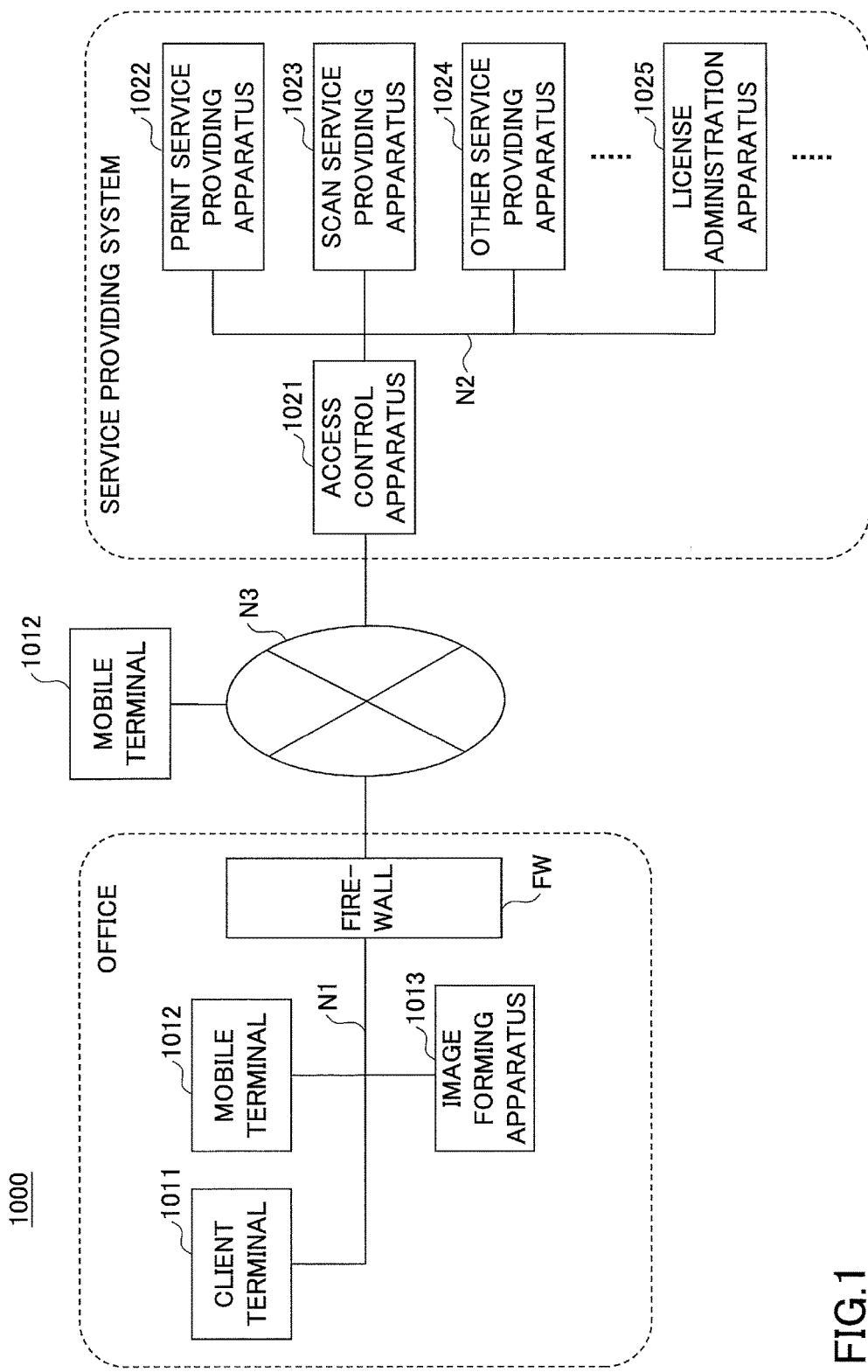
FIG. 1 illustrates a structure of an exemplary information processing system of a first embodiment.

A description is given below, with reference to the FIG. 1 through FIG. 46 of embodiments of the present invention. Where the same reference symbols are attached to the same parts, repeated description of the parts is omitted.

Reference symbols typically designate as follows:
1000: information processing system;
1011: client terminal;
1012: mobile terminal;
1013: image forming apparatus;
1021: access control apparatus;
1022: print service providing apparatus;
1023: scan service providing apparatus;
1024: other service providing apparatus;
1025: license administration apparatus;
1051: portal service providing apparatus;
1052: print service providing apparatus;
1053: scan service providing apparatus;
1061: authentication service providing apparatus;
1062: data process service providing apparatus;
1063: temporary data storage service providing apparatus;
1071: authentication information service memory unit;
1072: job information memory device;
1073: temporary data memory apparatus;
1081: license administration apparatus;
1082: client information administration apparatus;
1100: service providing system;
1101: application;
1102: common service;
1103: database;
1104: platform Application Programming Interface (API);
1105: business service;
1106: domain inherent service;
1107: domain inherent API;
1111: portal service application;
1112: scan service application;
1112a: UI unit of scan service application;
1112b: logic unit of scan service application;
1113: print service application;
1113a: UI unit of print service application;
1113b: logic unit of print service application;
1121: authentication and permission unit;
1122: organization administration unit;
1123: user administration unit;
1124: license administration unit for providing service;
1125: apparatus administration unit;
1126: temporary image storing unit;
1127: image processing workflow controlling unit;
1128: log collection unit;
1131: message queue;
1132: worker;
1141: log information memory unit;
1142: organization information memory unit;
1143: user information memory unit;
1144: license information memory unit;
1145: apparatus information memory unit;
1146: temporary image memory unit;
1147: job information memory apparatus;
1148: setup information memory unit inherent in application;
1151: customer information administration unit;
1152: contract administration unit;
1153: sales administration unit;
1154: business license administration unit;
1201: business terminal;
1202: user terminal;
1203: multifunction peripheral (MFP);
1204, 1205: data center;
1206: license administration server;
1207, 1209: license DB;
1208: service providing apparatus;
1210: business application;
1211: service providing application;
1212: business API;
1213: platform API;
1500: computer system;
1501: input device;
1502: display device;
1503: external I/F;
1503a: recording medium;

1504: RAM;
1505: ROM;
1506: CPU;
1507: communication I/F;
1508: HD;
B: bus;
FW: firewall; and
N1-N3: network.

[First Embodiment]

<System Structure>

FIG. 1 illustrates a structure of an exemplary information processing system of a first embodiment. The information processing system 1000 illustrated in FIG. 1 includes, for example, a network N1 such as an inter-office network, a network N2 of a service providing system represented by a cloud computing service, and a network N3 such as the Internet.

The network N1 is a private network located inside a firewall FW. The firewall FW is installed at a node between the network N1 and the network N3. The firewall FW detects and blocks an unauthorized access. A client terminal 1011, a mobile terminal 1012, and an image forming apparatus 1013 such as a multifunction peripheral are connected to the network N1.

The client terminal 1011 is an example of a terminal apparatus. The client terminal 1011 can be substantialized by an information processing apparatus, in which an ordinary OS or the like is installed. The client terminal 1011 includes a wired or wireless communication means. The client terminal 1011 is a terminal, which can be operated by a user, such as a tablet PC or a notebook PC.

The mobile terminal 1012 is an example of the terminal apparatus. The mobile terminal 1012 includes a wired or wireless communication means. The mobile terminal 1012 such as a smartphone, a portable phone, a tablet PC, a notebook PC, or the like, can be carried by the user.

The image forming apparatus 1013 is an apparatus having an image forming function such as a multifunction peripheral. The image forming apparatus 1013 includes a wireless or wired communication means. The image forming apparatus 1013 is an apparatus of performing processes related to image formation such as a multifunction peripheral, a copier, a scanner, a printer, a laser printer, a projector, and an electronic blackboard.

Referring to FIG. 1, the number of the client terminal 1011, the number of the mobile terminal 1012, and the number of the image forming apparatus 1013 are one, for example. However, the numbers of the client terminal 1011, the mobile terminal 1012, and the image forming apparatus 1013 may be plural.

The network N2 is connected to the network N3 by an access control apparatus 1021. Security of the network N2 is protected by the access control apparatus 1021. A print service providing apparatus 1022, a scan service providing apparatus 1023, another service providing apparatus 1024, a license administration apparatus 102, and so on are connected to the network N2.

The information processing system 1000 is substantialized by the access control apparatus 1021, the print service providing apparatus 1022, the scan service providing apparatus 1023, the other service providing apparatus 1024, the license administration apparatus 1025, and so on. The print service providing apparatus 1022, the scan service providing apparatus 1023, and the other service providing apparatus 1024 provide a print service, a scan service, and another service. The license administration apparatus 1025 performs a process related to license administration.

The access control apparatus 1021 controls a login to the print service provided by the print service providing apparatus 1022, the scan service provided by the scan service providing apparatus 1023, or the like.

The access control apparatus 1021, the print service providing apparatus 1022, the scan service providing apparatus 1023, the other service providing apparatus 1024, and the license administration apparatus 1025 are substantialized by at least one information processing apparatus.

The access control apparatus 1021, the print service providing apparatus 1022, the scan service providing apparatus 1023, the other service providing apparatus 1024, and the license administration apparatus 1025 may be substantialized by incorporating into one information processing apparatus or by distributing to multiple information processing apparatuses.

A part of the service on the side of the network N2 may exist outside the network N2. The mobile terminal 1012 may exist outside the network N1 such as the inter-office network. In the information processing system 1000 illustrated in FIG. 1, the mobile terminal 1012 exists in the network N1 and the network N3.

Figure 2:
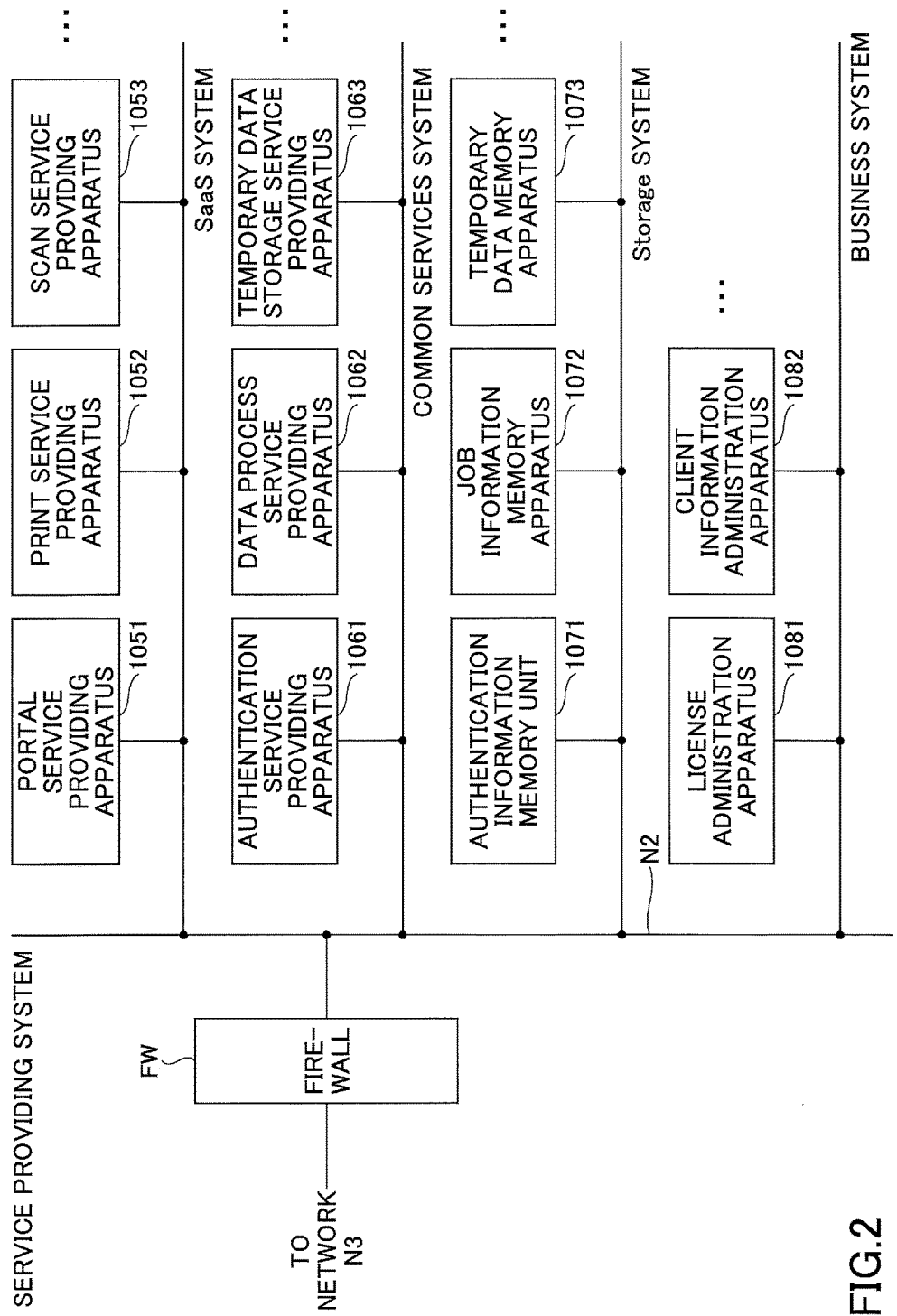
FIG. 2 illustrates a structure on an exemplary service providing system.

The structure of the service providing system illustrated in FIG. 1 is an example. The service providing system may be substantialized by a structure illustrated in FIG. 2. FIG. 2 illustrates a structure on another exemplary service providing system. In the service providing system illustrated in FIG. 2, the network 2 is connected to the network N3 by the firewall FW.

A service providing system of a Software as a Service (SaaS) system, a service providing system of a common service (Network Service Platform) system, a memory apparatus of a storage (Storage) system, and an administration apparatus of a business system are connected to the network N2. Here, the service providing apparatus of the common service system provides a service used by the service providing apparatus of the SaaS system in common.

The service providing apparatus of the SaaS system includes a service providing apparatus corresponding to provided services, such as a portal service providing apparatus 1051, a print service providing apparatus 1052, or a scan service providing apparatus 1053. The service providing apparatus of the common service system includes a service providing apparatus corresponding to provided common services, such as an authentication service providing apparatus 1061, a data process service providing apparatus 1062, or a temporary data storage service providing apparatus 1063.

The memory apparatus of the storage system includes a memory apparatus corresponding to stored information (data), such as an authentication information service memory unit 1071, a job information memory device 1072, or a temporary data memory apparatus 1073. The administration apparatus of the business system includes an administration apparatus corresponding to administered information, such as a license administration apparatus 1081 or a client information administration apparatus 1082.

In the service providing system illustrated in FIG. 2, security is protected by an authentication service provided by, for example, the firewall FW or an authentication service providing apparatus 1061. The structure of the service providing system illustrated in FIG. 2 is an example. The service providing system may have another structure. Various apparatuses, various terminals, and the networks forming the service providing system illustrated in FIGS. 1 and 2 may be structured in a virtual environment.

<Hardware Structure>

Figure 3:
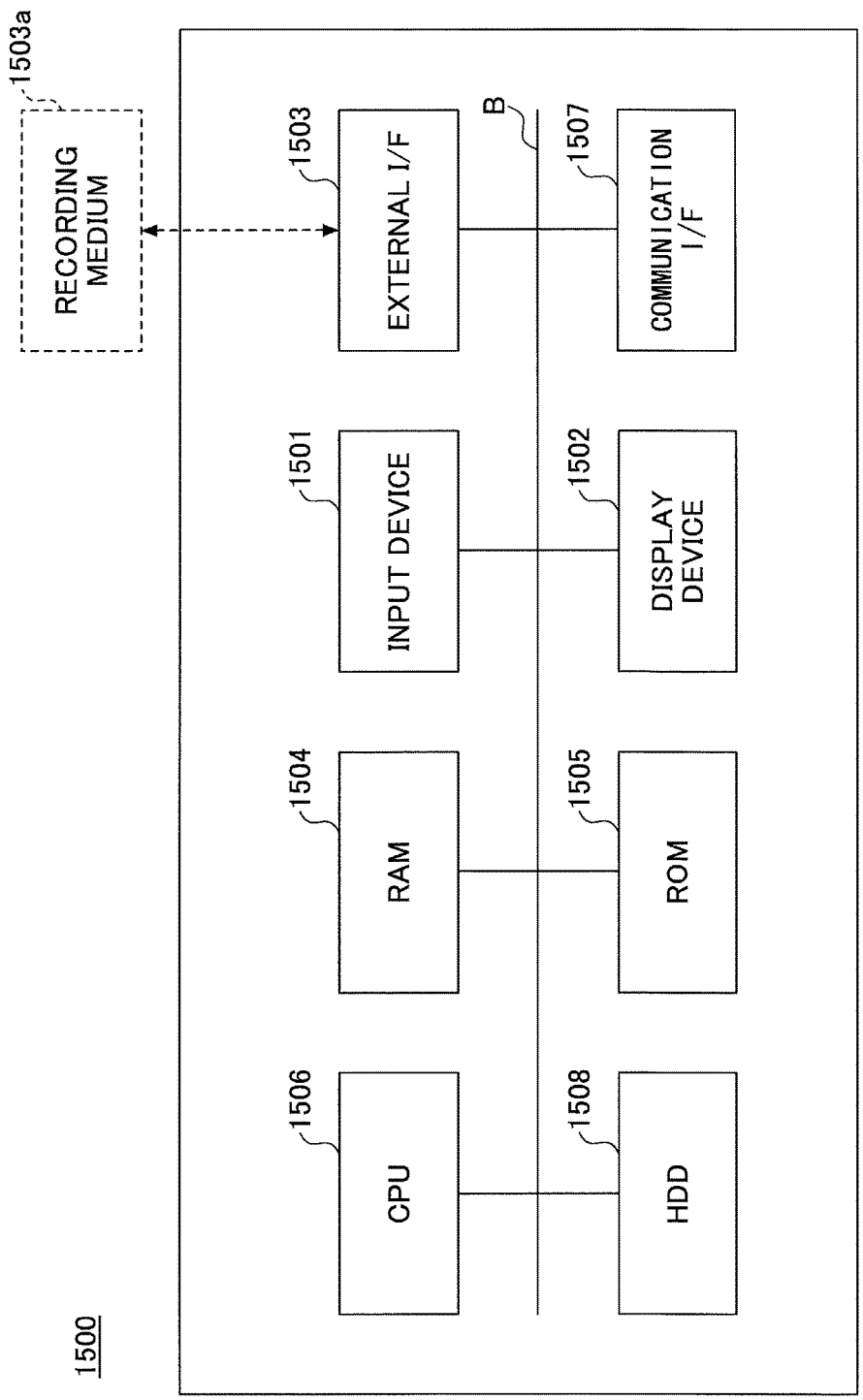
FIG. 3 illustrates a hardware structure of an exemplary computer system.

The client terminal 1011 and the mobile terminal 1012 are substantialized by a computer system having, for example, a hardware structure illustrated in FIG. 3. The access control apparatus 1021, the print service providing apparatus 1022, the scan service providing apparatus 1023, the other service providing apparatus 1024, and the license administration apparatus 1025 are substantialized by the computer system having, for example, the hardware structure illustrated in FIG. 3.

The service providing apparatus of the SaaS system, the service providing apparatus of the common service system, the memory apparatus of the storage system, and the administration apparatus of the business system, which are illustrated in FIG. 2, may be substantialized by a computer system having, for example, the hardware structure illustrated in FIG. 3.

FIG. 3 illustrates a hardware structure of an exemplary computer system. Referring to FIG. 3, the computer system 1500 includes an input device 1501, a display device 1502, an external I/F 1503, a RAM 1504, a ROM 1505, a CPU 1506, a communication I/F 1507, a HDD 108, and so on. In the computer system 1500, the input device 1501, the display device 1502, the external I/F 1503, the RAM 1504, the ROM 1505, the CPU 1506, the communication I/F 1507, the HDD 108, and so on are mutually connected by the bus B.

The input device 1501 includes a keyboard, a mouse, a touch panel, and/or the like, by which the user inputs various operation signals. The display device 1502 includes a display or the like to display a processing result obtained by the computer system 1500.

The communication I/F 1507 is an interface provided to connect the computer system 1500 to the networks N1 to N3. Thus, the computer system 1500 can perform data communications with another apparatus and/or another terminal through the communication I/F 1507.

The HDD 1508 is a non-volatile memory device storing programs and/or data. The program and/or data to be stored is, for example, an operating system (OS), which is basic software controlling the entire computer system 1500, application software providing various functions in the OS, and so on.

Further, the HDD 1508 administrates the stored program and the stored data using a predetermined file system and/or a predetermined data base (DB). The external I/F 1503 is an interface with the external apparatus. The external apparatus is a recording medium 1503a or the like. With this, the computer system 1500 can read information from the recording medium 1503a and/or write information to the recording medium 1503a through the external I/F 1503.

The recording medium 1503a includes, for example, a flexible disk, a compact disk (CD), and a digital versatile disk (DVD). The recording medium 1503a may be an SD memory card, a universal serial bus (USB) memory, or the like.

The read only memory (ROM) 1505 is a non-volatile semiconductor memory (a memory device), which can hold a program and/or data even when a power source is powered off. The ROM 1505 stores programs and data used for a basic input/output system (BIOS), OS setup, network setup, or the like, which are executed at a time of booting up the computer system 1500.

The random access memory (RAM) 1504 is a volatile semiconductor memory (a memory device) temporarily storing a program and/or data. The central processing unit (CPU) 1506 reads the program and/or data out to the RAM 1504 from the memory device such as the ROM 1505, the HDD 1508, or the like. The read program or data perform the process to thereby entirely substantialize controls or functions of the computer system 1500.

With such a hardware structure of the computer system 1500, the client terminal 1011 and the mobile terminal 1012 can substantialize various processes described later. The access control apparatus 1021, the print service providing apparatus 1022, the scan service providing apparatus 1023, the other service providing apparatus 1024, and the license administration apparatus 1025 can perform various processes described later by the hardware structure of the computer system 1500. The service providing apparatus of the SaaS system, the service providing apparatus of the common service system, the memory apparatus of the storage system, and the administration apparatus of the business system, which are illustrated in FIG. 2, can perform various processes described later by the hardware structure of the computer system 1500. A description of the hardware structures of the image forming apparatus 1013 and the firewall FW, which are illustrated in FIG. 1, is omitted.

<Software Structure>
<<Service Providing System>>

Figure 4:
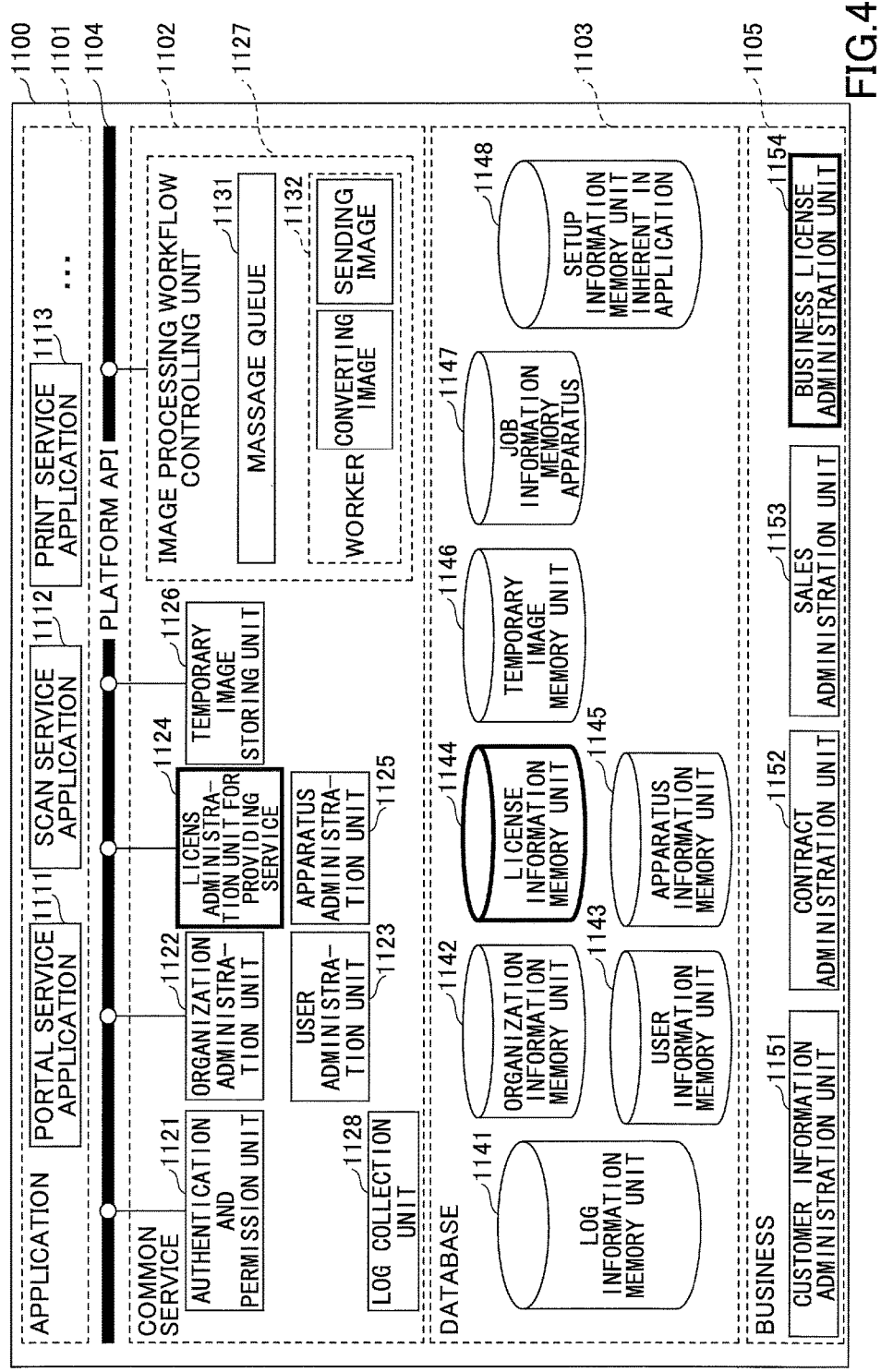
FIG. 4 is a processing block chart of an exemplary service providing system of the first embodiment.

The service providing system of the first embodiment is substantialized by, for example, a processing block illustrated in FIG. 4. FIG. 4 is a processing block chart of an exemplary service providing system of the first embodiment. The service providing system 1100 substantializes the processing block illustrated in FIG. 4 by executing the program.

The service providing system 1100 illustrated in FIG. 4 substantializes an application 1101, a common service 1102, a database (DB) 1103, a platform API 1104, and a business service 1105.

The application 1101 includes, for example, a portal service application 1111, a scan service application 1112, and a print service application 1113.

The portal service application 1111 is an application providing a portal service. The portal service provides a service as an entrance for using the service providing system 1100. The scan service application 1112 is an application for providing the scan service. The print service application 1113 is an application providing the print service. The application 1101 may include another service application.

The platform Application Programming Interface (API) platform 1104 is an interface used by the application 1101 such as the portal service application 1111 when the application 1101 uses the common service 1102. The platform API 1104 is an interface previously defined so that the common service 1102 receives a request from the application 1101. The platform API 1104 is structured by, for example, a function, a class, or the like.

The platform API 1104 can be substantialized by, for example, Web API which can be used through the network when the service providing system 1100 is structured by multiple information processing apparatuses.

The common service 1102 includes an authentication and permission unit 1121, an organization administration unit 1122, a user administration unit 1123, a license administration unit 1124 for providing service, an apparatus administration unit 1125, a temporary image storing unit 1126, an image processing workflow controlling unit 1127, and a log collection unit 1128.

The image processing workflow controlling unit 1127 includes a message queue 1131 and at least one worker (Worker) 1132. The worker 1132 substantializes a function such as an image conversion or an image transmission.

The authentication and permission unit 1121 performs authentication and/or permission based on a login request received from office equipment such as the client terminal 1011, the image forming apparatus 1013, or the like. The office equipment is a general term of the client terminal 1011, the mobile terminal 1012, the image forming apparatus 1013, and so on.

The authentication and permission unit 1121 accesses, for example, a user information memory unit 1143, a license information memory unit 1144, or the like, which are described below, and authenticates and/or permits the user. Further, the authentication and permission unit 1121 accesses, for example, an organization information memory unit 1142, the license information memory unit 1144, the apparatus information memory unit 1145, or the like, which are described below, to authenticate the image forming apparatus 1013.

The organization administration unit 1122 administrates organization information stored in the organization information memory unit 1142. The user administration unit 1123 administers the user information stored in a user information memory unit 1143 described below.

The license administration unit 1124 for providing service administrates the license information stored in the license information memory unit 1144 described below. The apparatus administration unit 1125 administers apparatus information stored in the apparatus information memory unit 1145 described later. The temporary image storing unit 1126 stores a temporary image in a temporary image memory unit 1146 described later and acquires the temporary image from the temporary image memory unit 1146.

The image processing workflow controlling unit 1127 controls a workflow related to image processing based on a request from the application 1101. The message queue 1131 includes queues corresponding to types of the processes. The image processing workflow controlling unit 1127 inputs a message of a request related to a process (a job) into the queue corresponding to the type of the job.

The worker 1132 monitors the corresponding queue. When the message is input in the queue, the worker 1132 performs a process such as an image conversion or an image transmission corresponding to the type of the job. The message input in the queue may be mainly read out (Pull) by the worker 1132, or may be provided (Push) from the queue to the worker 1132.

The database 1103 includes a log information memory unit 1141, an organization information memory unit 1142, a user information memory unit 1143, a license information memory unit 1144, an apparatus information memory unit 1145, a temporary image memory unit 1146, a job information memory apparatus 1147, and a setup information memory unit inherent in the application 1148.

The log information memory unit 1141 stores log information. The organization information memory unit 1142 stores organization information described below. The user information memory unit 1143 stores user information described below. The license information memory unit 1144 stores license information described below. The apparatus information memory unit 1145 stores apparatus information described below.

The temporary image memory unit 1146 stores the temporary image. The temporary image is a file or data such as a scanned image processed by, for example, the worker 1132. The job information memory apparatus 1147 stores information (job information) of a request related to the process (the job). The setup information memory unit 1148 inherent in the application 1101 stores setup information inherent in the application 1101.

The business service 1105 includes the customer information administration unit 1151, the contract administration unit 1152, the sales administration unit 1153, and the business license administration unit 1154. The customer information administration unit 1151 administers client information. The contract administration unit 1152 administers contract information. The sales administration unit 1153 administers sales information. The business license administration unit 1154 administers the license information. The business license administration unit 1154 includes a license DB storing the license information.

The service providing system 1100 functions as an integrated platform for providing a common service such as authentication and permission or a workflow related to image processing and a service group for providing an application service such as the scan service, the print service, or a portal service.

The integrated platform includes, for example, the common service 1102, the database 1103, the platform API 1104, and the business service 1105. Further, the service group is formed by, for example, the application 1101. As described, in the service providing system 1100 illustrated in FIG. 4, the application 1101 and the business service 1105 are separated.

In the service providing system 1100, by adopting the structure where the service group and the integrated platform are separated, it is possible to easily develop the application 1101 using the platform API 1104.

A mode of classifying the processing blocks of the service providing system 1100 illustrated in FIG. 4 is an example. It is unnecessary that the application 1101, the common service 1102, the database 1103, and the business service 1105 are classified in a hierarchy illustrated in FIG. 4. As long as the processes of the service providing system 1100 of the first embodiment are processed, a relationship of the hierarchy illustrated in FIG. 4 or the like is not specifically limited.

Figure 5:
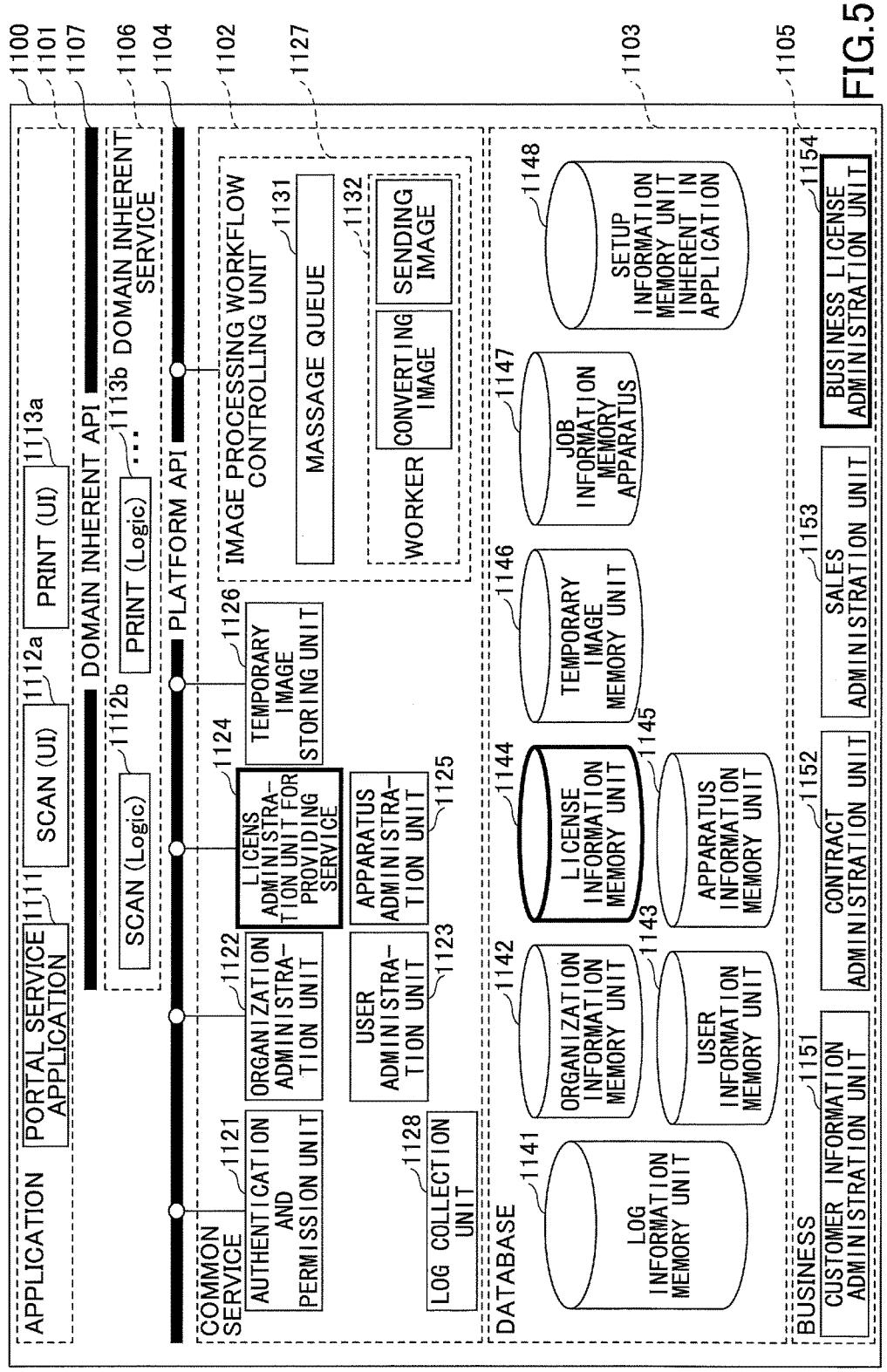
FIG. 5 is a processing block chart of another exemplary service providing system of the first embodiment.

Meanwhile, the processing blocks of the service providing system 1100 illustrated in FIG. 4 may be processing blocks illustrated in FIG. 5. FIG. 5 is a processing block chart of another exemplary service providing system of the first embodiment. Because the service providing system 1100 illustrated in FIG. 5 is similar to the service providing system 1100 illustrated in FIG. 4 except for a part, explanation is appropriately omitted for the same parts.

The service providing system 1100 substantializes a domain inherent service 1106 and a domain inherent API 1107 in addition to the processing blocks illustrated in FIG. 4 by performing the program. The service providing system 1100 illustrated in FIG. 5 differs from the service providing system 1100 at the application 1101, the domain inherent service 1106, and the domain inherent API 1107. The application illustrated in FIG. 5 includes the portal service application 1111, an UI unit 1112*a* of the scan service application, and an UI unit 1113*a* of the print service application, as an example. The domain inherent service 1106 includes a logic unit 1112*b* of the scan service application and a logic unit 1113*b* of the print service application, as an example.

The logic unit 1112*b* of the scan service application and the logic unit 1113*b* of the print service application are logics inherent in the domain and are accessed by the client such as the mobile terminal 1012 or the image forming apparatus 1013 other than the Web browser. For the client other than the Web browser, the UI unit such as the UI unit 1112*a* of the scan service application is arranged on the client side. Therefore, it is sufficient for the server side to be able to provide the domain inherent API 1107.

As such, in the service providing system 1100 illustrated in FIG. 5, the access from the web browser is received by a UI unit such as the UI unit 1112*a* of the scan service application. Further, the access from the client other than the web browser is received by a logic unit such as the logic unit 1112*b* of the scan service application. Because the frequency of accessing from the web browser is different from the frequency of accessing from the client other than the web browser, the client and the web browser are arranged as separate servers to effectively perform a scale out along with an increment of the frequencies. In the service providing system 1100 illustrated in FIG. 5, it is possible to construct a composite application by additionally using the domain inherent API 1107.

As described, the service providing systems 1100 illustrated in FIGS. 4-5 include the license information stored in the license information memory unit 1144 and the license information stored in the license DB of the business license administration unit 1154.

Figure 6:
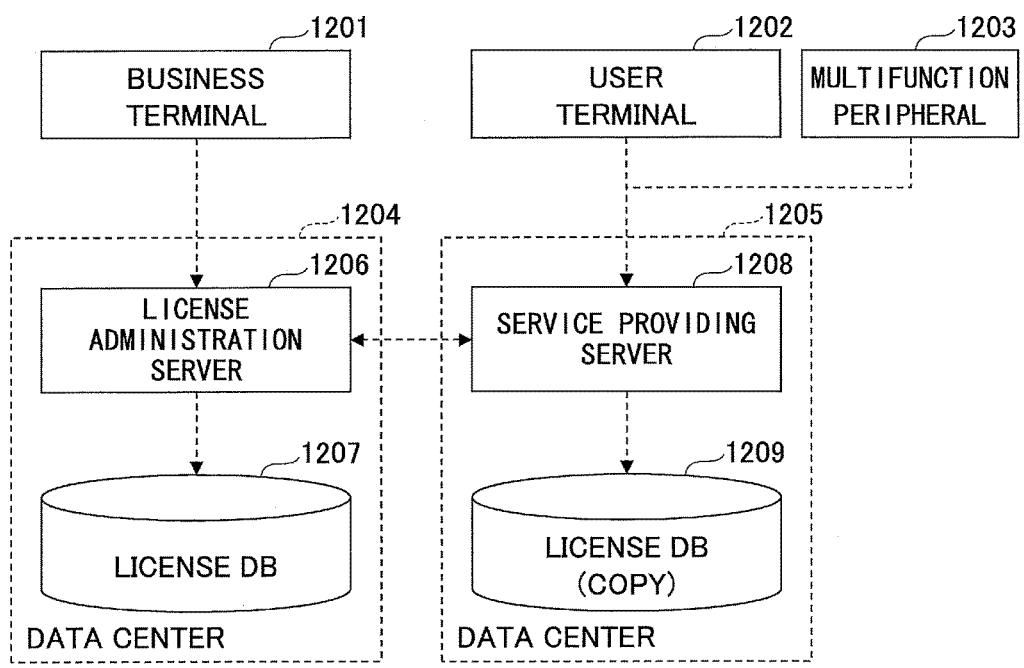
FIG. 6 explains license information in a license control apparatus of a business system and a service providing apparatus of a common service system.

FIG. 6 explains license information in the license administration apparatus of the business system and the service providing apparatus of the common service system. Referring to FIG. 6, the license information memory unit 1144 corresponds to a license DB 1209. A license DB of the business license administration unit 1154 is represented by a license DB 1207. The license DB 1207 is a master of the license information. The license DB 1209 is a copy of the license information.

Referring to FIG. 6, the business license administration unit 1154 corresponds to a license administration server 1206. Further, the application 1101, the common service 1102, the database (DB) 1103, and the platform API 1104 are represented by the service providing apparatus 1208. The license administration server 1206 is located in, for example, a data center 1204 close to a center of operating the business (e.g., a head office) so as to be uniformly managed.

Further, the service providing apparatus 1208 and the license DB 1209 are located in a data center 1205 close to the user in order to improve a response performance. The data center 1205 in which the service providing apparatus 1208 and the license DB 1209 are located may be located in multiple locations. The data center 1204 is connected to the data center 1205 by, for example, a private line or a VPN to thereby limit the server using a firewall.

The business terminal 1201 corresponds to the client terminal 1011 or the like operated by a business controller. The user terminal 1202 is a client terminal 1011 or the like operated by a user such as the administrator. A multifunction peripheral (MFP) 1203 is an example of the image forming apparatus 1013.

Figure 7:
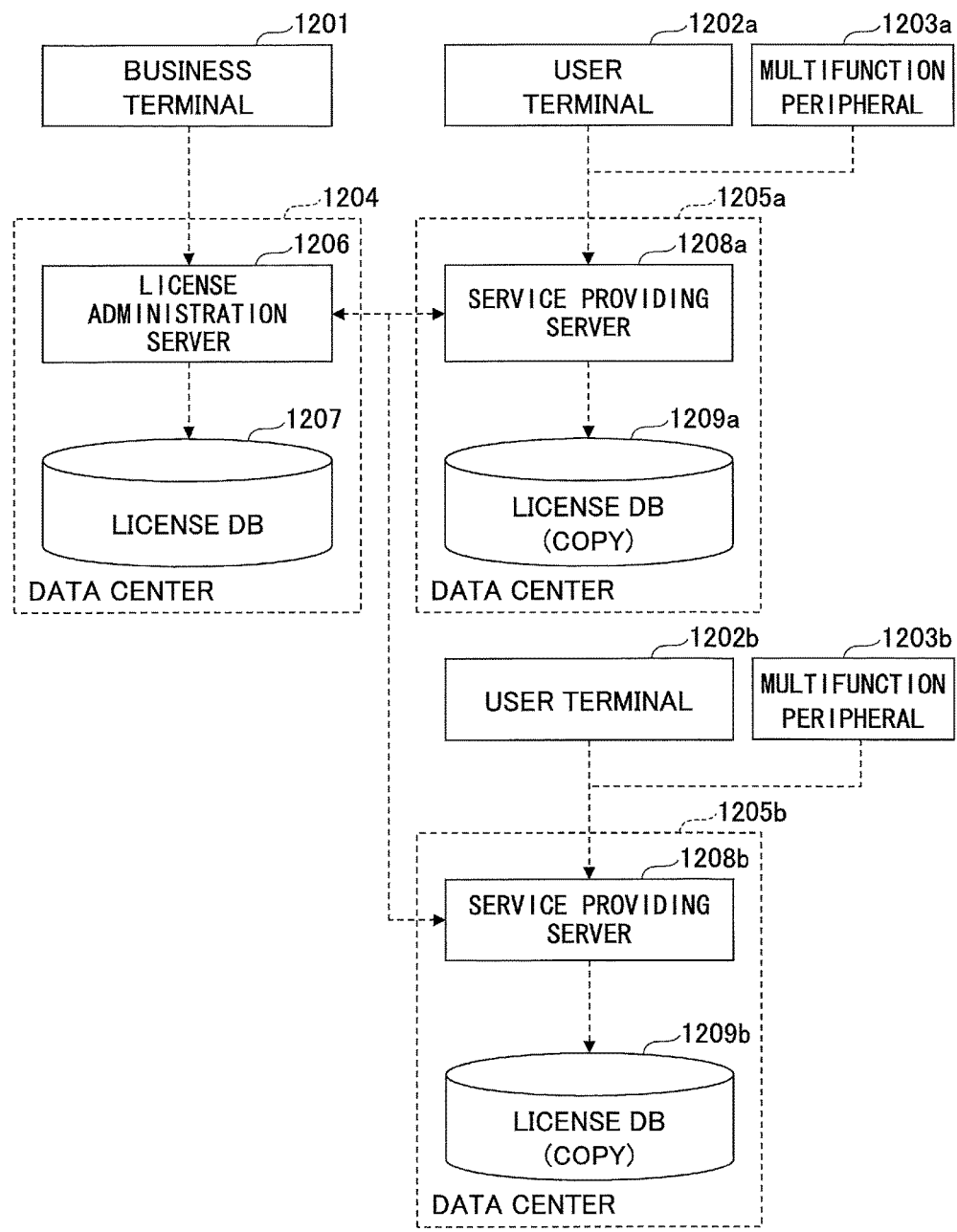
FIG. 7 explains license information in the license control apparatus of the business system and the service providing apparatus of the common service system.

In a case where the locations of the data centers 1205 are multiple, the business system and the common service system are structured as illustrated in FIG. 7. FIG. 7 explains the license information in the license administration apparatus of the business system and the service providing apparatus of the common service system. Referring to FIG. 2, the data centers 1205*a* and 1205*b* are located at two locations.

For example, the data centers 1205*a* and 1205*b* are located in association with regions (sales regions) where the sales are done. Borders of the sales regions are variously determined in consideration of business modes such as North America, Europe, or Japan.

The license administration server 1206 issues the license information and reports the issuance of the license information while distributing the license information and the reports into the data centers 1205*a* and 1206*b* corresponding to the designated sales regions when it is received to issue the license information, in which the sales region is designated. The license information issued by the license administration server is uniquely selected regardless of the sales regions.

Figure 8:
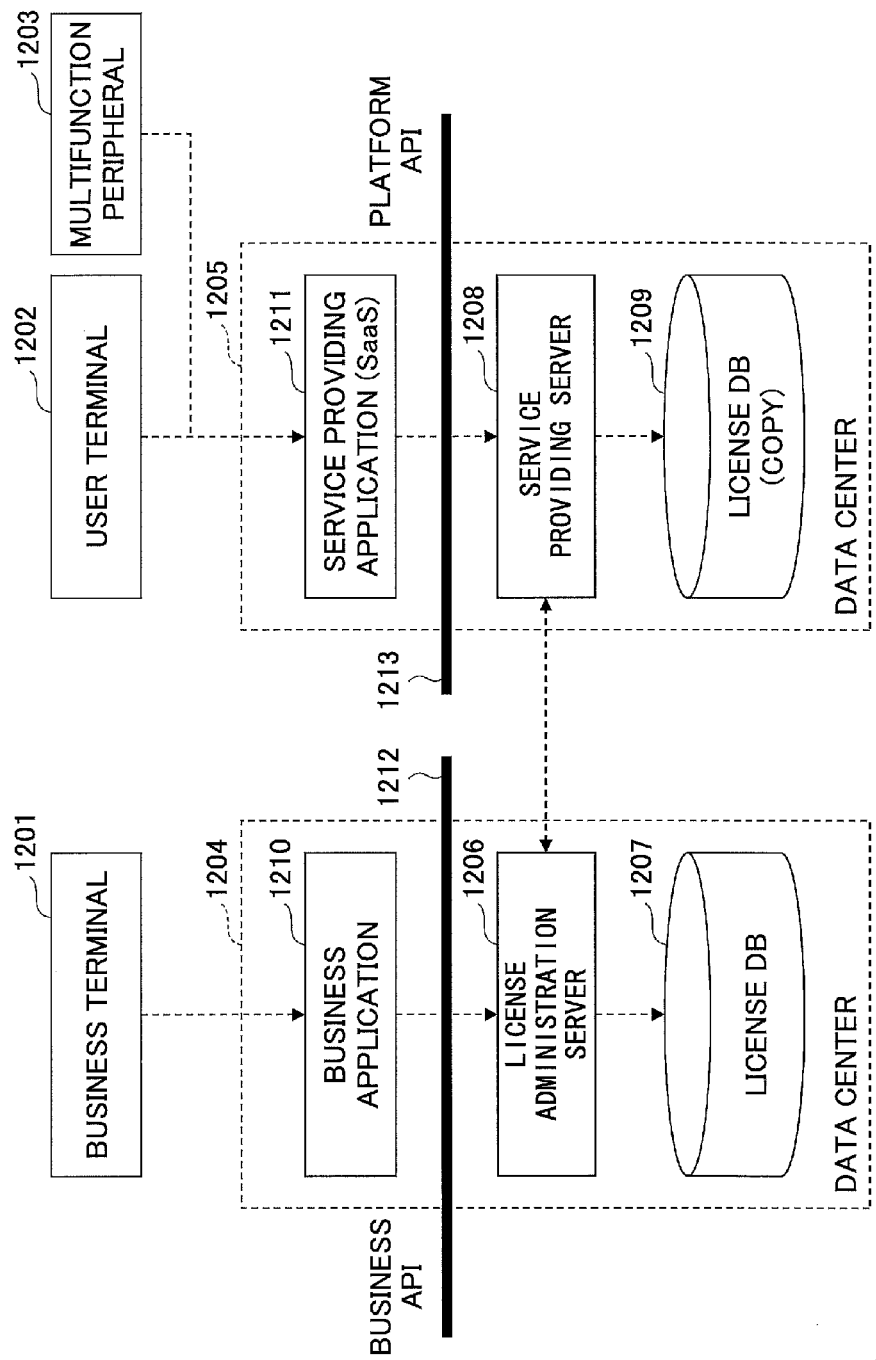
FIG. 8 explains an API used by the license control apparatus of the business system and the service providing apparatus of the common service system.

FIG. 8 explains an API used by the license administration apparatus of the business system and the service providing apparatus of the common service system. Referring to FIG. 8, a business application 1210, a service providing application 1211, a business API 1212, and a platform API 1213 are added to the structure illustrated in FIG. 6.

The business application 1210 is an application used by the business controller. The business API 1212 is provided to perform, for example, an issuance of the license, a cancellation of the license, a change of the license, or the like, which can be used from the business application 1210. The license administration server 1206 includes the business API 1212. The service providing application 1211 is an application used by the user such as the administrator. The platform API 1213 is provided to perform, for example, a reference of the license, a search of the license, a change of the license, or the like, which can be used from the service providing application 1211. The service providing apparatus 1208 includes the platform API 1213.

Figure 9:
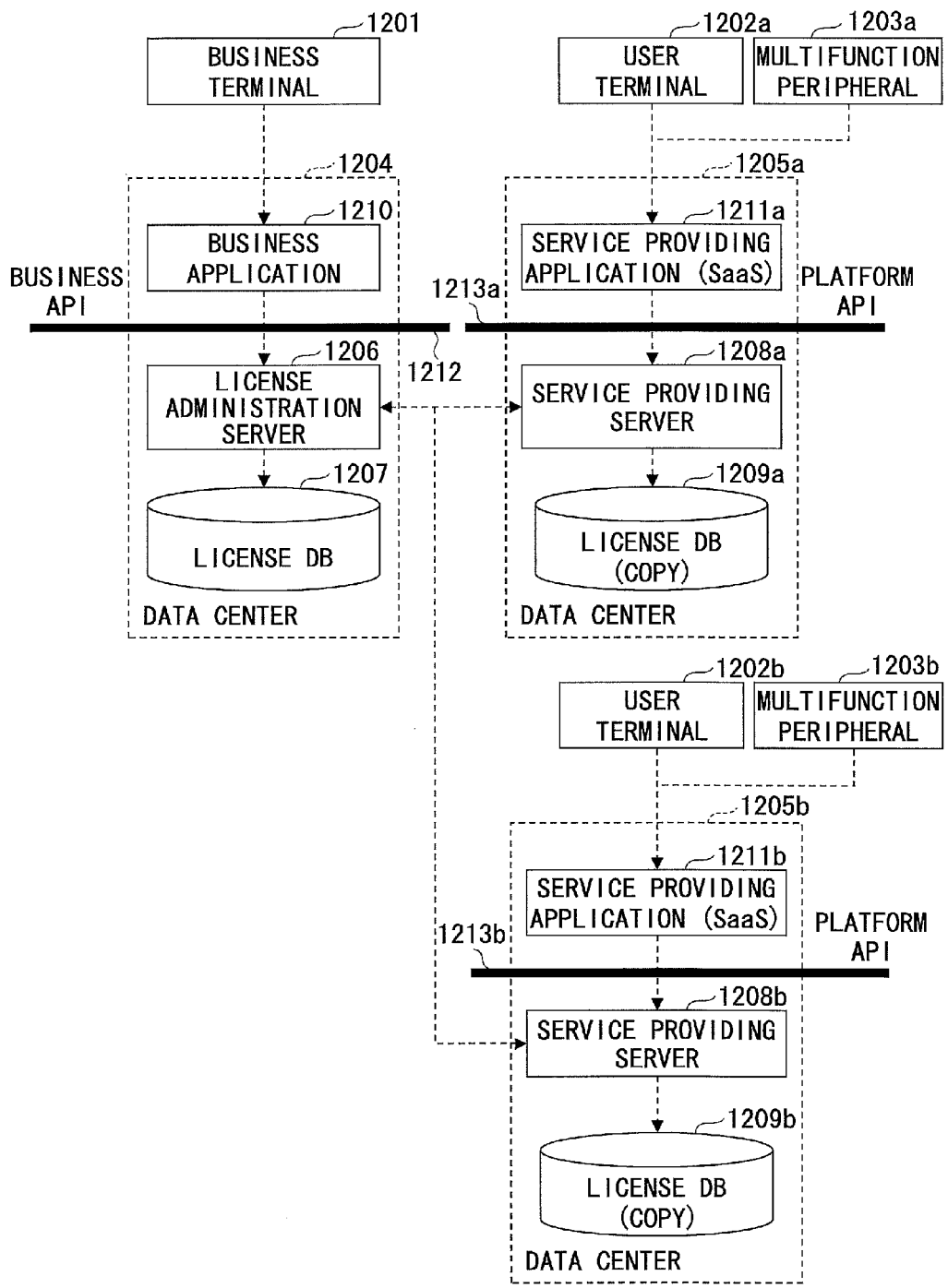
FIG. 9 explains an API used by the license control apparatus of the business system and the service providing apparatus of the common service system.

In a case where the locations of the data centers 1205 are multiple, the business system and the service providing system are structured as illustrated in FIG. 9. FIG. 9 explains an API used by the license administration apparatus of the business system and the service providing apparatus of the common service system. Referring to FIG. 9, the data centers 1205*a* and 1205*b* are located at two locations.

FIG. 10 is a structural view of exemplary organization information. The organization information illustrated in FIG. 10 includes an organization ID, an organization name, a display language, a time zone, a state, a country, and so on as data items. The organization ID is information uniquely specifying groups such as companies, departments, or the like. The organization ID is not limited to a meaning of the organization and may be information for identifying, for example, a contract. The organization ID is uniquely determined.

The organization name represents the name of the group such as the company or the department. The display language represents a language used for displaying the group name such as the company and the department. Further, the display language represents a display for an access from the browser and a language used for a body text of a mail. The time zone represents a standard time used by the group such as the company, the department, or the like. The state represents a state of the group such as the company or the department. The country represents a name of a country to which the company, the department, or the like belong.

FIG. 11 is a structural view of exemplary user information. The user information illustrated in FIG. 11 includes the organization ID, a user ID, a password, a user name, the display language, the time zone, the state, and so on.

The user ID and the password are information (user specifying information) for specifying the user. The user ID may be the user name or the like. The password is not indispensable. Although the user ID administered by the same organization ID is uniquely determined, the same user ID may be used in different organization IDs.

Further, identification information of an electronic medium (for example, an IC card) owned by the user may be used as the user ID. The electronic medium owned by the user is an IC card, a portable phone, a tablet terminal, an electronic book reader, or the like. Information identifying the electronic medium is a card ID, a serial ID, a telephone number of the portable phone, profile information of a terminal, or the like. It is possible to combine the information identifying the electronic medium in using the information identifying the electronic medium.

The user name represents the name of the user. The display language represents a language for displaying the user name. Further, the display language represents the display for the access from the browser and the language used for the body text of the mail. The time zone represents a standard time used by the user. The state represents the state of the user.

FIG. 12 is a structural view of exemplary license information. The license information illustrated in FIG. 12 includes a service type, a license ID, a sales region, a country, a time zone, a commodity code, a quantity (the number of apparatuses), a use start date, a billing start date, a use end date, a scheduled cancellation date, and a state, as the data items. Further, a parent service type, a parent license ID, a registration code, a machine type and machine number, a next license type, a next license ID, a license type, a license mode, a quantity (the number of users), the number of apparatuses which are being used, and the number of users which are being used, as the data items.

The service type is information for specifying the type of the service such as the portal service, the scan service, the print service, or the like. The license ID is identification information for identifying the license. The license ID becomes the organization ID in a case where the license is the organization license, and the service ID in a case where the license is the service license. The sales region is information indicative of a region where the license is sold or the like. The country represents the name of the country where the license is used. The time zone represents the standard time of the country where the license is used. The commodity code is identification information for identifying a commodity corresponding to the license. The quantity (the number of apparatuses) is information indicative of the quantity of the apparatuses where the service can be used by the license.

The use start date is information indicative of a date when the license becomes active. The billing start date is information indicative of a date when billing is started and the same date as the use start date or later (for example, the first day of the next month). The use end date is information indicative of a license deadline on display. The use end date is, for example, one year after the billing start date. The scheduled cancellation date is information indicative of a date when the license is inactivated. The state is information indicative of a state of the license. The state of the license includes, for example, a provisional registration indicating that the license before use, a registration indicating that the license is now being used, and a cancellation indicating that the license is after use.

In a case of the service license, the organization is set to the parent service type. In a case of the service license, the organization ID is set to the parent license ID. In a case of the organization license, the registration code is set. The registration code is input at a time of opening the organization.

The machine type and machine number is set in a case of the service license. The machine type and machine number is information specifying the apparatus as an object of the license. In case of a volume license where the multiple apparatuses to be licensed exist, the machine type and machine number of the apparatus activated the earliest is set.

The next license type is set in a case of the renewed service license. The next license type has the same value as the service type. The next license ID is set in a case of the renewed service license. The next license ID is the service ID of the renewed service license.

The license type is information for specifying the type of the service license such as the apparatus license or the user license. The license type is information for setting the apparatus, the user, or the like, which are an object of limiting the use, by the service license. The license mode is information indicative of whether the use is permitted with the own service license in combination with the service license of another type or the use is permitted with only the own service license.

For example, the information such as "only the apparatus license" or "apparatus license+user license" is set to the license mode. In a case where the license mode is "only the apparatus license", the use of the service is permitted when the service license whose license type is "the apparatus license" is registered. In a case where the license mode is "the apparatus license+the user license", the use of the service is permitted when the service license whose license type is "the apparatus license" and the service license whose license type is "the user license" are registered.

The quantity (the number of users) is information indicative of the number of the users who can use the service by the license. The number of apparatuses in use is information indicative of the number of the apparatuses where the service can be used by the license. The number of users in use is information indicative of the number of the users who can use the service by the license. In the license information illustrated in FIG. 12, the quantity (the number of apparatuses) and the quantity (the number of users) are separately provided as the data items. However, the quantity (the number of apparatuses) and the quantity (the number of users) may be treated as the same data item.

Referring to the license information of FIG. 12, the organization license and the service license are in a relationship between parent and child. In the license information illustrated in FIG. 12, the organization license corresponds to the parent license, and the service license corresponds to the child license (not illustrated). The organization license as the parent license is set to the parent license ID. In the license information illustrated in FIG. 12, although the parent in the relationship between parent and child is illustrated for the organization license and the service license, there may be a relationship among three hierarchies or more such as parent, child and grandchild.

The organization license is necessary to use the service providing system 1100. Without the organization license, the organization cannot be opened in the service providing system 1100. By handling the organization license in the same data format as that of the service license, it becomes possible to bill the organization itself or provide a difference in a service level (a speed or a capacity) depending on the amount of the bill.

The service providing system 1100 provides a service to multiple organizations and provides a user administration independent for each organization. The service providing system 1100 performs an access limitation by preventing the data from being referred between the organizations. Therefore, it is necessary to open the organization before using all the services in the service providing system. Because the relationship between parent and child of the licenses has a very flexible data structure, it is possible to express the grouping of the licenses in the volume license or the like.

In a case of the volume license, the activated apparatus is administered by activated apparatus view information as illustrated in FIG. 13. FIG. 13 is a structural view of exemplary activated apparatus view information.

Referring to FIG. 13, the activated apparatus view information includes the service ID, the device (the organization ID or the machine type and machine number), an activated date, and so on, as the data item. The service ID is identification information for identifying the service license.

The device (the organization ID or the machine type and machine number) is information of the machine type and machine number of the apparatus activated using the service ID and information of the organization ID. The device (the organization ID or the machine type and machine number) can hold multiple information of the machine type and machine number of the apparatus activated using the service ID and multiple information of the organization ID. The activated date is the earliest date among dates when the activated apparatus is activated.

FIG. 14 is a structural view of exemplary apparatus information. Referring to FIG. 14, the apparatus information includes organization ID, device authentication information, office information, capability and so on. The device authorization information is for device authentication, by which it is determined that an office apparatus is provided with specific conditions. The device authentication information may be an ID indicating that a specific application is installed in the office apparatus, a machine type number indicating that the machine is a specific office apparatus, or the like. The business office information represents a business office where the office apparatus is installed. For example, the capability represents a performance of the office apparatus.

Figure 15:
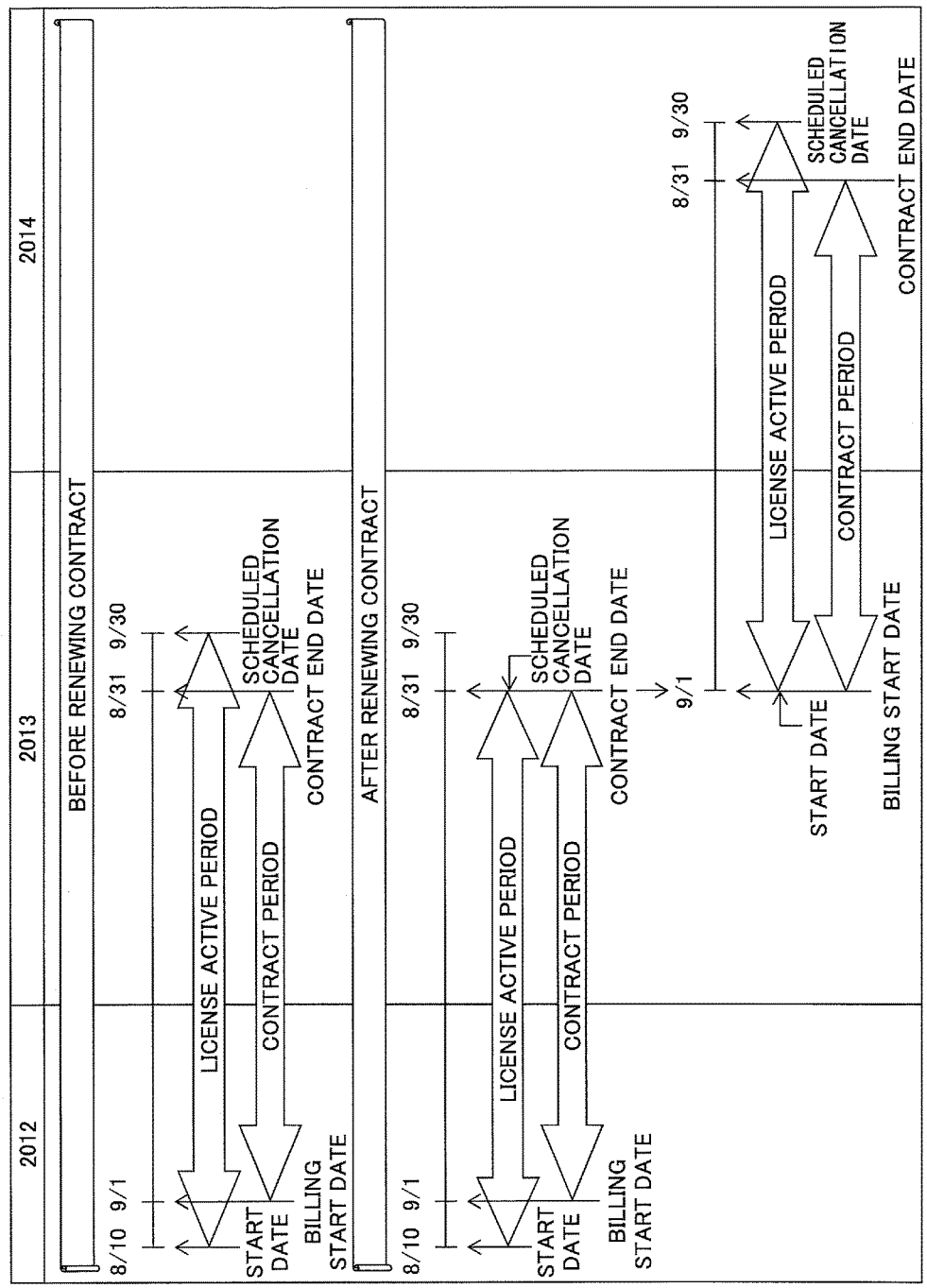
FIG. 15 explains an exemplary date included in the license information.

FIG. 15 explains an exemplary date included in the license information. FIG. 15 illustrates use start dates, billing start dates, contract end dates (use end dates), and scheduled cancellation dates before and after renewing a contract (a license).

The use start date (Aug. 10, 2012) is a date when the license becomes active. The billing start date is the first day (Sep. 1, 2012) of a next month of the use start date. The contract end date is one year (Aug. 31, 2013) after the billing start date. The scheduled cancellation date is the end day (Sep. 30, 2013) of the next month of the contract end date, which is obtained by adding days as many as a month to the contract end date. The contract end date is the end date of the license presented to the user. The scheduled cancellation date is the end date of the license when the license actually becomes inactive.

After renewing the contract, the scheduled cancellation date (Sep. 30, 2013) of the previous license is moved to the contract end date (Aug. 31, 2013) of the previous license. The use start date and the billing start date of the next license is the next day (Sep. 1, 2013) of the contract end date of the previous license. The contract end date of the next license is one year (Aug. 31, 2014) after the billing start date. The scheduled cancellation date of the next license is the end day (Sep. 30, 2014) of the next month of the contract end date, which is obtained by adding days as many as a month to the contract end date.

Figure 16:
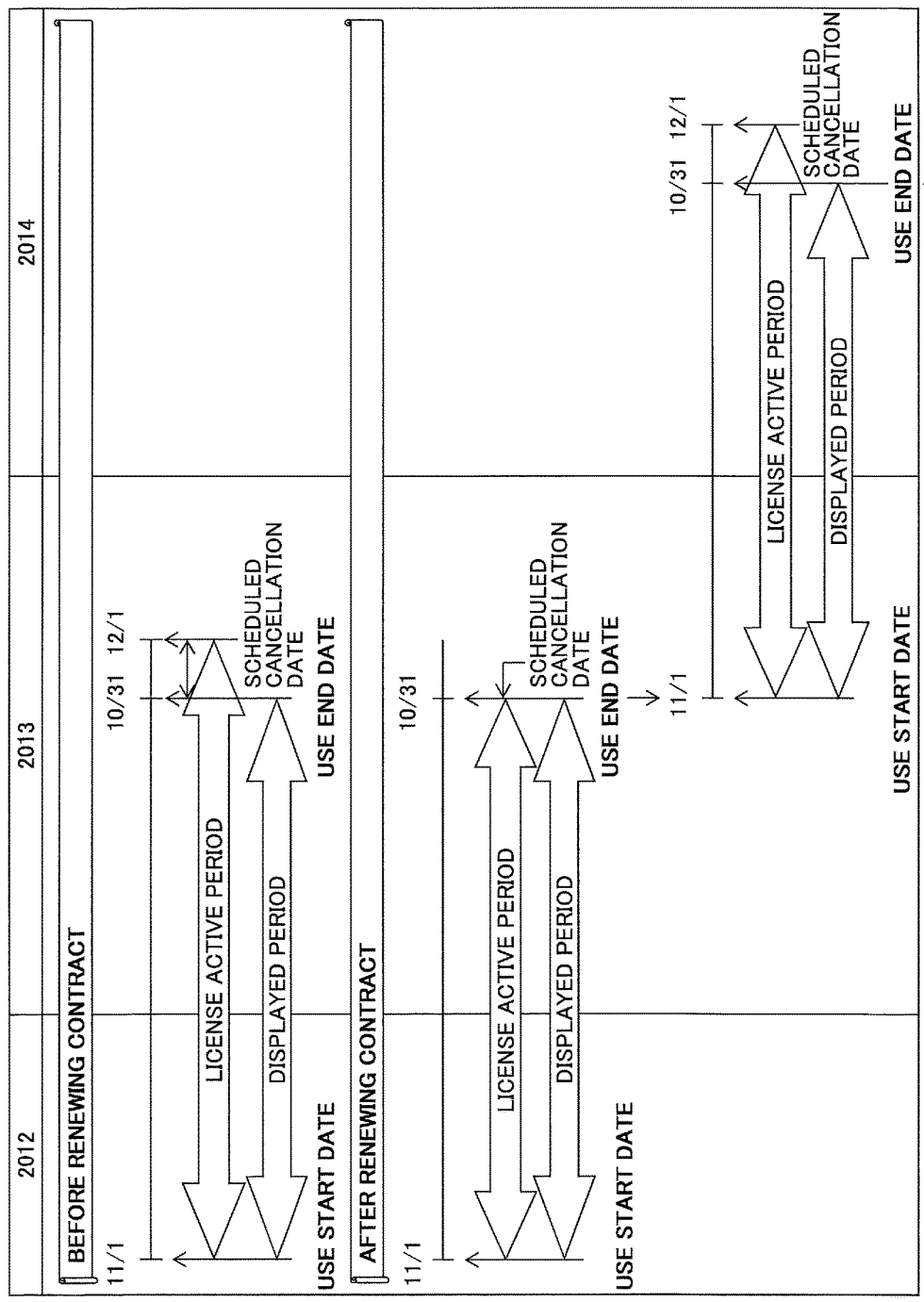
FIG. 16 explains an exemplary license active period and a displayed period.

FIG. 16 explains an exemplary license active period and a displayed period. Referring to FIG. 16, there is illustrated license active periods while the license is active and displayed periods before and after renewing the contract.

Before renewing the contract, the displayed period which is displayed on, for example, an UI and is between the use start date and the use end date is shorter than the license active period while the license is active. This is because the use end date corresponds to the contract end date illustrated in FIG. 15, and the contract end date is earlier than the scheduled cancellation date by the margin equal to one month added to the scheduled cancellation date.

After renewing the contract, the license active period of the previous license becomes equal to the displayed period which is displayed on, for example, the UI and is between the use start date and the use end date. This is because the scheduled cancellation date of the previous license is moved to the contract end date of the previous license.

The use start date and the billing start date of the next license is the next day (Nov. 1, 2013) of the contract end date of the previous license. In a manner similar to the previous license, the displayed period which is displayed on, for example, the UI and is between the use start date and the use end date of the next license is shorter than the license active period while the license is active.

Referring to FIGS. 15-16, the scheduled cancellation date is set by adding the margin to the contract end date. With this, it is possible to prevent the application from being unusable on or after the contract end date in the service providing system 1100. Since the scheduled cancellation date is not presented to the user, the scheduled cancellation date may be changed after renewing the contract. The use start date and the use end date, which are displayed on the UI, are displayed using a local date based on a time zone setup of the organization.

<Detailed Process>

In a sequence chart described below, an actor (an icon in a human form) represents a client application (a browser) operated in each terminal operated by a user such as a business controller.

<<Issuance of Organization ID>>

Figure 17:
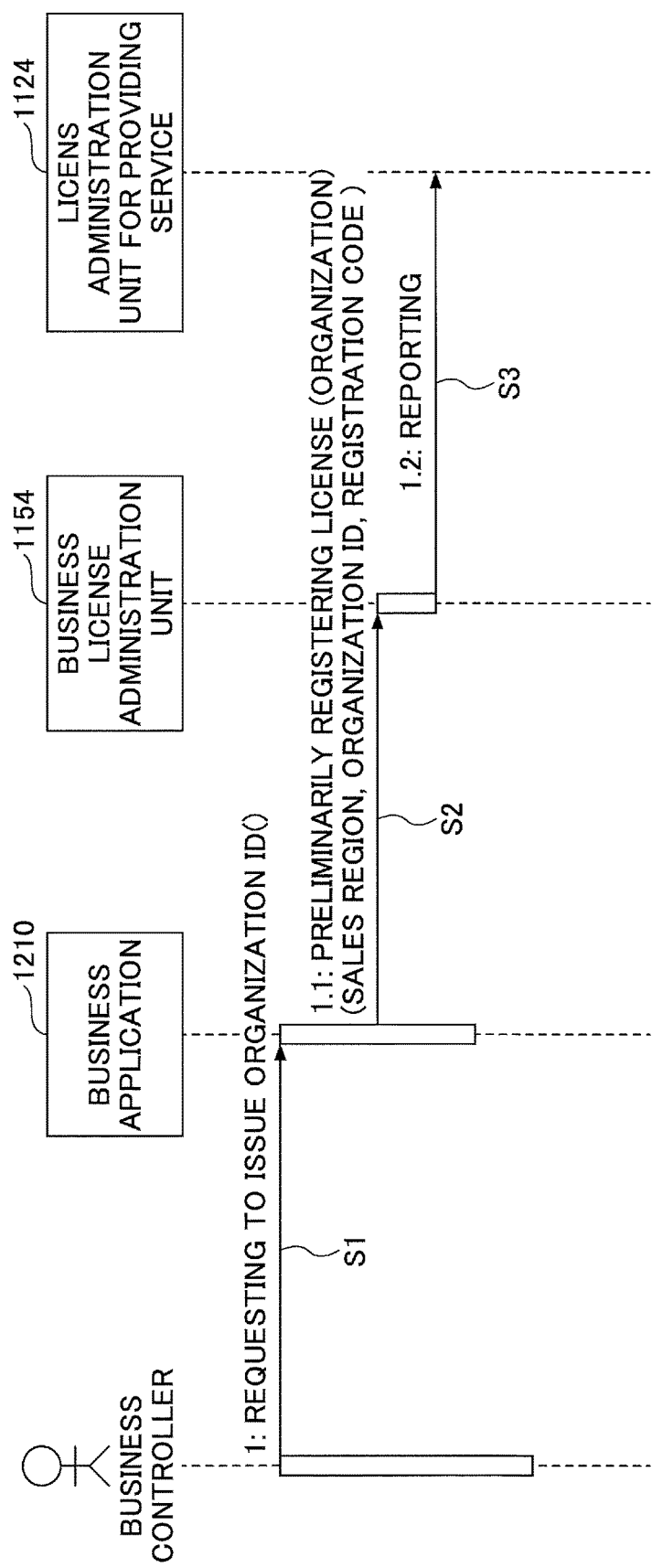
FIG. 17 is a sequence chart of an exemplary process of issuing an organization ID.
Figure 18:
FIG. 18 is an image chart of an exemplary organization ID issuance screen.

FIG. 17 is a sequence chart of an exemplary process of issuing an organization ID. The business controller operates the business terminal 1201 and causes a screen for issuance of the organization ID illustrated in FIG. 18 to be displayed. FIG. 18 is an image chart of an exemplary organization ID issuance screen. The organization ID issuance screen illustrated in FIG. 18 is an example of the screen enabling the business controller to input information necessary for the issuance of the organization ID.

The organization ID issuance screen illustrated in FIG. 18 includes a column designating a sales region where the business controller sells the license. In the organization ID issuance screen illustrated in FIG. 18, "Asia" is designated as the sales region.

The business controller operates a business terminal 1201 in step S1, designates the sales region for the business application 1201, and requests to issue the organization ID. The business application 1210 issues the organization ID and the registration code. The business application 1210 provisionally registers the sales region, the organization ID, and the registration code in the business license administration unit 1154 in step S2. In step S3, the business license administration unit 1154 reports the registration code for the provisionally registered organization ID to the license administration unit 1124 for providing the service corresponding to the sales region. The license administration unit 1124 for providing the service corresponding to the sales region causes the reported organization ID and the reported registration code to be stored in the license information memory unit 1144.

After the processes illustrated in FIG. 17, the administrator purchases an organization license, which is a license for using the service providing system 1100 from, for example, the distributer, and obtains the organization ID and the registration code from the distributer.

<<Opening Organization>>

FIG. 19 is a sequence chart of an exemplary process of opening the organization. The administrator operates the user terminal 1202 and selects an URL of an organization opening screen by inputting or selecting from a bookmark to thereby receive an organization opening screen from, for example, the portal service application 1111.

Figure 31:
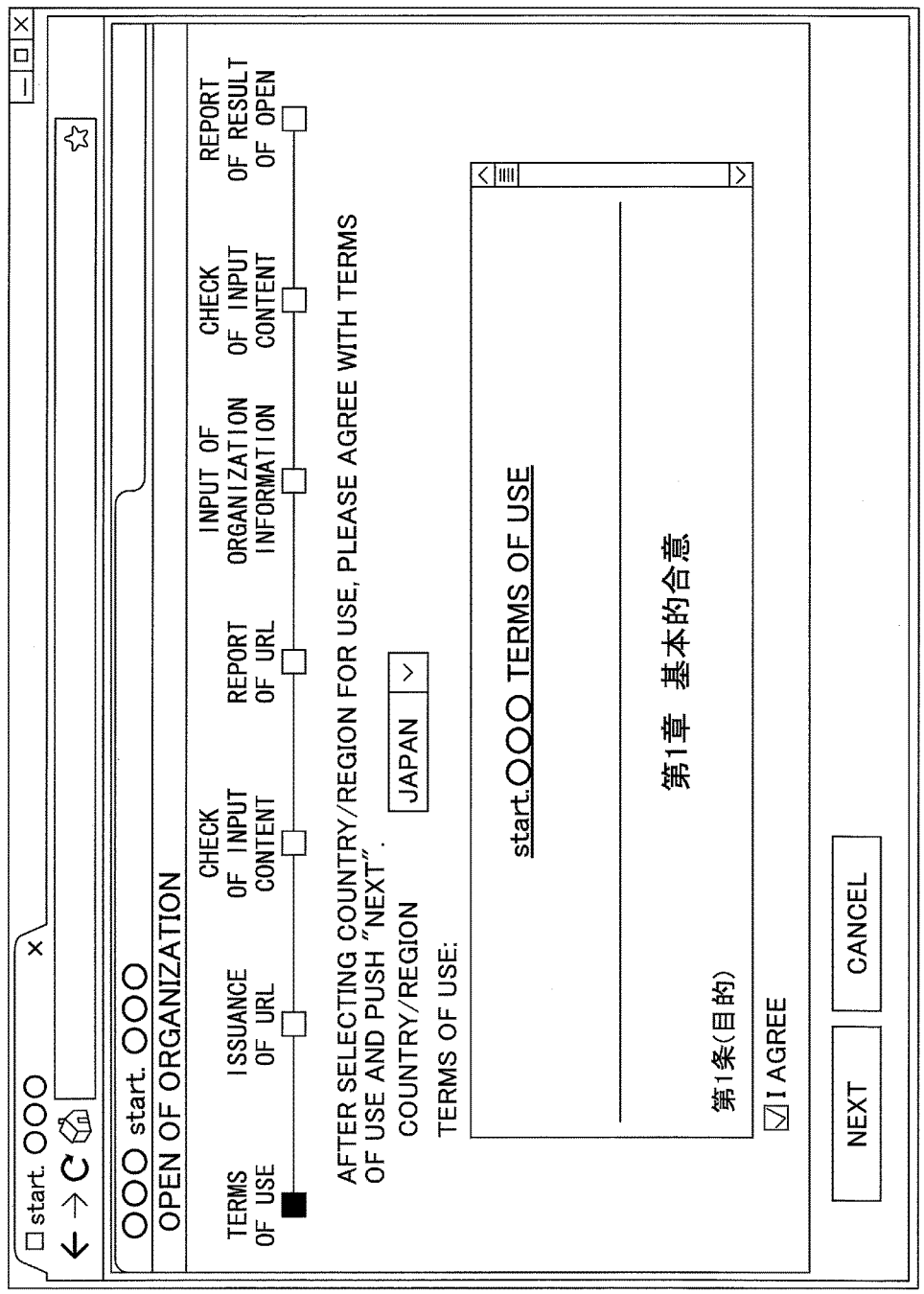
FIG. 31 is an image chart of an exemplary terms of use screen.

In step S11, the administrator operates the user terminal 1202 and sets the country to the organization opening screen. The country which can be set to the organization opening screen may be limited to, for example, a country associated to the sales region. In step S12, the portal service application 1111 displays terms of use for the country set by the administrator as illustrated in FIG. 31. FIG. 31 is an image chart of an exemplary terms of use screen. FIG. 31 is an example where "Japan" is set as the country in the organization opening screen.

Figure 32:
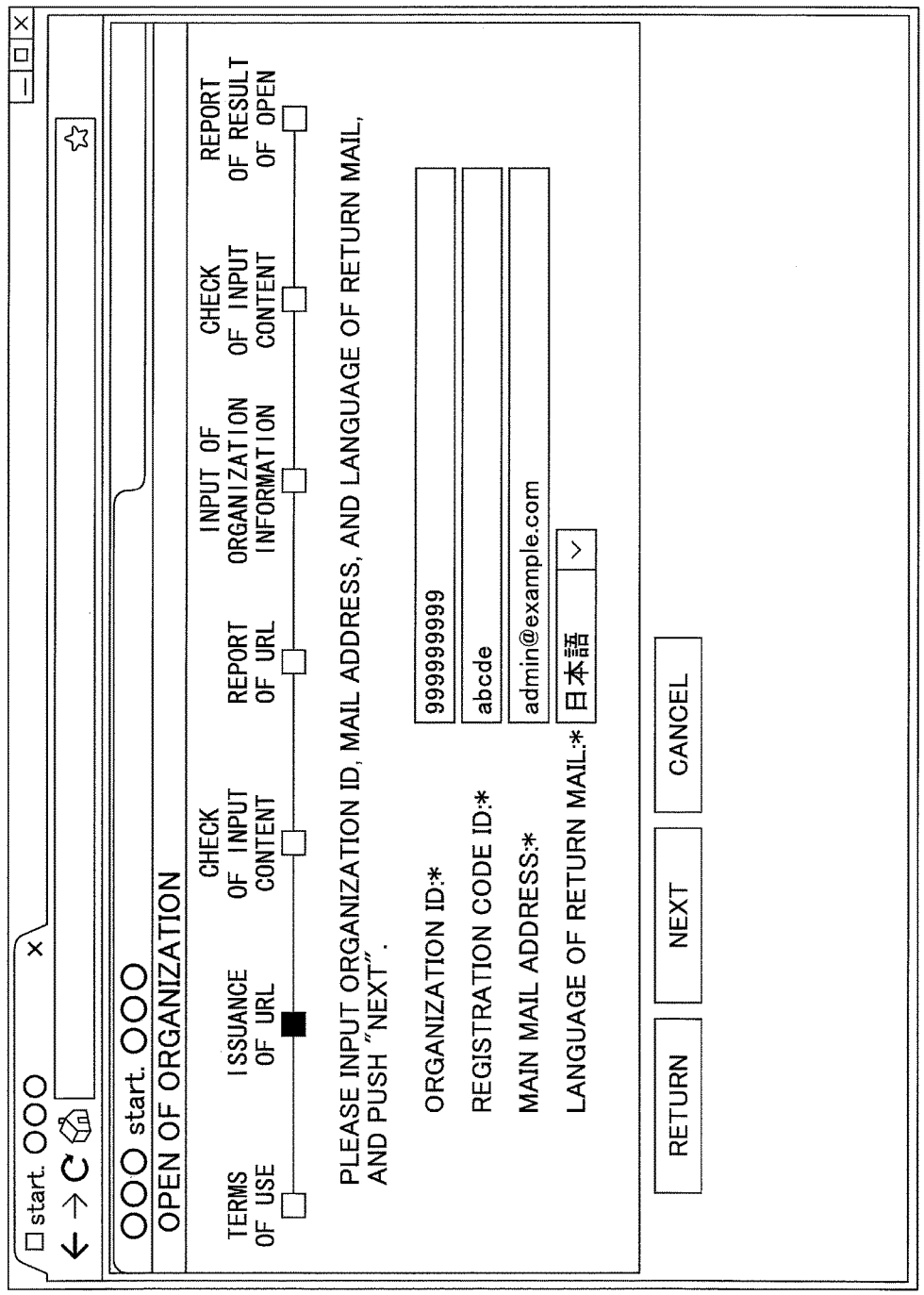
FIG. 32 is an image chart of a URL issuance screen.

The administrator checks the terms of use, and thereafter operates the user terminal 1202 to cause a URL issuance screen as illustrated in FIG. 32 to be displayed. FIG. 32 is an exemplary image chart of a URL issuance screen. The administrator operates the user terminal 1202 and sets the organization ID acquired from the distributor, the registration code, the mail address, and a language of a return mail.

After the administrator sets the URL issuance screen, the administrator operates the user terminal 1202 to cause an input content check screen to be displayed. After the administrator checks the input content in the URL issuance screen, the administrator pushes a send button of the input content check screen. When the send button is pushed by the administrator, the portal service application 1111 receives the input content input by the administrator in step S13.

The portal service application 1111 requests to change the license information of the organization license to the license administration unit 1124 for providing the service in step S14. The organization ID, the registration code, the country, and the mail address are included in the request of step S14.

In step S15, the license administration unit 1124 for providing the service checks whether the organization ID and registration code which are included in the request of step S14 is stored in the license information memory unit 1144. In step S15, it is checked whether the registration code input by the administrator is correct.

When the organization ID and the registration code which are included in the request of step S14 are stored in the license information memory unit 1144, the license administration unit 1124 for providing the service reports the changed license information to the business license administration unit 1154 in step S16. The country and the mail address are added to license information reported in step S16. The business license administration unit 1154 changes the content of the license DB 1207 based on the license information reported in step S16. The success or the failure in changing the license information is reported to the portal service application 1111 through the license administration unit 1124 for providing the service from the business license administration unit 1154.

Meanwhile, the portal service application 1111 causes a URL report screen to be displayed on the user terminal 1202 when the send button is pushed. In the URL report screen, a message of sending a mail to a mail address set in the URL issuance screen illustrated in FIG. 32 and a message of continuing the open of the organization by accessing the URL described in the mail are included.

In step S17, the portal service application 1111 sends the mail describing the URL for opening the organization to the mail address set in the URL issuance screen illustrated in FIG. 32. When the mail address is set in the URL issuance screen illustrated in FIG. 32, the administrator cannot receive the mail. Therefore, it is possible to prevent the mail address from being erroneously set.

In a case where the organization cannot be continuously opened, the portal service application 1111 sends a mail including a message indicative of the failure in opening the organization to the mail address set in the URL issuance screen illustrated in FIG. 32. An error case in opening the organization occurs in a case where the organization ID and the registration code which are included in the request in step S14 are not stored in the license information memory unit 1144 or are already used to open the organization, for example. The mail including the message indicative of the failure in opening the organization does not has a content enabling a malicious user to give a hint of distinguishing the error case. Therefore, the mails have the same content.

Figure 33:
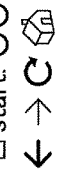
FIG. 33 is an exemplary image chart of an organization information input screen.

In step S18, the administrator operates the user terminal 1202 and requests the portal service application 1111 to display a page of the URL for opening the organization described in the mail. The user terminal 1202 displays the organization information input screen illustrated in FIG. 33. FIG. 33 is an exemplary image chart of the organization information input screen.

The administrator operates the user terminal 1202 and sets the registration code acquired from the distributor, the organization information, and the administrator information (the user information). After the administrator sets the organization information input screen, the administrator operates the user terminal 1202 to cause the input content check screen to be displayed. After the administrator checks the input content into the organization information input screen, the administrator pushes a registration button of the input content check screen.

When the send button is pushed by the administrator, the portal service application 1111 receives the input content input by the administrator in step S13. The portal service application 1111 requests to perform a formal registration of the license information of the organization license to the license administration unit 1124 for providing the service in step S20. The organization ID, the time zone, and so on are included in the request of step S20.

The license administration unit 1124 for providing the service reports the changed license information to the business license administration unit 1154 is step S21. The time zone and the use start date are included in the license information reported in step S21. The business license administration unit 1154 changes the content of the license DB 1207 based on the license information reported in step S21. The success or the failure in performing the formal registration of the license information is reported to the portal service application 1111 through the license administration unit 1124 for providing the service from the business license administration unit 1154.

In step S22, the portal service application 1111 requests the organization administration unit 1222 to cause the organization information to be stored in the organization information memory unit 1142 and makes a portal site of the organization to thereby open the organization.

Further, in step S23, the portal service application 1111 requests the user administration unit 1123 to cause the user information of the administrator to be stored in the user information memory unit 1143. In step S24, the portal service application 1111 sends a mail describing that the open of the organization is completed to the mail address set in the URL issuance screen illustrated in FIG. 32.

Further, the portal service application 1111 causes the user terminal 1202 to display a screen reporting the result of the open. The screen reporting the result of the open includes a message indicating that the mail reporting the result of the open to the mail address set in the URL issuance screen illustrated in FIG. 32.

<<Issuance of Service ID>>

FIG. 20 is a sequence chart of an exemplary process of issuing an service ID. The business controller operates the business terminal 1201 to cause a service ID issuance screen (not illustrated) to be displayed. The service ID issuance screen is provided to make the business controller input information necessary for issuing the service ID. The business controller designates a sales region where the license is sold on the service ID issuance screen.

In step S31, the business controller operates the business terminal 1201, selects the sales region and the commodity code, and requests the business application 1210 to issue the service ID. The business application 1210 designates the sales region and the commodity code in step S32 and provisionally registers the license in the business license administration unit 1154. In step S33, the business license administration unit 1154 selects the service ID. The business license administration unit 1154 causes the license DB 1207 to store the selected service ID 1207. Further, in step S34, the business license administration unit 1154 searches a commodity master using a commodity code and causes the license DB 1207 to store the service type, the sales region, the commodity code, and the quantity. For example, different commodity codes may be attached depending on combinations of the service type and the quantity. With this, by using the commodity codes, the business controller can request to issue the service ID designating the number of apparatuses enabled to use the service or the number of users enabled to use the service.

In step S35, the business license administration unit 1154 reports the license information including the selected service ID to the license administration unit 1124 for providing the service corresponding to the sales region. The license administration unit 1124 for providing the service corresponding to the sales region causes the reported service ID to be stored in the license information memory unit 1144.

After the processes illustrated in FIG. 20, the administrator purchases the service license being a license for using the service such as the scan service application 1112 or the like from, for example, the distributor and acquires the service ID from the distributor.

<<Registration of Service ID>>

FIG. 21 is a sequence chart of an exemplary process of registering the service ID. Referring to FIG. 21, after registering the service ID in the first MFP 1203a, the service ID is registered in a second MFP 1203b using the same service ID as the service ID for the first MFP 1203a. In step S41, the administrator operates the MFP 1203a and checks the terms of use displayed on the screen. Thereafter, for example, the service registration screen illustrated in FIG. 34 is displayed.

Figure 34:
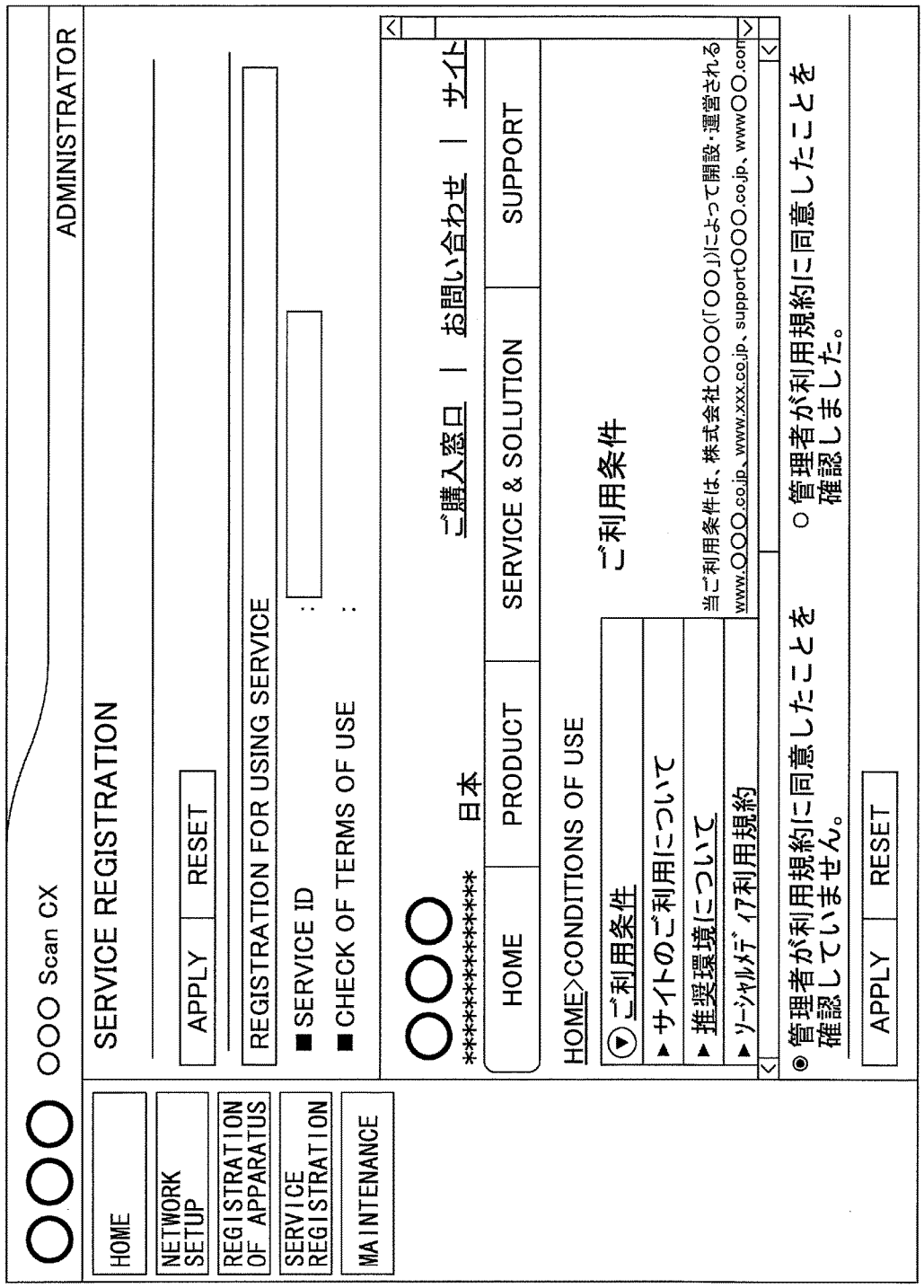
FIG. 34 is an image chart of an exemplary service registration screen.

FIG. 34 is an image chart of an exemplary service registration screen. The service registration screen is substantialized by a WebUI provided by an SDK application operated in the MFP 1203a.

In step S42, the administrator inputs the service ID from the service registration screen. Hereinafter, described is an example where the administrator performs the service registration.

The administrator operated the MFP 1203a to set the service ID acquired from the distributer in the service registration screen illustrated in FIG. 34. In step S43, the scan service application 1112a requests the license administration unit 1124 for providing the service corresponding to the sales region to perform the formal registration of the license information of the service license. For example, the service ID, the organization ID, the machine type and machine number of the MFP 1203a, and so on are included in the request in step S43.

In step S44, the license administration unit 1124 for providing the service specifies the license information stored in the license information memory unit 1144 based on the service ID included in the request of step S43. The license administration unit 1124 for providing the service sets the organization ID and the machine type and machine number of the MFP 1203a to the specified license information.

In step S44, the service ID to be registered, the organization ID of the organization to which the administrator belongs, and the machine type and machine number of the MFP 1203a are associated and stored. The license administration unit 1124 for providing the service sets the current date as the above use start date to the specified license information.

In step S45, the license administration unit 1124 for providing the service requests the business license administration unit 1154 to perform the formal registration of the license information of the service license in step S45. In step S46, the business license administration unit 1154 calculates the scheduled cancellation date, the billing start date, and the use end date based on the use start date.

In step S47, the business license administration unit 1154 returns the scheduled cancellation date, the billing start date, and the use end date, which were calculated, to the license administration unit 1124 for providing the service. The license administration unit 1124 for providing the service stores the scheduled cancellation date, the billing start date, and the use end date to the license DB 1209.

In step S48, the success and failure of the registration of the service ID are reported from the license administration unit 1124 for providing the service to the scan service application 1112. In a case where the registration of the service ID fails, the scan service application 1112 displays the failure of the registration of the service ID on the MFP 1203a. The error case where the registration of the service ID fails is that the service ID set in step S42 is not stored in the license information memory unit 1144 or already used for the registration of the service ID.

After registering the service ID in the first MFP 1203a, in step S49, the administrator operates the MFP 1203b, checks the terms of use displayed on the screen, and causes the service registration screen to be displayed as illustrated in FIG. 34. In step S50, the administrator sets the service ID registered in the first MFP 1203a in the service registration screen and selects the service registration, and pushes the "next" button.

When the "next" button is pushed by the administrator, the process goes to step S51. Then, the scan service application 1112b requests the license administration unit 1124 for providing the service corresponding to the sales region to perform the formal registration of the license information of the service license. For example, the service ID, the organization ID, the machine type and machine number of the MFP 1203*a*, and so on are included in the request in step S51.

If the service ID is registered in the MFP 1203*a* and the MFP 1203*a* is to register a service ID of the same service type, the license administration unit 1124 for providing the service reports the error.

After the license administration unit 1124 for providing the service receives the request of step S51, the license administration unit 1124 for providing the service specifies the license information stored in the license information memory unit 1144 based on the service ID included in the request of step S51. The license administration unit 1124 for providing the service checks whether the use start date is set to the specified license information.

Here, because described is a case where the registered service ID is set to the first MFP 1203*a*, the use start date is set to the specified license information. In a case where the use start date is set to the specified license information, the license administration unit 1124 for providing the service determines that the specified license information 1124 is started to be used.

The license administration unit 1124 for providing the service checks the quantity (the number of apparatuses) of the specified license information and the number of apparatuses using the license and determines whether another apparatus can be registered. The number of the apparatuses using the license corresponding to the specified license information reaches the quantity (the number of apparatuses) of the specified license information, the license administration unit 1124 for providing the service determines that the additional registration is not possible and reports it as the error. Said differently, the license administration unit 1124 for providing the service adjusts the number of the apparatuses using the license so as not to exceed the quantity (the number of apparatuses) of the specified license information.

The number of apparatuses using the license corresponding to the specified license information does not reach the quantity (the number of apparatuses) of the specified license information, the license administration unit 1124 for providing the service determines that the additional registration is possible. When the license administration unit 1124 for providing the service determines that the additional registration is possible, the license administration unit 1124 for providing the service adds 1 to the number of apparatuses using the license. Further, the license administration unit 1124 for providing the service adds the organization ID and the machine type and machine number, which are included in the request of step S51, to the device (the organization ID and the machine type and machine number) of the activated apparatus view information illustrated in FIG. 13.

In step S52, the license administration unit 1124 for providing the service requests the business license administration unit 1154 to change the license information of the service license. The business license administration unit 1154 renews the license information and the activated apparatus view information based on the machine type and machine number included in the request of step S52.

When the failure of the registration of the service ID is displayed in the MFP 1203*a* and the MFP 1203*b*, a content enabling the error case to be distinguishable is not included to prevent a hint from being provided to the malicious user and has the same content as those of the other error cases.

Referring to the sequence chart illustrated in FIG. 21, by inputting the service ID from the UIs of the scan service applications 1112*a* and 1112*b* operated in the MFP 1203*a* and the MFP 1203*b*, it is possible to store the service ID and the machine type and machine number of the MFP 1203 while associating the service ID with the machine type and machine number of the MFP 1203.

Further, referring to the sequence chart illustrated in FIG. 21, the same service ID can be registered in the multiple apparatuses using a volume license.

<<Deletion of Apparatus Associated with Volume License>>

FIG. 22 is a sequence chart illustrating an exemplary process of deleting an apparatus associated with a volume license. A process of adding an apparatus associated with the volume license corresponds to the process of steps S49 to S52 in FIG. 21.

The volume license is provided so that one service ID can be registered to multiple apparatuses as described above. When the apparatus in which the service ID is registered or the use of the apparatus is completed, there may be a case where the apparatus associated with the volume license is deleted.

The business controller operates the business terminal 1201 in step S61 and causes a service ID change screen illustrated in FIG. 23 to be displayed. FIG. 23 is an image chart of an exemplary service change screen. The license information specified by the service ID is displayed on the upper side of the service ID change screen illustrated in FIG. 23, and a list view of the machine type and machine number of the apparatuses which can use the service by the activated service use with the service ID on the lower side of the service ID change screen illustrated in FIG. 23. The business controller sets the apparatus to be removed from the view of machine type and machine number displayed on the lower side of the service ID change screen illustrated in FIG. 23 as a deletion target and requests the business application 1210 to delete the apparatus.

In step S62, the business application 1210 requests the business license administration unit 1154 to change the license information. At this time, the business application 1210 reports the machine type and machine number of the deletion target to the business license administration unit 1154.

The business license administration unit 1154 receives the request to change the license information and changes the license information and the apparatus view information activated in step S63 as described later. After changing the license information and the activate apparatus view information, the business license administration unit 1154 reports the content of the change to the license administration unit 1124 for providing the service in step S64. In step S65, the license administration unit 1124 for providing the service changes the license information and the activate apparatus view information, which are held by the license administration unit 1124 for providing the service, based on the content of change based on the reported content of the change.

Figure 24:
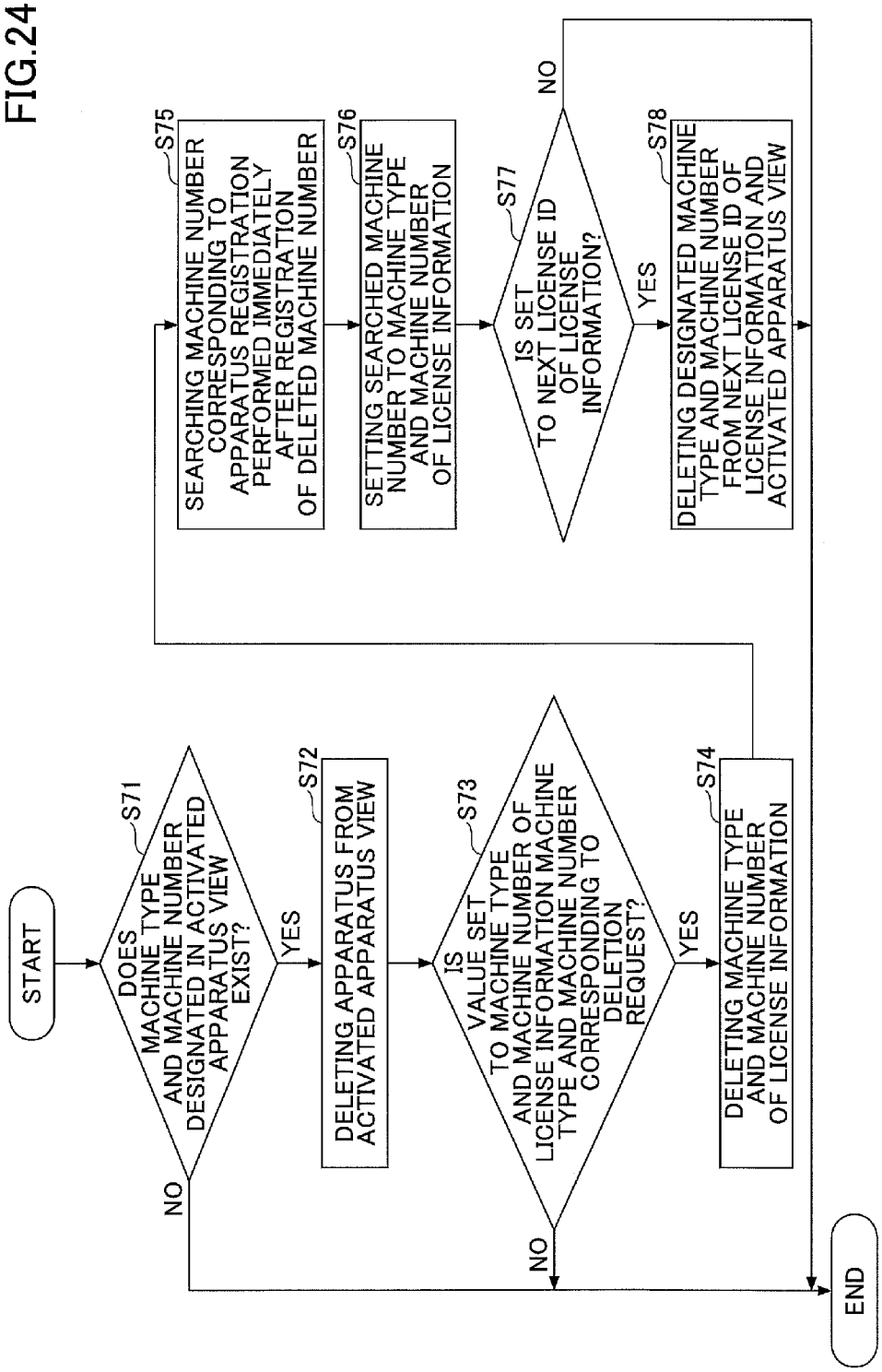
FIG. 24 is a flowchart of an exemplary process of changing license information and activated apparatus view information.

The process of changing the license information and the activated apparatus view information is performed as illustrated in, for example, FIG. 24. FIG. 24 is a flowchart of an exemplary process of changing the license information and the activated apparatus view information.

In step S71, the business license administration unit 1154 determines whether the activated apparatus view information specified by the service ID includes the machine type and machine number of the apparatus set as the deletion target.

If the activated apparatus view information specified by the service ID includes the machine type and machine number of the apparatus set as the deletion target, the business license administration unit 1154 deletes the machine type and machine number of the apparatus set as the deletion target from the activate apparatus view information in step S72. Then, step S73 is performed.

In step S73, the business license administration unit 1154 determines whether a value set in the machine type and machine number of the license information is the machine type and machine number of the apparatus set as the deletion target or not. If the value set in the machine type and machine number of the license information is the machine type and machine number of the apparatus set as the deletion target, the business license administration unit 1154 proceeds to step S74 and deletes the value set in the machine type and machine number of the license information.

In step S75, the business license administration unit 1154 searches the machine type and machine number of the apparatus which is activated immediately after the machine type and machine number of the apparatus set as the deletion target. In step S76, the business license administration unit 1154 sets the machine type and machine number searched in step S75 as a value of the machine type and machine number of the license information.

In step S77, the business license administration unit 1154 determines whether the value is set to the next license ID of the license information. If the value is set to the next license ID of the license information, the business license administration unit 1154 goes to step S78.

In step s78, the business license administration unit 1154 deletes the machine type and machine number of the apparatus set as the deletion target from the license information of the license ID set to the next license ID and the activated apparatus view information. The process of step S78 is similar to the process of steps S71 to S78 for, for example, the license information of the license ID set to the next license ID and the activated apparatus view information.

When the machine type and machine number of the apparatus set as the deletion target in step S71 does not exist, if the value set in the machine type and machine number of the license information in step S73 is not the machine type and machine number set as the deletion target, the flowchart illustrated in FIG. 24 ends. In a case where the value is not set to the next license ID of the license information in step S77, the flowchart of FIG. 24 ends.

Referring to the flowchart of FIG. 24, the use of the service by all apparatuses associated with the volume license is not stopped but the use of the service of an arbitrary apparatus can be stopped. Further, referring to the flowchart illustrated in FIG. 24, the license information and the activated apparatus view information can be renewed in association with the machine type and machine number of the apparatus to be deleted.

<<Renewal of Contracted Service>>

Figure 25:
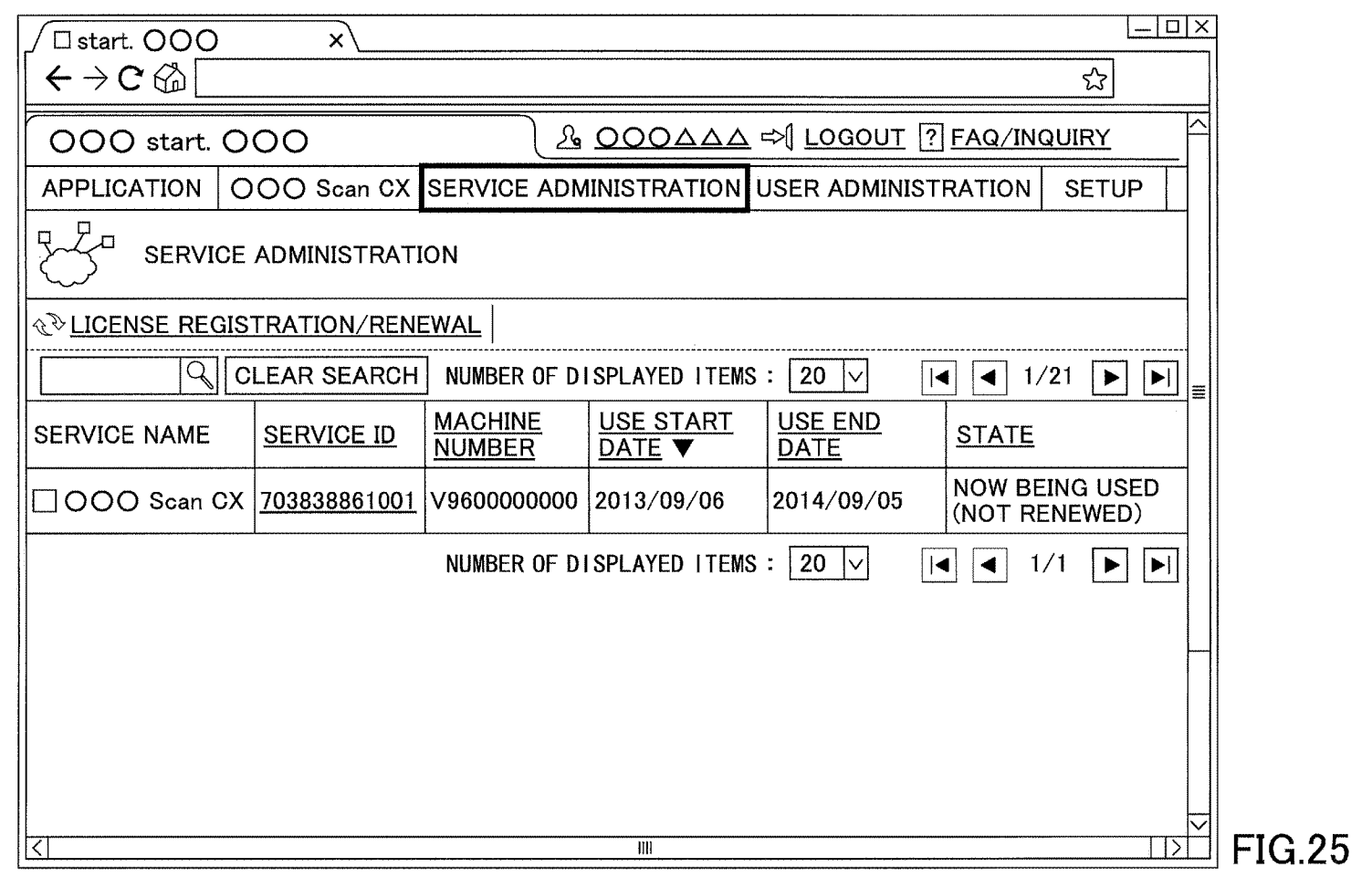

The administrator operates the user terminal 1202 to access the portal service application 1111. Then, a service administration screen as illustrated in FIG. 25 is received from the portal service application 1111. FIG. 25 is an image chart of an exemplary service administration screen after registering the service.

In the service administration screen illustrated in FIG. 25, the service ID is registered from the MFP 1203 and one service license is displayed. Referring to FIG. 25, the state of the service license displayed on the service administration screen is now being used (not renewed).

The service license of the organization, to which the administrator logging in the portal service application 1111 belongs, is displayed on the service administration screen illustrated in FIG. 25. The service license of the organization, to which the administrator belongs, can be searched using a parent license ID of the license information.

Further, the service license of the organization, to which the administrator logging in the portal service application 1111 belongs, can be searched using the machine type and machine number of the license information or the machine type and machine number of the apparatus view information associated with the license information and activated.

The machine type and machine number of the license information is displayed on the service administration screen illustrated in FIG. 25. Further, all machine type and machine numbers of the apparatuses registered so as to have the license can be searched using the service administration screen illustrated in FIG. 25. Therefore, it is possible to search the license associated with a specific machine type and machine number which cannot be checked using a view screen.

The state of the service license on the service administration screen illustrated in FIG. 25 can be displayed by distinguishing "now being used (not renewed)" and "now being used (renewed)" from "now being used" depending on whether the next license ID is registered.

A detailed license screen illustrated in FIG. 26 may be displayed when the administrator operates the user terminal 1202 to click or move a mouse over a service ID link on the service administration screen illustrated in FIG. 25. FIG. 26 is an image chart of an exemplary detailed license screen. A machine type and machine number view of the apparatuses associated with the volume license is included in the detailed license screen illustrated in FIG. 26 as the registered apparatus view.

The administrator operates the user terminal 1202 to click a link to "license registration/renewal" on the service administration screen illustrated on FIG. 25. Thus, a service registration screen as illustrated in FIG. 34 is displayed. The administrator can start the renewal of the contracted service from the service registration screen as illustrated in FIG. 34.

Figure 27:
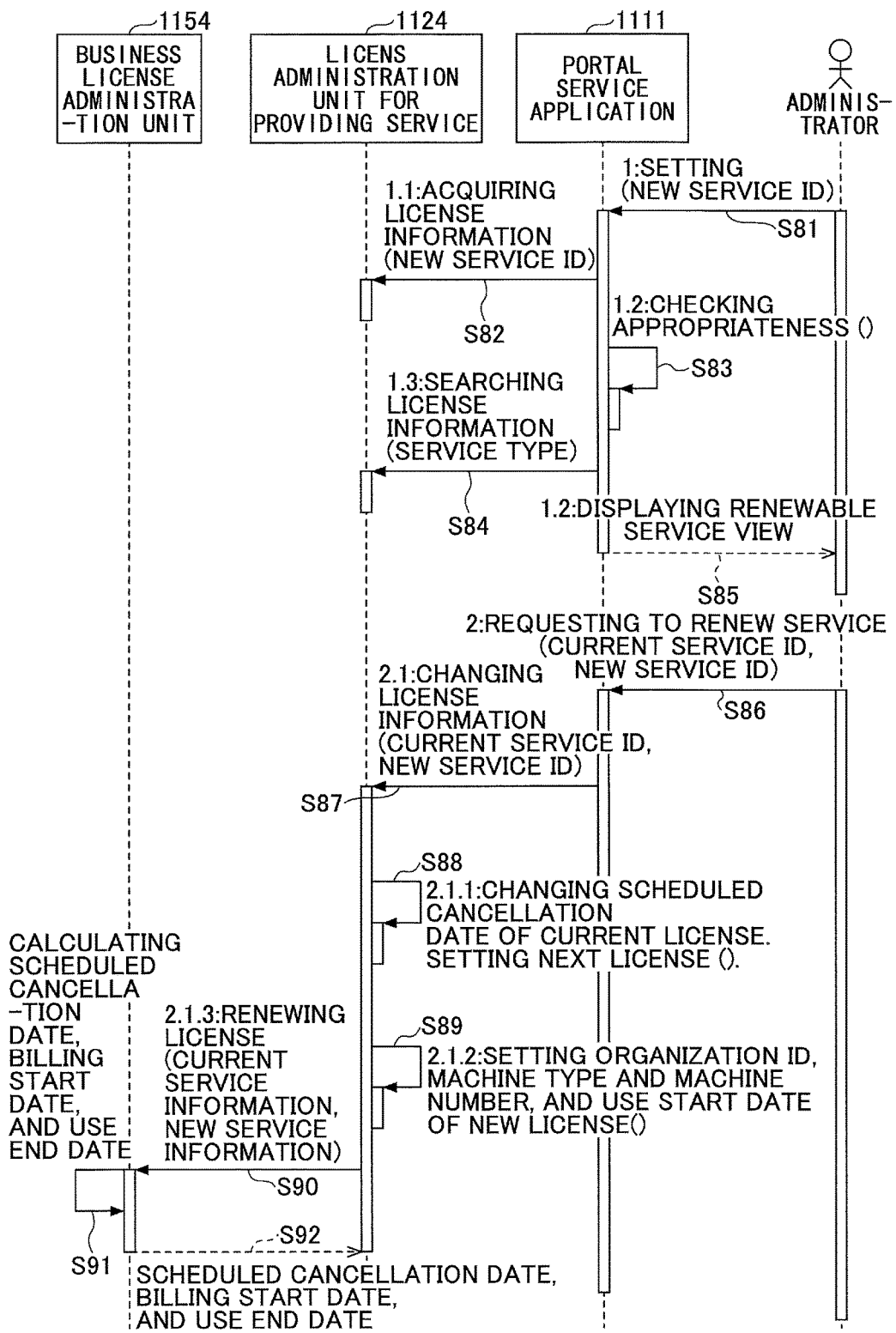
FIG. 27 is a sequence chart of an exemplary process of renewing a contracted service.

FIG. 27 is a sequence chart of an exemplary process of renewing the contracted service. The contracted service to be renewed in the sequence chart illustrated in FIG. 27 is a service license whose state is "now being used (not renewed)".

In step S81, the administrator operates the user terminal 1202 to set the service ID (a new service ID) used to renew from the service registration screen. In step S82, the portal service application 1111 acquires the license information, in which the license ID is set as a new service ID set in the service registration screen, from the license administration unit 1124 for providing the service.

In step S83, the portal service application 1111 checks appropriateness of the new service ID set in step S81 using a result of acquiring the license information in step S82. When the new service ID is not correctly input, the portal service application 1111 displays a message indicating that the input is not correct. An error case where the input of the new service ID is not correct occurs when the new service ID is not stored in the license information memory unit 1144 or is already used, for example. The message indicating that the input of the new service is not correct does not has a content enabling a malicious user to give a hint of distinguishing the error case. Therefore, the messages have the same content.

When the new service ID set in step S83 is appropriate, the portal service application 1111 displays a screen of the terms of use. After the administrator checks the terms of use, the portal service application 1111 searches license information having the same parent ID and service type as those of the license information acquired in step S82.

In step S85, the portal service application 1111 displays a renewable service out of the license information searched in step S84. Said differently, the state of the portal service application 1111 is "now being used (not renewed)", and displays a view of the service license having the number of apparatuses whose current license is now being used smaller than the number of apparatuses whose new license can be used as illustrated in FIG. 35. FIG. 35 is an image chart of an exemplary service selection screen at a time of renewing the license. When the number of apparatuses which can use the current license is smaller than the number of apparatuses which can use the new license, it is possible to reduce the number of apparatuses which can be used by the license by renewing the license. With this, the cost for the license can be reduced.

In step S86, the operator operates the user terminal 1202 to select the service ID to be renewed from the service selection screen illustrated in FIG. 35, and requests the portal service application 1111 to renew the service. The request of step S86 includes the service ID to be renewed (the current service ID) and the service ID used for the renewal (the new service ID).

A check screen is displayed on the user terminal 1202. The administrator checks the content of the check screen and pushes, for example, an OK button. When the OK button is pushed by the administrator, the portal service application 1111 requests the license administration unit 1124 for providing the service to change the license information in step S87. The request of step S87 includes the current service ID and the new service ID.

In step S88, the license administration unit 1124 for providing the service changes the scheduled cancellation date of the license information (the current license) whose license ID is the current service ID to be the same date as the use end date. Further, the license administration unit 1124 for providing the service sets a next license ID next to the current license ID to be the new service ID.

In step S89, the license administration unit 1124 for providing the service sets the organization ID of the license information (the new information) in which the new service ID is set as the license ID, the machine type and machine number, and the current date as the use start date based on the current license. In step S90, the license administration unit 1124 for providing the service requests the business license administration unit 1154 to renew the license information of the service license in step S90.

In step S91, the business license administration unit 1154 calculates the scheduled cancellation date, the billing start date, and the use end date based on the use start date. In step S92, the business license administration unit 1154 returns the scheduled cancellation date, the billing start date, and the use end date, which were calculated, to the license administration unit 1124 for providing the service. The license administration unit 1124 for providing the service stores the scheduled cancellation date, the billing start date, and the use end date to the license DB 1209.

The end of the renewal of the contracted service can be reported from the license administration unit 1124 for providing the service to the portal service application 1111. After the renewal of the contracted service ends, the portal service application 1111 causes the user terminal 1202 to display a license renewal end screen.

Figure 36:
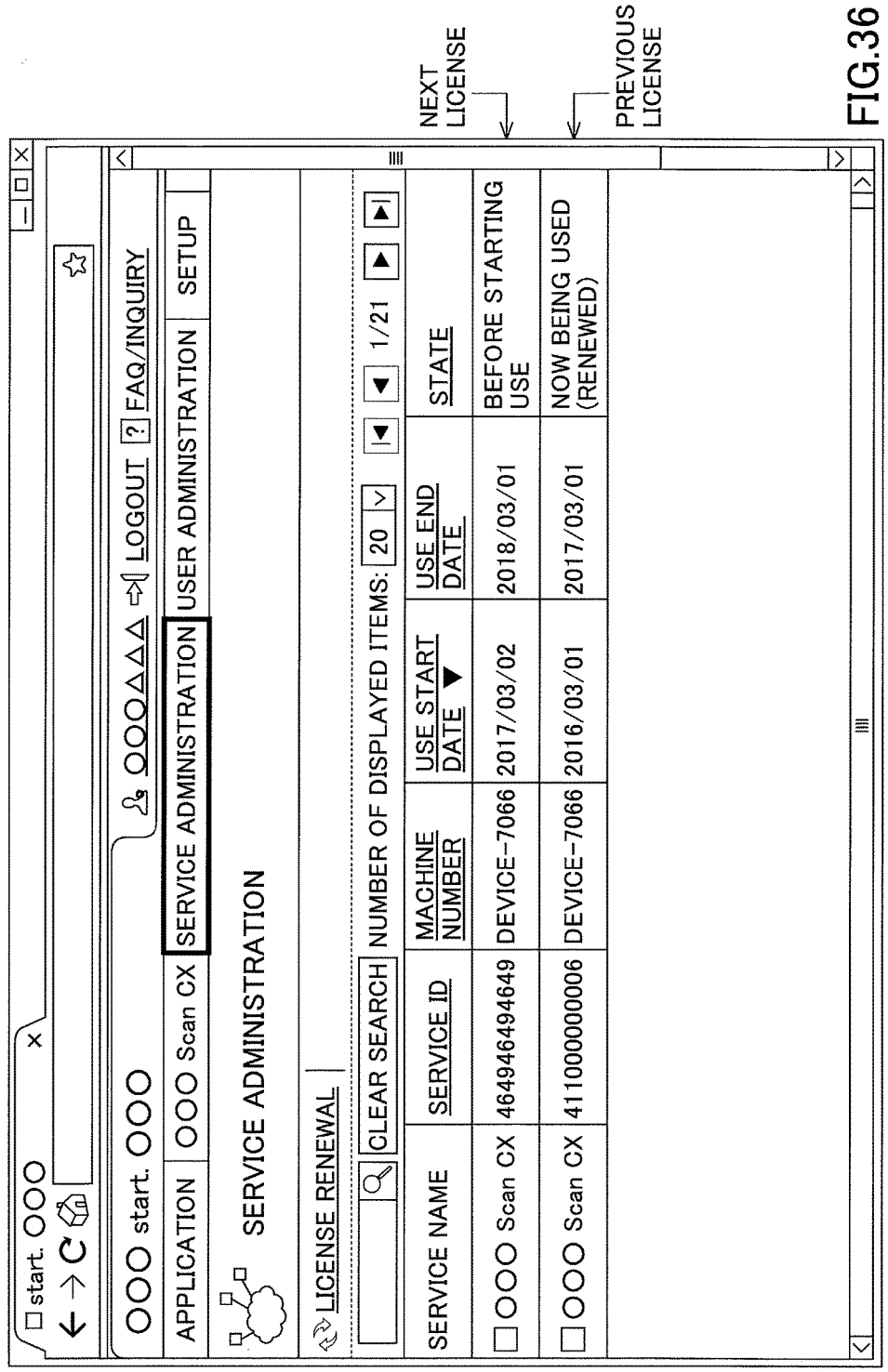
FIG. 36 is an image chart of an exemplary service selection screen after renewing the license.

After the renewal of the contracted service ends, the service administration screen illustrated in FIG. 35 is changed to the service administration screen illustrated as in FIG. 36. FIG. 36 is an image chart of an exemplary service selection screen after renewing the license. On the service administration screen illustrated in FIG. 36, the state of the current license is changed from "now being used (not renewed)" to "now being used (renewed)". Further, the service license of the new license whose state is "before starting use" is added to the service administration screen illustrated in FIG. 36.

<<Cancellation of Organization ID>>

Figure 28:
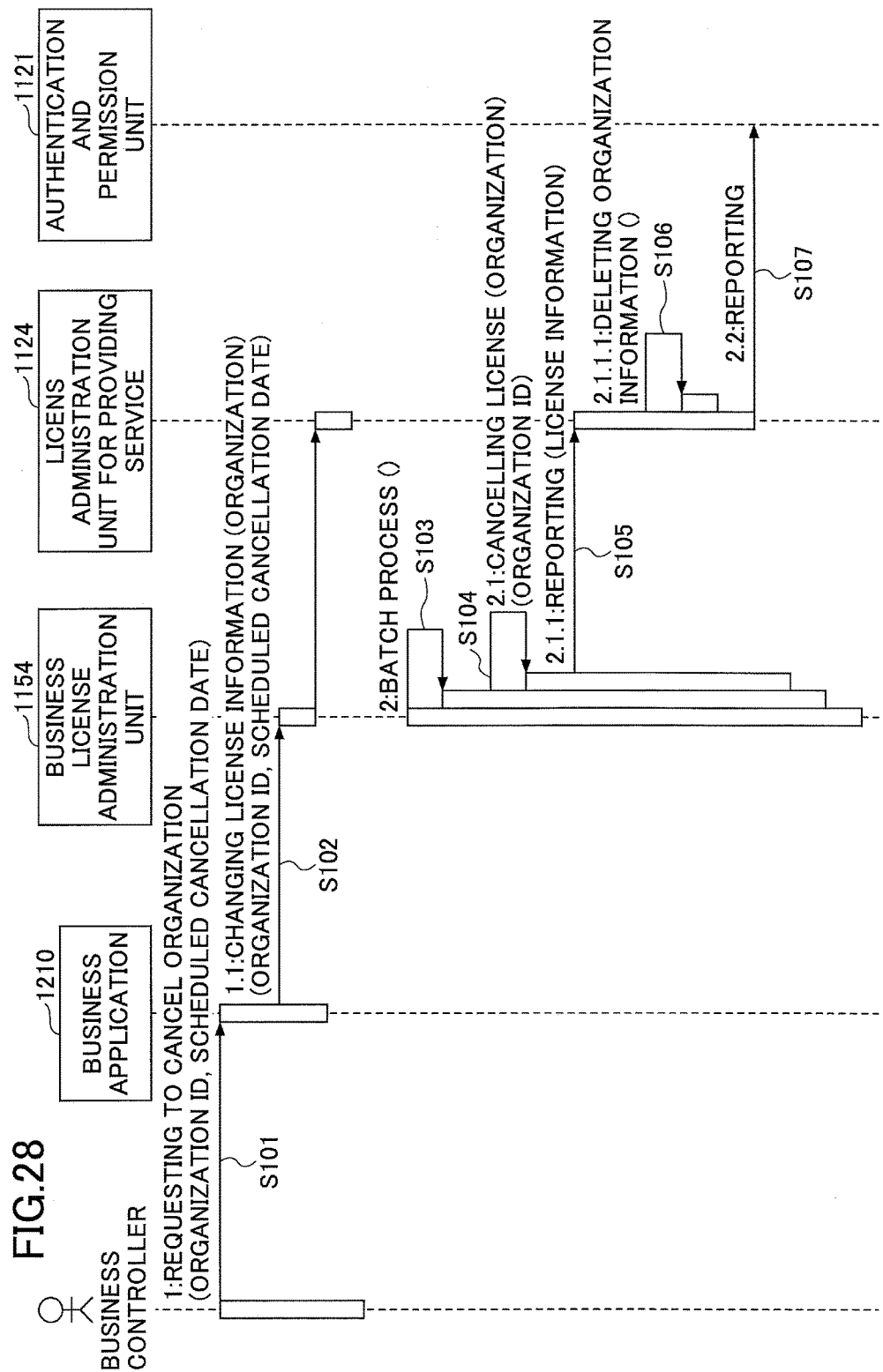
FIG. 28 is a sequence chart of an exemplary process of cancelling the organization.

FIG. 28 is a sequence chart of an exemplary process of cancelling the organization ID. The business controller operates the business terminal 1201 in step S101, and requests the business application 1210 to cancel the organization ID. The request of step S101 includes the organization ID and the scheduled cancellation date.

In step S102, the business application 1210 requests to change the license information of the organization license. The request of step S102 includes the organization ID and the scheduled cancellation date. After the process of step S102, the business license administration unit 1154 requests the license administration unit 1124 for providing the service corresponding to the sales region of the organization ID to be canceled to change the license information in a manner similar to step S102. On the scheduled cancellation date, the business license administration unit 1154 starts a batch process in step S103. In step S104, the business license administration unit 1154 changes the organization license associated with the organization ID and the state of the license information of the service license to the "cancellation".

In step S105, the business license administration unit 1154 report the organization license to be canceled and the license information of the service license to the license administration unit 1124 for providing the service corresponding to the sales region of the organization ID. In step S106, the license administration unit 1124 for providing the service changes the reported organization license and the reported state of the license information of the service license to the "cancellation".

In step S106, the license administration unit 1124 for providing the service performs a process of deleting all information associated with the organization ID such as the organization information, the user information, or the apparatus information. For example, the license administration unit 1124 for providing the service reports the deletion of the service permission information to, for example, the authentication and permission unit 1121 to delete all the information associated with the organization ID in step S107. The service permission information is described later.

In the sequence chart illustrated in FIG. 28, the license administration unit 1124 for providing the service reports to the authentication and permission unit 1121 in order to delete authentication and permission information. However, the license administration unit 1124 for providing the service reports to the organization administration unit 1122, the user administration unit 1123, the apparatus administration unit 1125, and so on depending on the information to be deleted.

In the process of the sequence chart illustrated in FIG. 28, the license administration unit 1124 for providing the service can perform the cancellation of the license and the deletion of the information associated with the organization license in response to the report of the cancellation of the organization license from the business license administration unit 1154. A portal site, application setup information, or the like for each organization or each user may be included in the information associated with the organization license. In the sequence chart illustrated in FIG. 28, the state of the license information is changed to the "cancellation" without being deleted.

<<Cancellation of Service>>

Figure 29:
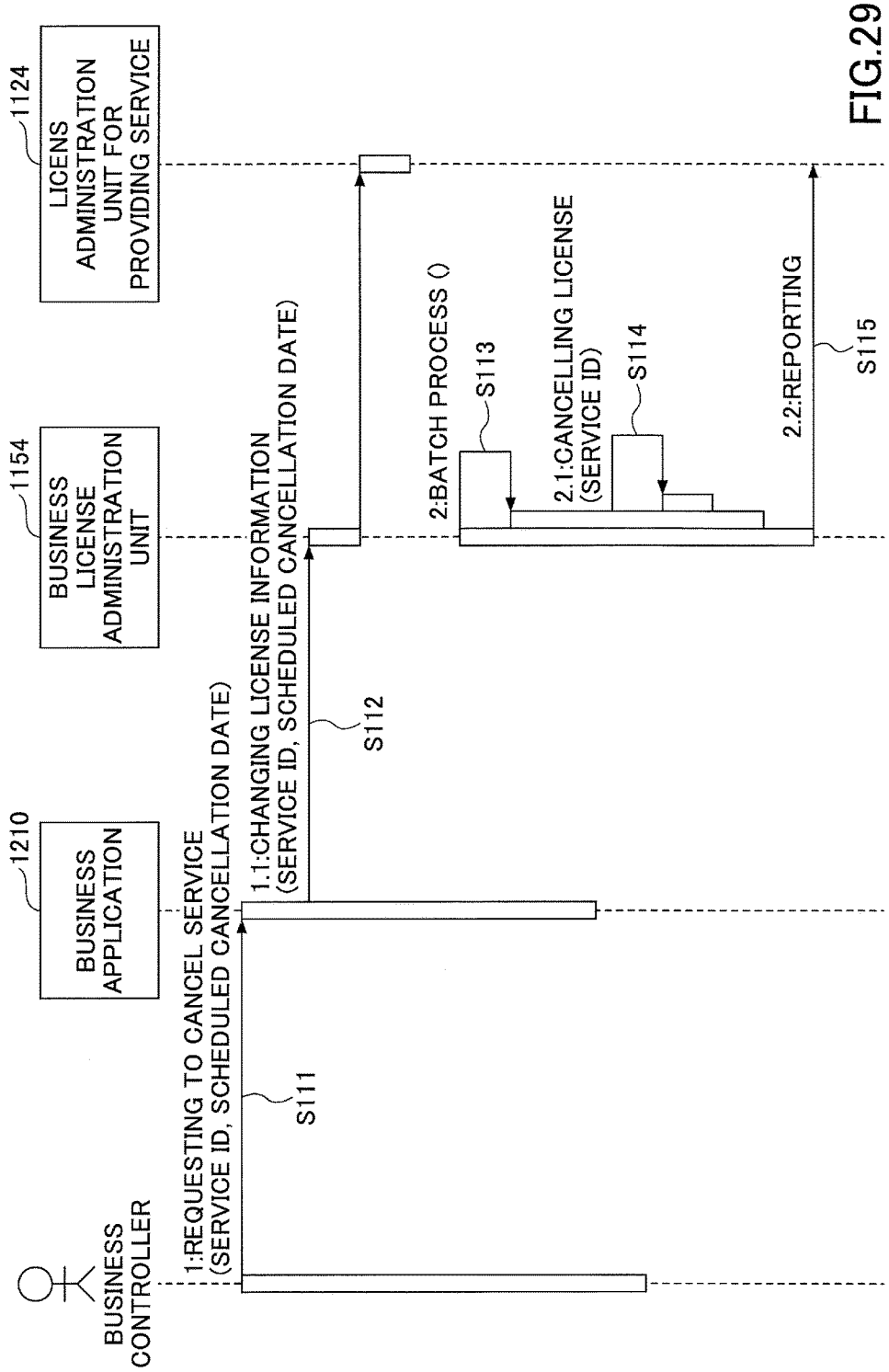
FIG. 29 is a sequence chart of an exemplary process of cancelling the service.

FIG. 29 is a sequence chart of an exemplary process of cancelling the service. The business controller operates the business terminal 1201 in step S111, and requests the business application 1210 to cancel the service. The request of step S111 includes the service ID and the scheduled cancellation date.

In step S112, the business application 1210 requests the business license administration unit 1154 to change the license information of the service license. The request of step S112 includes the service ID and the scheduled cancellation date. After the process of step S112, the business license administration unit 1154 requests the license administration unit 1124 for providing the service corresponding to the sales region of the service ID to be canceled to change the license information in a manner similar to step S102. On the scheduled cancellation date, the business license administration unit 1154 starts a batch process in step S113. In step S114, the business license administration unit 1154 change the service license associated with the service ID and the state of the license information of the service license to the "cancellation".

In step S115, the business license administration unit 1154 report the license information of the service license to be canceled to the license administration unit 1124 for providing the service corresponding to the sales region of the service ID. The license administration unit 1124 for providing the service changes the state of the reported license information of the service license to the "cancellation".

<<Continuation of Ending Service>>

Figure 30:
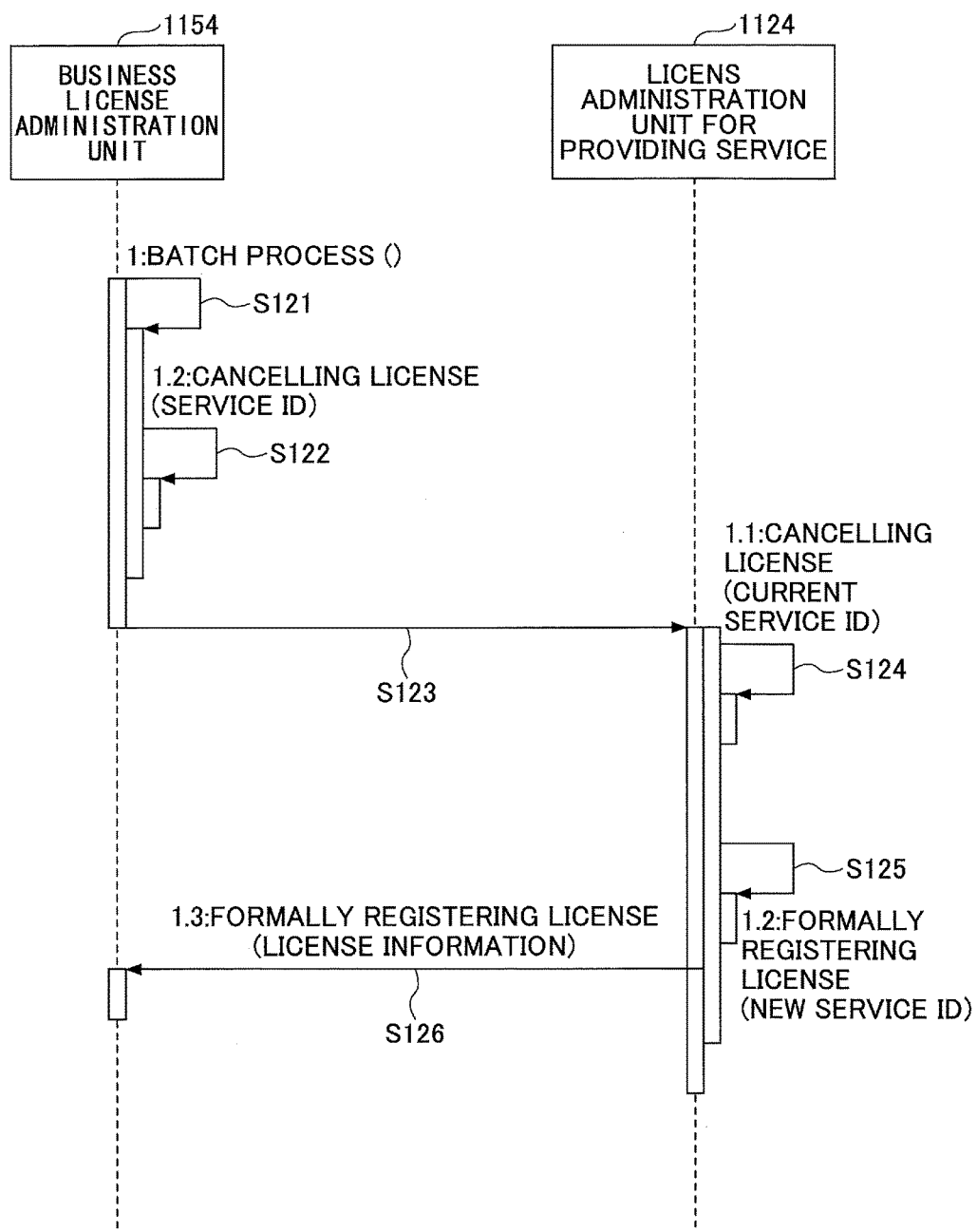
FIG. 30 is a sequence chart of an exemplary process of continuing an ending service.

FIG. 30 is a sequence chart of an exemplary process of continuing the ending service. Referring to FIG. 30, the state of the license information of the current license is changed to "after use" on the scheduled cancellation date of the current license and the state of the new license is changed to "now being used (not renewed)".

On the scheduled cancellation date, the business license administration unit 1154 starts a batch process in step S121. In step S122, the business license administration unit 1154 changes the state of the license information of the service license associated with the service ID to the "cancellation".

In step S123, the business license administration unit 1154 report the license information of the service license to be canceled to the license administration unit 1124 for providing the service corresponding to the sales region. In step S124, the license administration unit 1124 for providing the service changes the reported state of the license information associated with the service ID of the current license to the "cancellation".

In step S125, the license administration unit 1124 for providing the service changes the state of the license information associated with the service ID of the new license to the "formal registration". In step S126, the license administration unit 1124 for providing the service requests the business license administration unit 1154 to perform the formal registration of the license information of the service license in step S126.

Referring to the sequence chart illustrated in FIG. 30, the service license is switched from the current license to the new license. After the current license is switched to the new license, the service administration screen is changed to a service administration screen as illustrated in FIG. 37.

Figure 37:
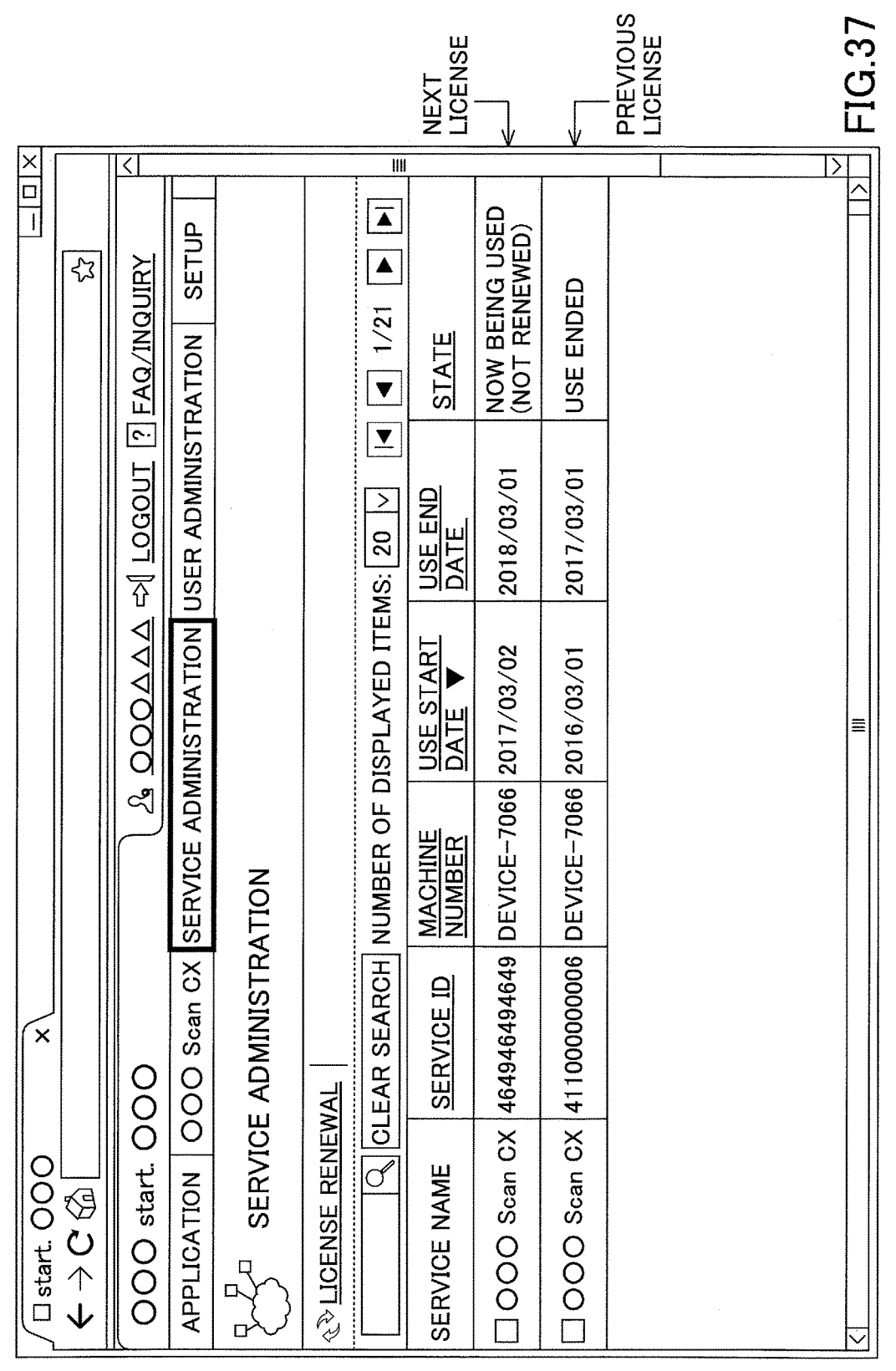

FIG. 37 is an image chart of an exemplary service administration screen for the service continuing by the renewed license. The state of the license on the lower stage of the service administration screen illustrated in FIG. 37 is changed from "now being used (renewed)" in FIG. 36 to "use ended". The state of the license on the upper stage of the service administration screen illustrated in FIG. 37 is changed from "before starting use" in FIG. 36 to "now being used (not renewed)".

<<Display of Service Selection Screen>>

Figure 38:
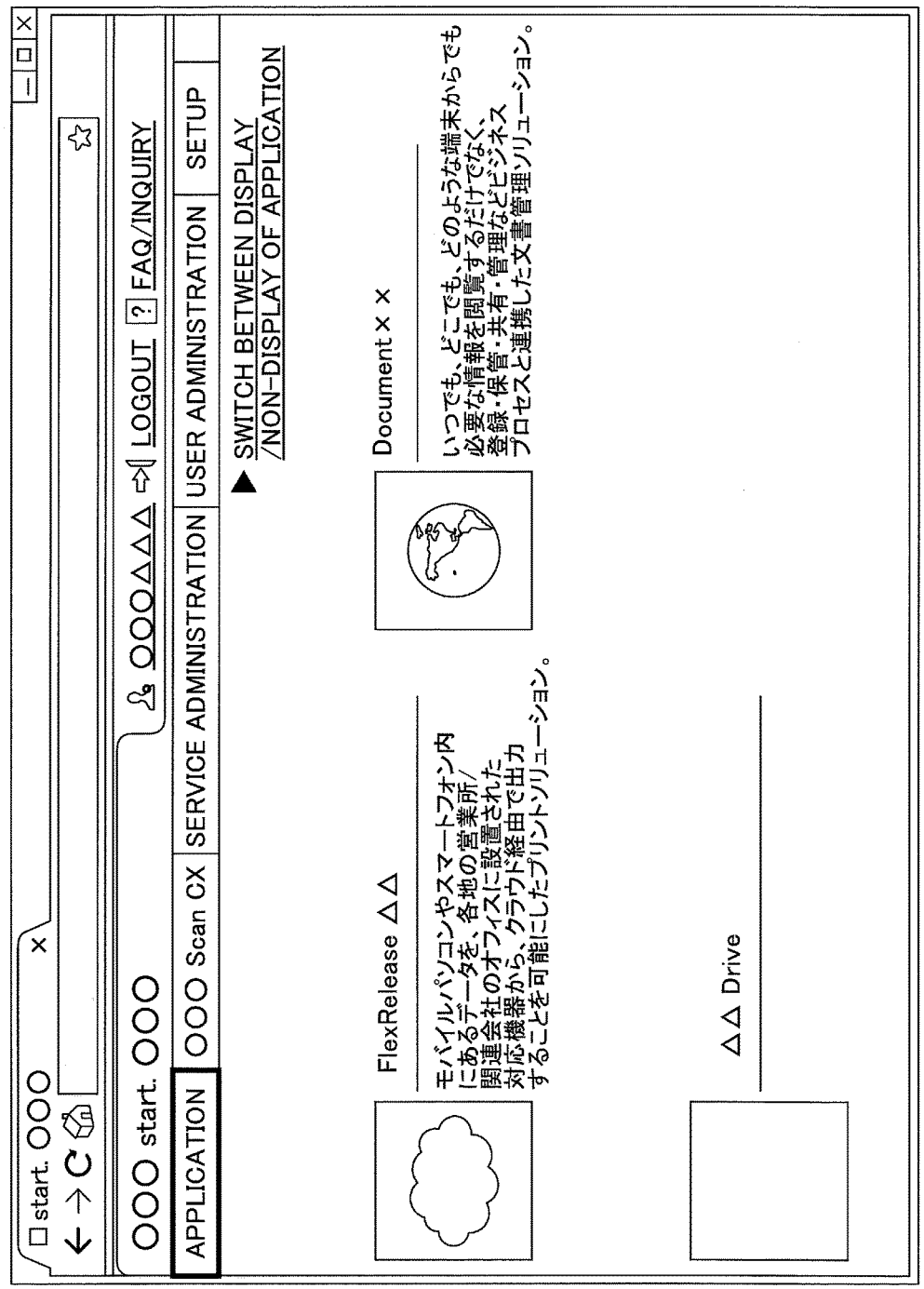
FIG. 38 is an image chart of an exemplary service selection screen.

When the user accesses the portal service application 1111, the portal service application 1111 can display a service selection screen as illustrated in FIG. 38 on the user terminal 1202. FIG. 38 is an image chart of an exemplary service selection screen. The service selection screen illustrated in FIG. 38 displays screen elements such as a tab or an icon for selecting the service corresponding to a service license when the service license whose license information is "now being used" indicating the activation exists in the organization to which the accessing user belongs.

Figure 39:
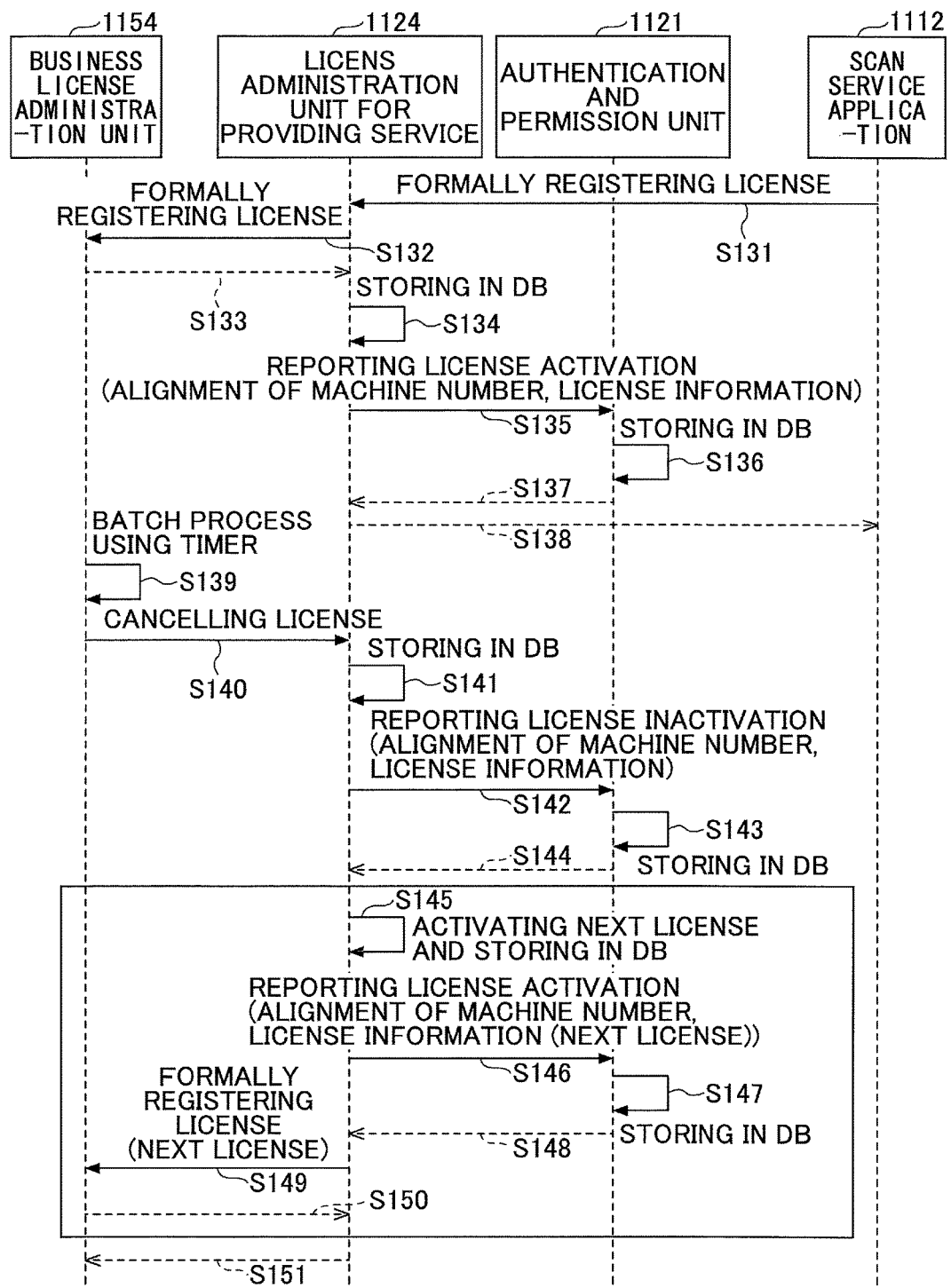
FIG. 39 is a sequence chart of an exemplary process of storing service permission information.

In order to display the service selection screen illustrated in FIG. 38, the service providing system 1100 stores service permission information as illustrated in FIG. 39. FIG. 39 is a sequence chart of an exemplary process of storing the service permission information. Description of processes similar to the above described sequence chart is appropriately omitted.

In step S131, the scan service application 1112 requests the license administration unit 1124 for providing the service to perform the formal registration of the service license. In step S131, the scan service application 1112 reports the machine type and machine number of the apparatus to the license administration unit 1124 for providing the service in step S131.

In step S132, the license administration unit 1124 for providing the service requests the business license administration unit 1154 to perform the formal registration of the service license in step S132. In step S133, the business license administration unit 1154 reports the formal registration of the service license to the license administration unit 1124 for providing the service.

When the result of the formal registration indicates the success, the license administration unit 1124 for providing the service stores the license information of the formal registered service license and the machine type and machine number in the license DB 1209 in step S134.

In step S135, the license administration unit 1124 for providing the service reports the activation of the service to the authentication and permission unit 1121. The report of the activation of the service is a report of a license activation for the first apparatus and a report of addition of apparatuses for the second and subsequent apparatuses. The report of step S135 includes the license information of the service license activated by the formal registration and an arrangement of the machine types and machine numbers of the apparatuses provided with the license activation.

Further, in step S136, the authentication and permission unit 1121 renews the service permission information stored in the service permission table illustrated in FIG. 40 based on the report of step S135. The service permission information is a list of the service which can be used by the organization.

FIG. 40 illustrates an exemplary structure of the service permission table. The service permission table illustrated in FIG. 40 includes a service type, a license ID, an organization ID, and a machine type and machine number as items. In the process of step S136, the service permission information is added to the service permission table illustrated in FIG. 40.

The authentication and permission unit 122 adds or deletes a record having a machine type and machine number of "-" and a record having a machine type and machine number of a target apparatus, which are illustrated in FIG. 40, at a timing of activating/inactivating the license. The authentication and permission unit 122 adds or deletes the record having a machine type and machine number of the target apparatus at a timing of adding/deleting the apparatus.

In the service permission table illustrated in FIG. 40, the record having the machine type and machine number of "-" and the record having a machine type and machine number of at least one apparatus (the machine type and machine number of an apparatus provided with the service activation).

In step S137, the authentication and permission unit 1121 returns a response to the report of step S135. In step S138, the license administration unit 1124 for providing the service reports the result of the formal registration of the service license to the scan service application 1112.

On the scheduled cancellation date, the business license administration unit 1154 starts a batch process in step S139. In step S140, the business license administration unit 1154 requests the license administration unit 1124 for providing the service requests to perform the cancellation of the service license.

In step S141, the license administration unit 1124 for providing the service causes the license information of the canceled service license to be changed (reflected) in the license DB 1209. In step S142, the license administration unit 1124 for providing the service reports the inactivation of the license to the authentication and permission unit 1121.

Here, the report of the service inactivation includes a report of a license inactivation and a report of an apparatus deletion. In step S142, the license inactivation is reported. The report of step S142 includes the license information of the service license inactivated by the cancellation and an arrangement of the machine types and machine numbers of the apparatuses provided with the license inactivation.

Further, in step S143, the authentication and permission unit 1121 renews the service permission information stored in the service permission table illustrated in FIG. 40 based on the report of step S142. In the process of step S143, the service permission information corresponding to the license ID provided with the license inactivation is deleted from the service permission table illustrated in FIG. 40.

When the deletion of the apparatus is reported, in the process of step S143, the service permission information provided with the deletion of the apparatus and corresponding to the arrangement of the machine types and machine numbers is deleted from the service permission table illustrated in FIG. 40. The authentication and permission unit 1121 may hold a subset (a cache) of the license information. In step S144, the authentication and permission unit 1121 returns a response to the report of step S142.

When the next license is registered, the license administration unit 1124 for providing the service performs the process of step S145. The license administration unit 1124 for providing the service causes the license information of the next license to be formally registered to be changed (reflected) in the license DB 1209.

In step S146, the license administration unit 1124 for providing the service reports the activation of the license to the authentication and permission unit 1121. The report of step S146 includes the license information of the next license activated by the formal registration and an arrangement of the machine types and machine numbers of the apparatuses provided with the license activation. In step S147, the authentication and permission unit 1121 renews the service permission information stored in the service permission table illustrated in FIG. 40 based on the report of step S146.

In the process of, for example, step S147, the record having a machine type and machine number of "-" and a record having a machine type and machine number of the target apparatus, which are illustrated in FIG. 40, are added as the service permission information. In step S148, the authentication and permission unit 1121 returns a response to the report of step S146.

In step S149, the license administration unit 1124 for providing the service requests the business license administration unit 1154 to perform the formal registration of the next license in step S149. In step S150, the business license administration unit 1154 reports the result of the formal registration of the next license to the license administration unit 1124 for providing the service. In step S151, the license administration unit 1124 for providing the service reports the result of the cancellation of the current license to the business license administration unit 1154.

In the process of the sequence chart of FIG. 39, by making the service permission information, it is possible to improve a response performance for generating the service selection screen and a response performance for determining whether the service can be performed or not.

Figure 41:
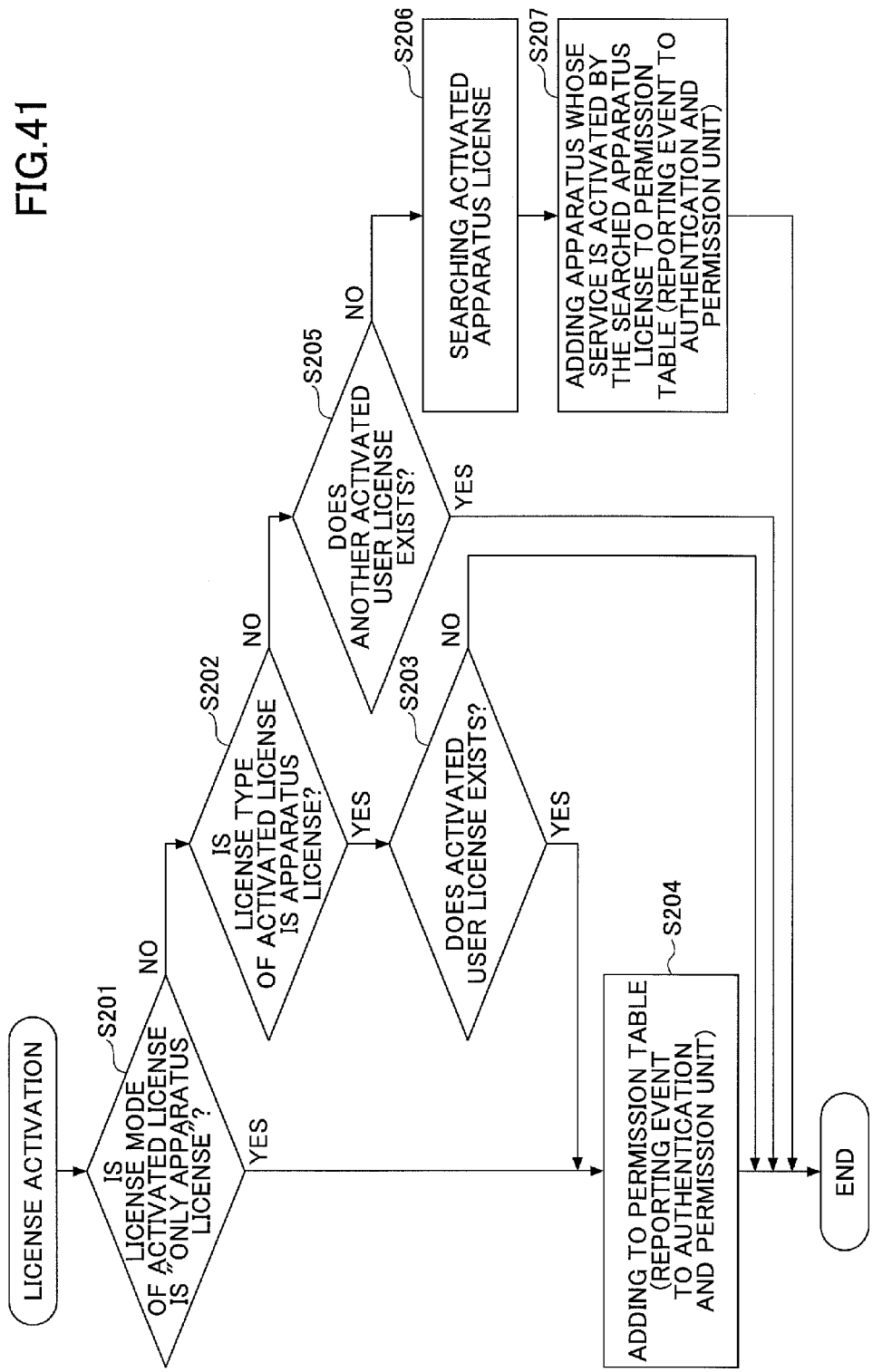
FIG. 41 is a flowchart of an exemplary process of renewing the service permission table.

The authentication and permission unit 1121 receiving the report of the license activation adds the service permission information to the service permission table illustrated in FIG. 40 with a procedure illustrated in, for example, FIG. 41. FIG. 41 is a flowchart of an exemplary process of renewing the service permission table.

In step S201, the authentication and permission unit 1121 refers to the license information, the activation of which is reported, and determines whether the license mode is "only apparatus license" or not.

If the license mode is "only apparatus license", the authentication and permission unit 1121 determines that the combination of the service licenses is unnecessary. In step S204, the authentication and permission unit 1121 adds the service permission information corresponding to the machine type and machine number, which is provided with the license activation, to the service permission table.

If the license mode is not "only apparatus license", the authentication and permission unit 1121 determines that the combination of the service licenses is necessary. Then, the process goes to step S202. The authentication and permission unit 1121 determines whether the license type of the license information provided with the report of the license activation is "apparatus license" or not.

If the license type is "apparatus license", the authentication and permission unit 1121 determines whether the license information whose license type is "user license" and which is provided with the license activation exists or not in step S203.

If there exists the license information whose license type is "user license" and which is provided with the license activation, the authentication and permission unit 1121 adds the service permission information to the service permission table in step S204.

If there does not exist the license information whose license type is "user license" and which is provided with the license activation, the authentication and permission unit 1121 does not add the service permission information to the service permission table.

If the license type is not "apparatus license" in step S202, the authentication and permission unit 1121 determines whether other license information whose license type is "user license" and which is provided with the license activation exists or not in step S205.

If there exists the other license information whose license type is "user license" and which is provided with the license activation, the authentication and permission unit 1121 does not add the service permission information to the service permission table.

If there does not exist the other license information whose license type is "user license" and which is provided with the license activation, the authentication and permission unit 1121 searches the license information whose license type is "apparatus license" and which is provided with the license activation in step S206.

Figure 44:
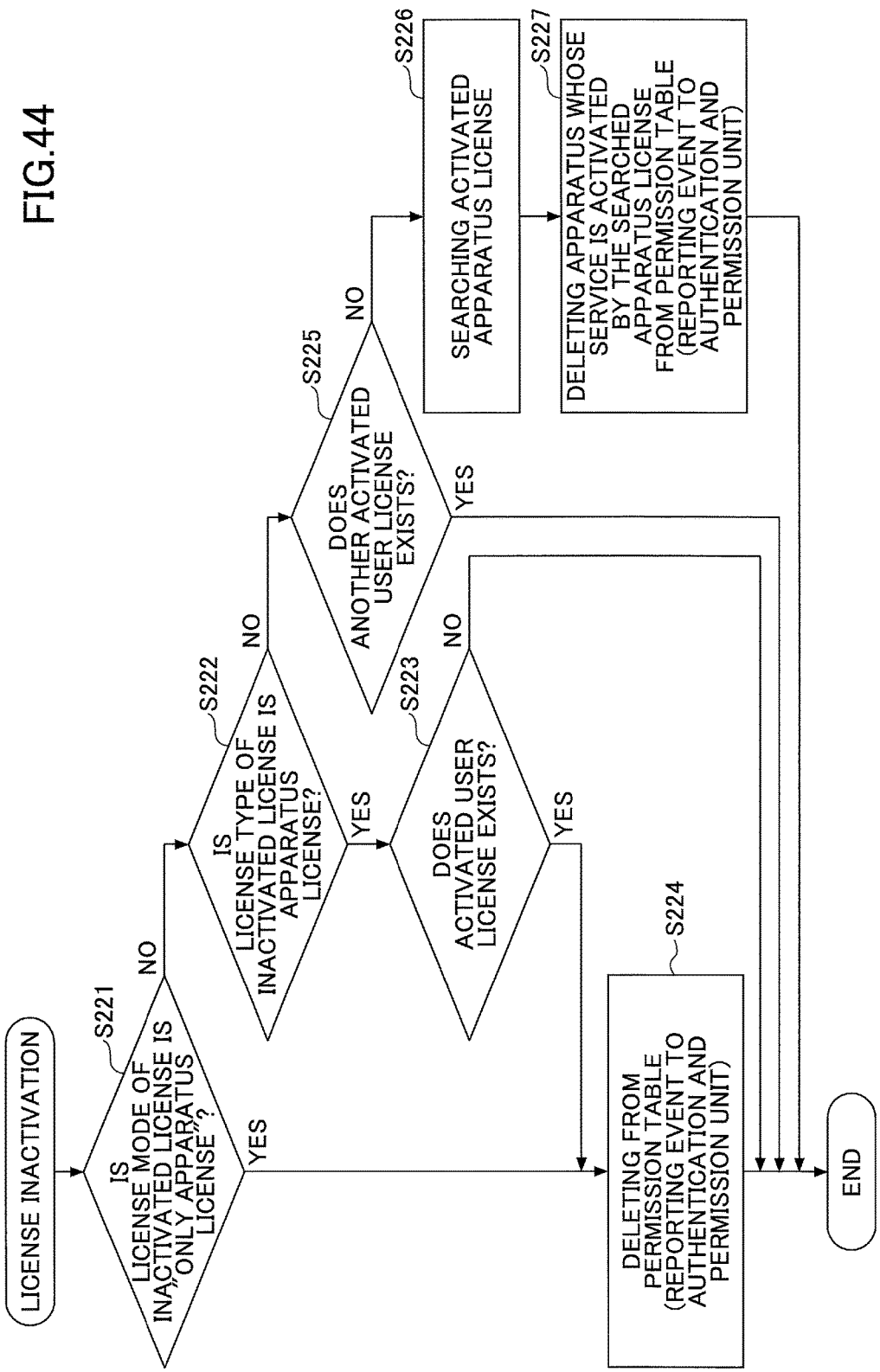
FIG. 44 is a flowchart of another exemplary process of renewing the service permission table.

In step S207, the authentication and permission unit 1121 adds the service permission information corresponding to the machine type and machine number of the apparatus, which is provided with the license activation in the license information of the search result acquired in step S206, to the service permission table illustrated in FIG. 44.

The searches in steps S203, S205, and S206 are performed for license information which is provided with the license activation and has the same organization ID, service type, and license mode as those of the license information provided with the report of the license activation.

Figure 42:
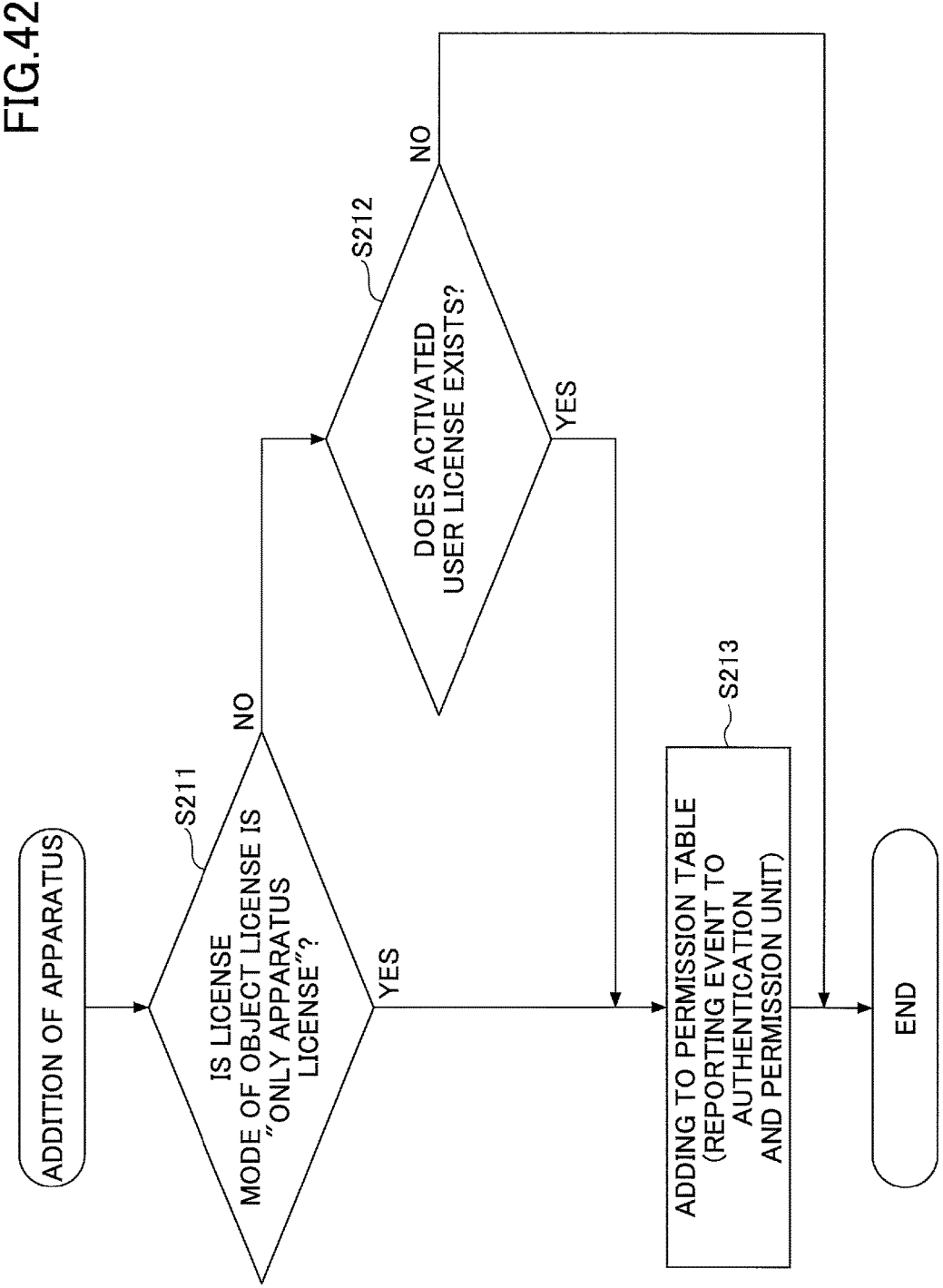
FIG. 42 is a flowchart of another exemplary process of renewing the service permission table.

The authentication and permission unit 1121 receiving the report of the addition of the apparatus adds the service permission information to the service permission table illustrated in FIG. 40 with a procedure illustrated in, for example, FIG. 42. FIG. 42 is a flowchart of another exemplary process of renewing the service permission table.

In step S211, the authentication and permission unit 1121 refers to the license information provided with the report of the addition of the apparatus, and determines whether the license mode is "only apparatus license" or not. If the license mode is "only apparatus license", the authentication and permission unit 1121 determines that the combination of the service licenses is unnecessary. In step S213, the authentication and permission unit 1121 adds the service permission information corresponding to the machine type and machine number, which is provided with the addition of the apparatus, to the service permission table.

If the license mode is not "only apparatus license", the authentication and permission unit 1121 determines that the combination of the service licenses is necessary. Then, the process goes to step S212. The authentication and permission unit 1121 determines whether the license information whose license type is "user license" and which is provided with the license activation exists or not in step S212.

If there exists the license information whose license type is "user license" and which is provided with the license activation, the authentication and permission unit 1121 adds the service permission information to the service permission table in step S213.

If there does not exist the license information whose license type is "user license" and which is provided with the license activation, the authentication and permission unit 1121 does not add the service permission information to the service permission table.

The search in step S212 is performed for license information which is provided with the license activation and has the same organization ID, service type, and license mode as those of the license information provided with the report of the addition of the apparatus.

Figure 43:
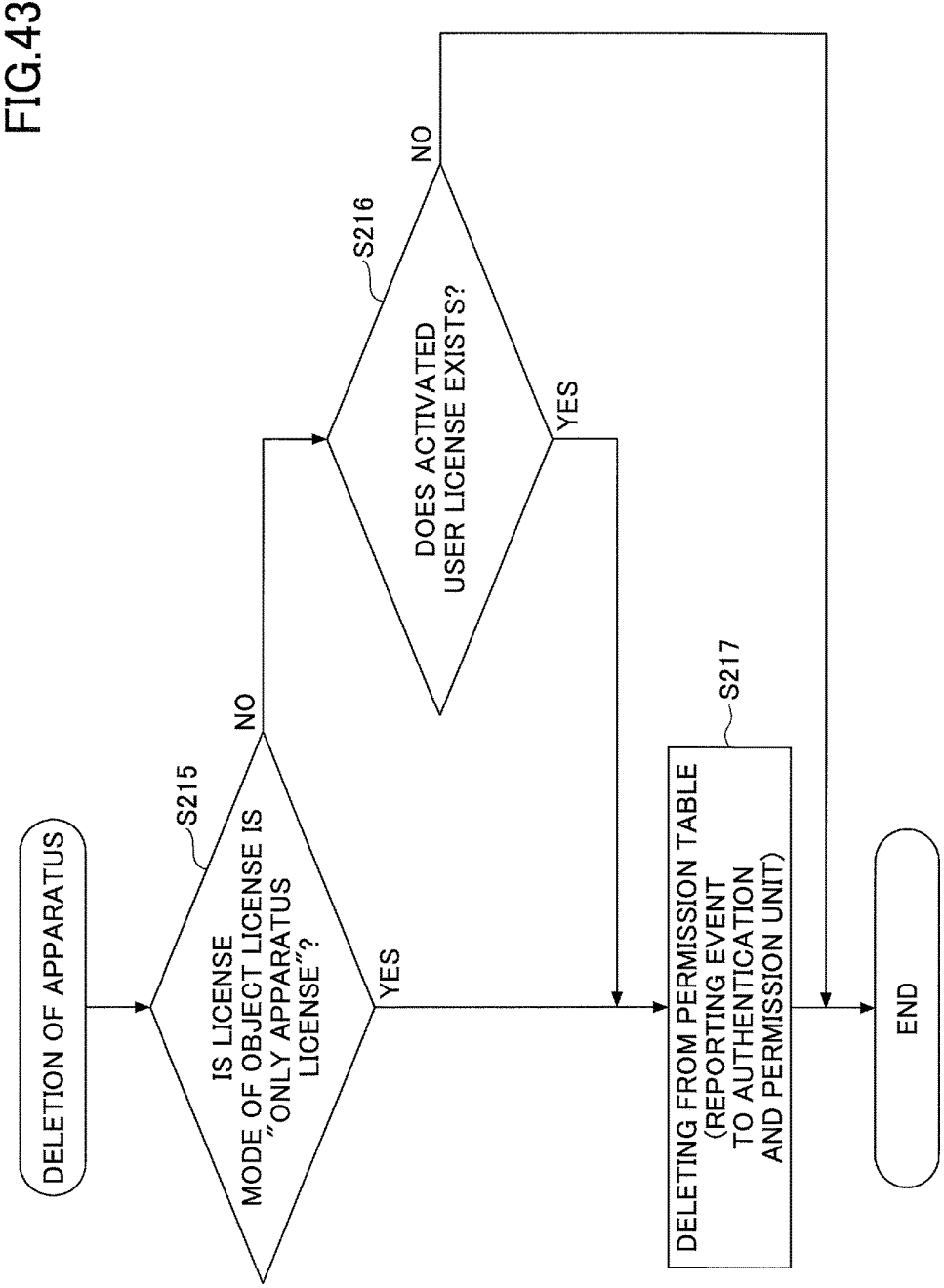
FIG. 43 is a flowchart of another exemplary process of renewing the service permission table.

The authentication and permission unit 1121 receiving the report of the deletion of the apparatus adds the service permission information to the service permission table illustrated in FIG. 40 with a procedure illustrated in, for example, FIG. 43. FIG. 43 is a flowchart of another exemplary process of renewing the service permission table.

In step S215, the authentication and permission unit 1121 refers to the license information provided with the report of the deletion of the apparatus, and determines whether the license mode is "only apparatus license" or not. If the license mode is "only apparatus license", the authentication and permission unit 1121 determines that the combination of the service licenses is unnecessary. In step S217, the authentication and permission unit 1121 deletes the service permission information corresponding to the machine type and machine number, which is provided with the deletion of the apparatus, from the service permission table.

If the license mode is not "only apparatus license", the authentication and permission unit 1121 determines that the combination of the service licenses is necessary. Then, the process goes to step S216. The authentication and permission unit 1121 determines whether the license information whose license type is "user license" and which is provided with the license activation exists or not in step S216.

If there exists the license information whose license type is "user license" and which is provided with the license activation, the authentication and permission unit 1121 deletes the service permission information from the service permission table in step S213.

If there does not exist the license information whose license type is "user license" and which is provided with the license activation, the authentication and permission unit 1121 does not delete the service permission information from the service permission table. This is because if there does not exist the license information whose license type is "user license" and which is provided with the license activation, the service permission table does not include the service permission information.

The search in step S216 is performed for license information which is provided with the license activation and has the same organization ID, service type, and license mode as those of the license information provided with the report of the deletion of the apparatus.

The authentication and permission unit 1121 receiving the report of the license inactivation deletes the service permission information from the service permission table illustrated in FIG. 40 with a procedure illustrated in, for example, FIG. 44. FIG. 44 is a flowchart of another exemplary process of renewing the service permission table.

In step S221, the authentication and permission unit 1121 refers to the license information, the inactivation of which is reported, and determines whether the license mode is "only apparatus license" or not.

If the license mode is "only apparatus license", the authentication and permission unit 1121 determines that the combination of the service licenses is unnecessary. In step S224, the authentication and permission unit 1121 deletes the service permission information corresponding to the machine type and machine number, which is provided with the license inactivation, from the service permission table.

If the license mode is not "only apparatus license", the authentication and permission unit 1121 determines that the combination of the service licenses is necessary. Then, the process goes to step S222. The authentication and permission unit 1121 determines whether the license type of the license information provided with the report of the license inactivation is "apparatus license" or not.

If the license type is "apparatus license", the authentication and permission unit 1121 determines whether the license information whose license type is "user license" and which is provided with the license activation exists or not in step S223.

If there exists the license information whose license type is "user license" and which is provided with the license activation, the authentication and permission unit 1121 deletes the service permission information from the service permission table in step S224.

If there does not exist the license information whose license type is "user license" and which is provided with the license activation, the authentication and permission unit 1121 performs nothing.

If the license type is not "apparatus license" in step S222, the authentication and permission unit 1121 determines whether other license information whose license type is "user license" and which is provided with the license activation exists or not in step S225.

If there exists the other license information whose license type is "user license" and which is provided with the license activation, the authentication and permission unit 1121 does not delete the service permission information from the service permission table.

If there does not exist the other license information whose license type is "user license" and which is provided with the license activation, the authentication and permission unit 1121 searches the license information whose license type is "apparatus license" and which is provided with the license activation in step S226.

In step S227, the authentication and permission unit 1121 deletes the service permission information corresponding to the machine type and machine number of the apparatus, which is provided with the license activation in the license information of the search result acquired in step S226, from the service permission table illustrated in FIG. 40.

The searches in steps S223, S225, and S226 are performed for license information which is provided with the license activation and has the same organization ID, service type, and license mode as those of the license information provided with the report of the license inactivation.

The process of requesting to cancel the service license in step S140 may be requested by the business controller from the service ID change screen illustrated in FIG. 23. The service ID change screen illustrated in FIG. 23 is displayed on, for example, the business terminal 1201. The service ID change screen can display the organization ID and the machine type and machine number associated with the service ID. The process of requesting to cancel the service license in step S140 can be performed by inserting a check mark into a check box of "deletion target" of the displayed machine type and machine number on, for example, the service ID change screen illustrated in FIG. 23.

Figure 45:
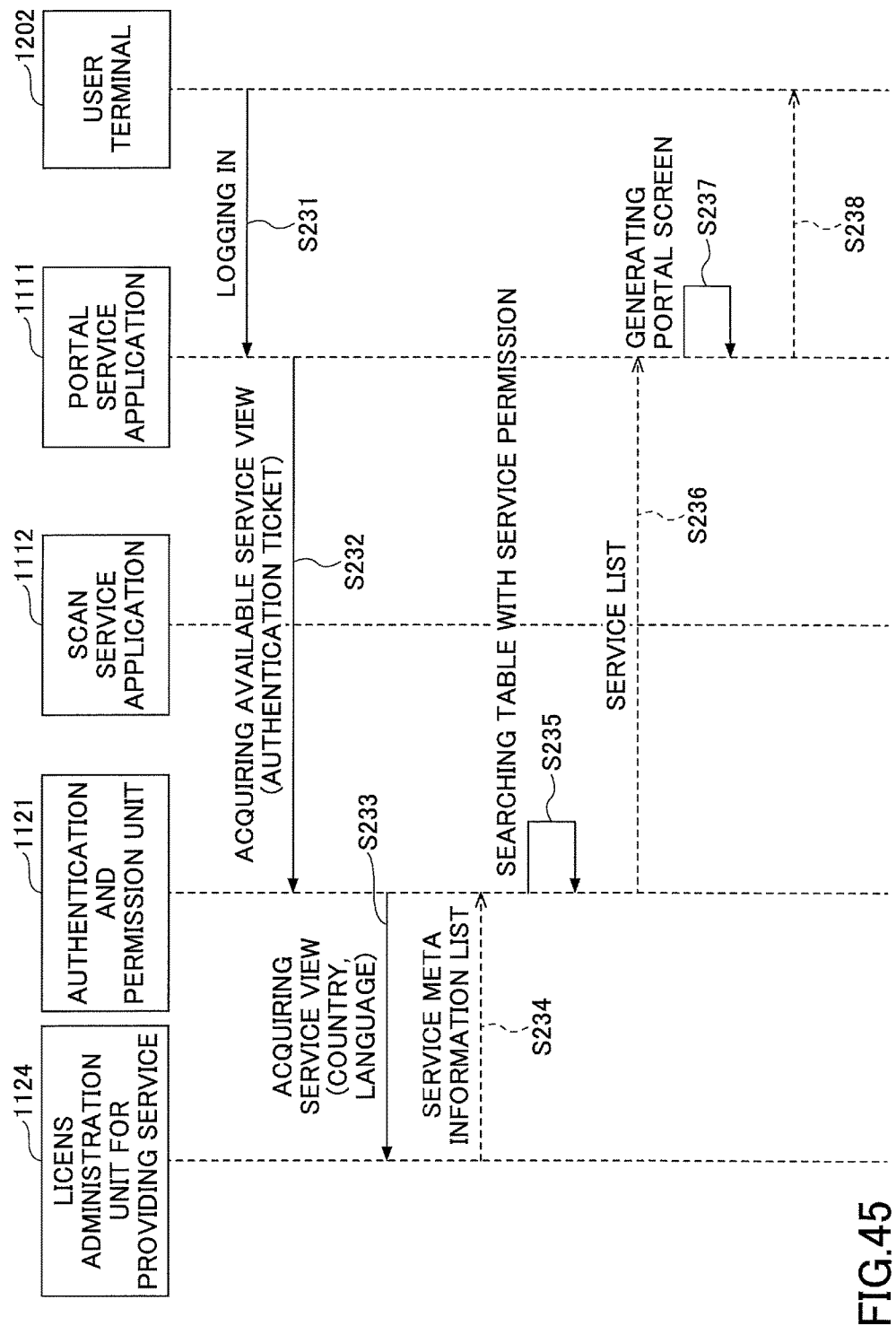
FIG. 45 is a sequence chart of generating an exemplary service selection screen.

In order to generate the service selection screen illustrated in FIG. 38, the service providing system 1100 performs the process as illustrated in FIG. 45. FIG. 45 is a sequence chart of generating an exemplary service selection screen.

In step S231, the user operates the user terminal 1202 to log in the portal service application 1111. In step S232, the portal service application 1111 presents an authentication ticket to the authentication and permission unit 1121 and requests the authentication and permission unit 1121 to acquire an available service view.

In step S233, the authentication and permission unit 1121 requests to acquire a service view by designating the country and the language. The license administration unit 1124 for providing the service holds a service master (meta information). The data items of the service master are the service type, an explanatory text (various languages), whether the license administration exists or not, a URL (a top, terms of use, and an icon).

In step S234, the license administration unit 1124 for providing the service sends a service meta information list to the authentication and permission unit 1121 based on the service master. In step S235, the authentication and permission unit 1121 searches the service permission information in the service permission table illustrated in FIG. 40 and generates the available service view.

In step S235, even in a case where there is no record in which the machine type and machine number of the apparatus is set such as the records having the machine type and machine number of "-", the available service view can be accurately generated.

Specifically, when the service permission information having the organization ID of the organization, in which the user logs, and the service type is registered in the service permission table, the authentication and permission unit 1121 adds this service permission information to the available service view. When the service permission information having the organization ID of the organization, in which the user logs, and the service type is registered in the service permission table, the authentication and permission unit 1121 determines that the service corresponding to this service type can be used.

Further, the authentication and permission unit 1121 unconditionally adds a service provided with no license administration to the available service view. The authentication and permission unit 1121 may be configured to hold a use availability setup of the service for each user. In this case, the authentication and permission unit 1121 can display the service view for each user.

In step S236, the authentication and permission unit 1121 sends the available service view to the portal service application 1111. In step S237, the portal service application 1111 generates the service selection screen as illustrated in FIG. 38 by using the available service view. In step S238, the portal service application 1111 can cause the service selection screen illustrated in FIG. 38 to be displayed in the user terminal 1202.

The portal service application 1111 directly acquires the service meta list from the license administration unit 1124 for providing the service and generates the service selection screen by combining with the service permission information acquired from the authentication and permission unit 1124 as illustrated in FIG. 38.

Referring to the sequence chart of FIG. 45, because the business license administration unit 1154 is not accessed, a response performance for displaying the service selection screen illustrated in FIG. 38 is improved. Referring to the sequence chart illustrated in FIG. 45, it is possible to display the service selection screen including the screen elements such as the tab or the icon for selecting the service corresponding the service license when the activated service license exists.

Figure 46:
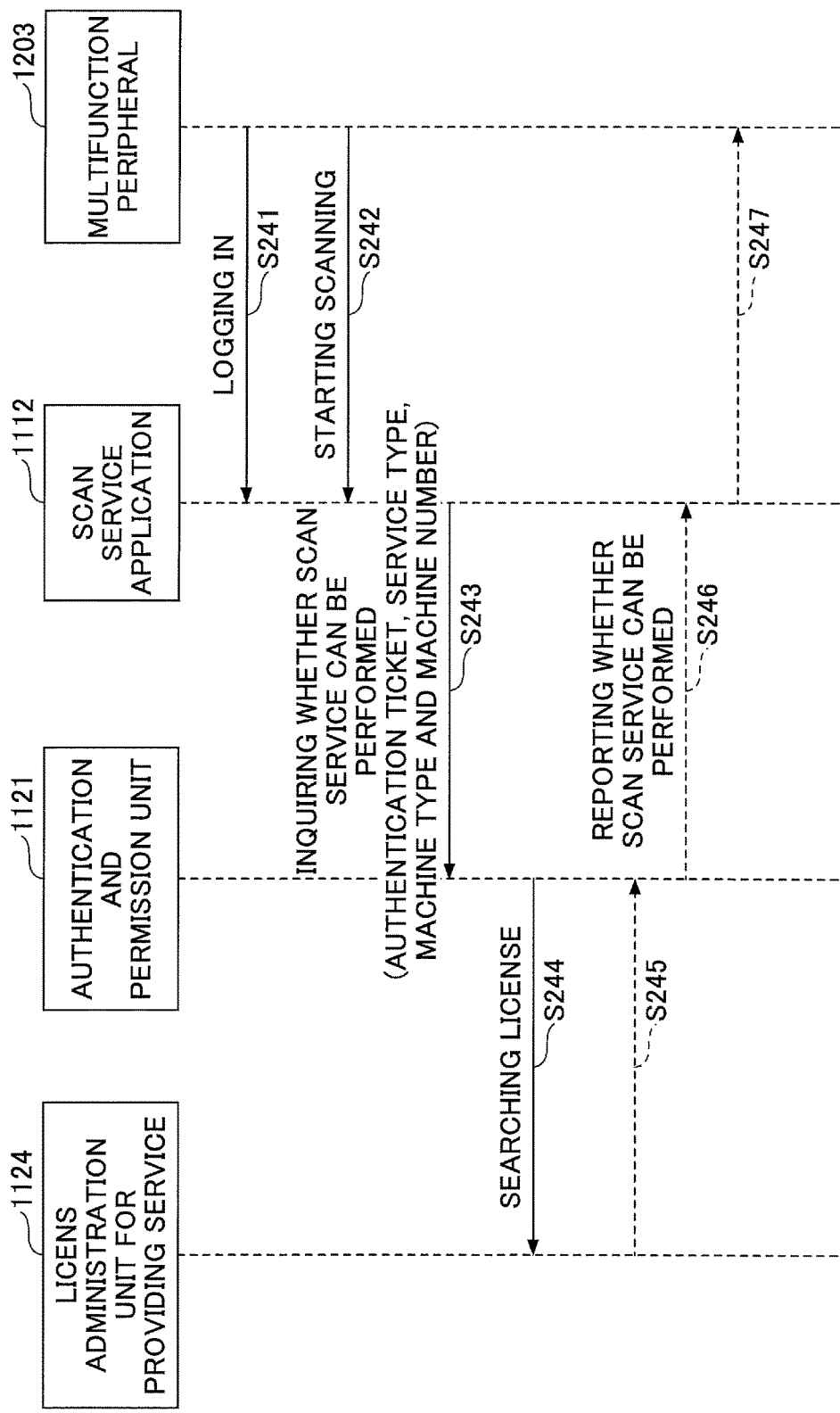
FIG. 46 is a sequence chart of an exemplary process of determining whether the service can be performed or not.

In order to determine whether the service can be performed by the user, the service providing system 1100 performs a process illustrated in FIG. 46. FIG. 46 is a sequence chart of an exemplary process of determining whether the service can be performed or not.

In step S241, the user operates the MFP 1203 to log in the scan service application 1112. In step S242, the user operates the MFP 1203 to instruct to perform scan. The MFP 1203 requests the scan service application 1112 to perform the scan.

In step S243, the scan service application 1112 designates the authentication ticket, the service type, and the machine type and machine number and inquires to the authentication and permission unit 1121 about whether the scan service of the MFP 1203 can be performed. In step S244, the authentication and permission unit 1121 requests to search the license information by designating the service type and the machine type and machine number.

In place of the process of step S244, when the service permission information having the organization ID, the service type, and the machine type and machine number is registered in the service permission table, the authentication and permission unit 1121 may permit to perform the scan service. The organization ID included in, for example, the authentication ticket may be used.

The license administration unit 1124 for providing the service searches the license information by designating the service type and the machine type and machine number. In step S245, the license administration unit 1124 for providing the service sends the searched license information to the authentication and permission unit 1121. The license administration unit 1124 for providing the service can determine whether the scan service of the MFP 1203 is performed by checking the state of the license information received from the license administration unit 1124 for providing the service.

The authentication and permission unit 1121 may hold a subset (a cache) of the license information. The authentication and permission unit 1121 may be configured to hold a use availability setup of the service for each user. In this case, the authentication and permission unit 1121 determines whether the scan service of the MFP 1203 can be performed based on the use availability setup for each user.

The authentication and permission unit reports the determined result of whether the scan service of the MFP 1203 can be performed to the scan service application 1112. In step S247, the scan service application 1112 reports the determined result of whether the scan service of the MFP 1203 can be performed to the MFP 1203. When the scan cannot be performed, the MFP 1203 displays, for example, an error. When the scan can be performed, the MFP 1203 starts scanning.

The process of the sequence chart illustrated in FIG. 46 enables the response performance for starting the scan to be improved because an access to the business license administration unit 1154 does not occur. Further, when the activated service license exists, a job of the service corresponding to the service license can be permitted by the process of the sequence chart illustrated in FIG. 46.

[General Overview]

Within the service providing system 1100 of the first embodiment, the license administration unit 1124 for providing the service and the business license administration unit 1154 are provided, and a difference among the multiple business systems is absorbed (compensated) by the business license administration unit 1154 to facilitate the administration of the license.

Therefore, the service providing system 1100 can easily constrain the use of the application 11101 by various licenses issued by the multiple business systems. Further, because the service providing system 1100 of the first embodiment can activate the multiple apparatuses by one license (the volume license), the number of the licenses can be reduced and the administration of the license can be facilitated.

The service providing apparatus 1208 is an example of a service providing unit and is substantialized by a CPU or the like. The license administration server 1206 is an example of a license administration unit and is substantialized by a CPU or the like. The license DB 1207 is an example of a first memory unit and is substantialized by a memory, a HDD, or the like. The license DB 1209 is an example of a second memory unit and is substantialized by a memory, a HDD, or the like. The license administration unit 1124 is an example of an activation unit and is substantialized by a CPU or the like. The client terminal 1011, the mobile terminal 1012, and the image forming apparatus 1013 are an example of an apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

This application is based upon and claims the benefit of priority of the prior Japanese Patent Application No. 2013-257094, filed on Dec. 12, 2013, the entire contents of which are incorporated herein by reference.

What is claimed is:

1. An information processing system including at least one information processing apparatus, the information processing system comprising:
a first data center system; and
a second data center system different from the first data center system;
wherein the first data center system includes
a license administration server that administrates a provisionally registered license or a registered license, and
a first memory unit storing license information of a license,
wherein the second data center system includes
a service providing server that provides a service to an apparatus associated with the license, and
a second memory unit that stores a copy of the license information of the license stored by the first memory unit and is administered by the license administration server, and
wherein the license providing server
receives a request to activate the license from the apparatus,
activates the provisionally registered license in association with identification information of the apparatus or associates the registered license with the identification information of the apparatus by adding the identification information of the apparatus to the registered license,
requests a change of the license information of the license stored in the second memory unit to be reflected on the license information of the license stored in the first memory unit, and
adjusts a quantity of the identification information of the apparatus associated with the registered license based on the quantity of the apparatus by which the service included in the license information is made usable;

wherein the license administered by the license administration server includes
a first license enabling the apparatus to use the service providing server, and
a second license enabling to use the service provided by the service providing server,
wherein the first and second licenses are associated and stored in the first memory unit; and
wherein the service providing server deletes information associated with the first license when the first license as a parent license is inactivated.

2. The information processing system according to claim 1,
wherein, when it is not possible to add so as to associate the apparatus with the registered license based on the quantity of the apparatus by which the service included in the license information is made usable, the service providing server reports that it is not possible to add to the apparatus.

3. The information processing system according to claim 1,
wherein the license administration server receives a request to delete the apparatus associated with the license administered and stored by the first memory unit and requests a change of the license information of the license stored by the first memory unit to be reflected on the license information of the license stored by the second memory unit after deleting the apparatus associated with the license administered and stored by the first memory unit.

4. The information processing system according to claim 3,
wherein the service providing server provides the apparatus with the service when the first and second licenses are activated.

5. The information processing system according to claim 1,
wherein the service providing server receives a request to renew the license from the apparatus, and changes the license information stored in the first and second memory units so that the provisionally registered license stored in the second memory unit becomes a license to be activated next to the activated license.

6. The information processing system according to claim 5,
wherein the service providing server changes the license information stored in the first and second memory units so that the provisionally registered license stored in the second memory unit becomes the license to be activated next to the activated license when the quantity of the at least one apparatus by which the service included in the license information is made usable is greater than a quantity of the at least one apparatus associated with the activated license.

7. The information processing system according to claim 5,
wherein the service providing server changes the license information stored in the first and second memory units so that the provisionally registered license stored in the second memory unit becomes the license to be activated next to the activated license when the service providing server receives a request to delete the license from the apparatus and deletes the apparatus associated with the license stored and administered by the first memory unit.

8. An information processing system including at least one information processing apparatus, the information processing system comprising:
a first data center system; and
a second data center system different from the first data center system;
wherein the first data center system includes
a license administration server that administrates a provisionally registered license or a registered license, and
a first memory unit storing license information of a license,
wherein the second data center system includes
a service providing server that provides a service to an apparatus associated with the license, and
a second memory unit that stores a copy of the license information of the license stored by the first memory unit and is administered by the license administration server, and
wherein the license providing server
receives a request to activate the license from the apparatus,
activates the provisionally registered license in association with identification information of the apparatus or associates the registered license with the identification information of the apparatus by adding the identification information of the apparatus to the registered license,
requests a change of the license information of the license stored in the second memory unit to be reflected on the license information of the license stored in the first memory unit and
adjusts a quantity of the identification information of the apparatus associated with the registered license based on the quantity of the apparatus by which the service included in the license information is made usable;
wherein the license administered by the license administration server includes
a first license enabling the apparatus to use the service providing server, and
a second license enabling to use the service provided by the service providing server
wherein the first and second licenses are associated and stored in the first memory unit; and
wherein the license administration server receives a request to provisionally register, change, or cancel the license designating a region, and reports license information of the license which is provisionally registered, changed, or canceled.

9. The information processing system according to claim 8,
wherein the service providing server deletes information associated with the first license when the first license as a parent license is inactivated.

10. A method of administrating a license performed in an information processing system including
a first data center system, and
a second data center system different from the first data center system,
wherein the first data center system includes
a license administration server that administrates a provisionally registered license or a registered license, and a first memory unit storing license information of a license, wherein the second data center system includes a service providing server that provides a service to an apparatus associated with the license, and a second memory unit that is administered by the license administration server, the method comprising:

storing a copy of the license information of the license stored by the first memory unit in the second memory unit;

receiving a request to activate the license from the apparatus;

activating the provisionally registered license in association with identification information of the apparatus or associating the registered license with the identification information of the apparatus by adding the identification information of the apparatus to the registered license;

requesting a change of the license information of the license stored in the second memory unit to be reflected on the license information of the license stored in the first memory unit; and adjusting a quantity of the identification information of the apparatus associated with the registered license based on the quantity of the apparatus by which the service included in the license information is made usable;

wherein the license administered by the license administration server includes a first license enabling the apparatus to use the service providing server, and a second license enabling to use the service provided by the service providing server wherein the first and second licenses are associated and stored in the first memory unit; and wherein the service providing server deletes information associated with the first license when the first license as a parent license is inactivated.

* * * * *